(12) United States Patent
Ueno

(10) Patent No.: US 8,539,198 B2
(45) Date of Patent: Sep. 17, 2013

(54) MEMORY MANAGEMENT SYSTEM

(75) Inventor: Toshiaki Ueno, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/606,784

(22) Filed: Sep. 7, 2012

(65) Prior Publication Data

US 2013/0013884 A1    Jan. 10, 2013

Related U.S. Application Data

(62) Division of application No. 12/607,673, filed on Oct. 28, 2009, now Pat. No. 8,291,192.

(30) Foreign Application Priority Data

| Oct. 30, 2008 | (JP) | 2008-279210 |
| Jan. 30, 2009 | (JP) | 2009-020810 |
| Feb. 27, 2009 | (JP) | 2009-047280 |
| Feb. 27, 2009 | (JP) | 2009-047281 |

(51) Int. Cl.
    *G06F 12/00*      (2006.01)

(52) U.S. Cl.
    USPC ........................................ 711/173

(58) Field of Classification Search
    None
    See application file for complete search history.

(56) References Cited

U.S. PATENT DOCUMENTS

| 6,412,057 | B1 * | 6/2002 | Sasahara et al. | 711/202 |
| 6,684,312 | B1 * | 1/2004 | Murayama et al. | 711/170 |
| 7,685,396 | B2 * | 3/2010 | Sze et al. | 711/170 |
| 2006/0074988 | A1 * | 4/2006 | Imanishi et al. | 707/200 |
| 2007/0283125 | A1 * | 12/2007 | Manczak et al. | 711/207 |
| 2008/0120188 | A1 * | 5/2008 | Mobley et al. | 705/15 |
| 2008/0244165 | A1 * | 10/2008 | Kunimatsu | 711/103 |

FOREIGN PATENT DOCUMENTS

| JP | H04-038540 | 2/1992 |
| JP | H08-095849 | 4/1996 |
| JP | 2004-326957 | 11/2004 |
| JP | 2005-196343 | 7/2005 |
| JP | 2008-513911 | 1/2008 |
| JP | 2008-217183 | 9/2008 |
| WO | WO2008-084531 | 7/2008 |

* cited by examiner

*Primary Examiner* — Hiep Nguyen
(74) *Attorney, Agent, or Firm* — Stephen Chin

(57) ABSTRACT

This memory management system has: (a) a logical partition management unit that manages allocation and release of a virtual memory used by an application in a logical address space; (b) a physical partition management unit that manages allocation and release of small size parts into which a physical memory is divided in a physical address space; and (c) a converter unit that converts an address between the logical address space and the physical address space.

3 Claims, 68 Drawing Sheets

FIG. 5

| MICRO-PARTITION NUMBER | ID | PHYSICAL STARTING ADDRESS | LENGTH | CORRESPONDING LOGICAL ADDRESS |
|---|---|---|---|---|
| 1 | 2 | 0x3000 | 0x0800 | (ID=2) 0x0000 TO 0x07FF |
| 2 | 3 | 0x3800 | 0x0800 | (ID=3) 0x0000 TO 0x07FF |
| 3 | 2 | 0x4000 | 0x0800 | (ID=2) 0x0800 TO 0x0FFF |
| 4 | 1 | 0x4800 | 0x0800 | (ID=1) 0x0000 TO 0x07FF |
| 5 | 3 | 0x5000 | 0x0800 | (ID=3) 0x0800 TO 0x0FFF |
| 6 | 2 | 0x5500 | 0x0800 | (ID=2) 0x1000 TO 0x17FF |

T01

T11
| MICRO-PARTITION NUMBER | 1 |
|---|---|
| ID | 2 |
| PHYSICAL STARTING ADDRESS | 0x3000 |
| LENGTH | 0x0800 |
| LOGICAL STARTING ADDRESS | 0x0000 |
| POINTER TO LINKED TABLE | |

T31
| MICRO-PARTITION NUMBER | 3 |
|---|---|
| ID | 2 |
| PHYSICAL STARTING ADDRESS | 0x4000 |
| LENGTH | 0x0800 |
| LOGICAL STARTING ADDRESS | 0x0800 |
| POINTER TO LINKED TABLE | |

T61
| MICRO-PARTITION NUMBER | 6 |
|---|---|
| ID | 2 |
| PHYSICAL STARTING ADDRESS | 0x5500 |
| LENGTH | 0x0800 |
| LOGICAL STARTING ADDRESS | 0x1000 |
| POINTER TO LINKED TABLE | END |

FIG. 24

| PHYSICAL PARTITION NUMBER | ID | PHYSICAL ADDRESS | STATUS |
|---|---|---|---|
| 1 | 2 | 0x30000000 TO 0x3000FFFF | WAITING |
| 2 | 5 | 0x30010000 TO 0x3001FFFF | WAITING |
| 3 | 2 | 0x30020000 TO 0x3002FFFF | WAITING |
| 4 | 2 | 0x30030000 TO 0x3003FFFF | WAITING |
| 5 | 5 | 0x30040000 TO 0x3004FFFF | WAITING |
| 6 | 2 | 0x30050000 TO 0x3005FFFF | WAITING |
| 7 | 2 | 0x30060000 TO 0x3006FFFF | WAITING |
| 8 | 2 | 0x30070000 TO 0x3007FFFF | WAITING |
| 9 | 0 | 0x400A0000 TO 0x400AFFFF | NOT IN USE |
| 10 | 0 | 0x400B0000 TO 0x400BFFFF | NOT IN USE |

SINCE FRAGMENTATION REACHES LOWER-MOST THRESHOLD VALUE, ALLOCATION CAN BE EXECUTED AGAIN.

PARTITIONS TO BE ALLOCATED AND RELEASED. FRAGMENTATION OCCURS IN EACH PARTITION.

PARTITIONS TO BE USED NEWLY. FRAGMENTATION OCCURS IN EACH PARTITION.

PARTITIONS NOT IN USE. NOT REGISTERED IN CONVERSION TABLE

FIG. 25

| MICRO-PARTITION NUMBER | 1 |
|---|---|
| ID | 2 |
| FLAG | WAITING |
| PHYSICAL STARTING ADDRESS | 0x3000 |
| LENGTH | 0x0800 |
| LOGICAL STARTING ADDRESS | 0x0000 |
| POINTER TO LINKED TABLE | |

| MICRO-PARTITION NUMBER | 3 |
|---|---|
| ID | 2 |
| FLAG | STOP |
| PHYSICAL STARTING ADDRESS | 0x4000 |
| LENGTH | 0x0800 |
| LOGICAL STARTING ADDRESS | 0x0800 |
| POINTER TO LINKED TABLE | |

| MICRO-PARTITION NUMBER | 6 |
|---|---|
| ID | 2 |
| FLAG | WAITING |
| PHYSICAL STARTING ADDRESS | 0x5500 |
| LENGTH | 0x0800 |
| LOGICAL STARTING ADDRESS | 0x1000 |
| POINTER TO LINKED TABLE | END |

FIG. 45

| MICRO-PARTITION NUMBER | N-1 |
|---|---|
| ID | 2 |
| FLAG | WAITING |
| PHYSICAL STARTING ADDRESS | 0x3000 |
| LENGTH | 0x0800 |
| LOGICAL STARTING ADDRESS | 0x0000 |
| POINTER TO LINKED TABLE | |

| MICRO-PARTITION NUMBER | N |
|---|---|
| ID | 2 |
| FLAG | STOP |
| PHYSICAL STARTING ADDRESS | 0x4000 |
| LENGTH | 0x0800 |
| LOGICAL STARTING ADDRESS | 0x0800 |
| POINTER TO LINKED TABLE | |

| MICRO-PARTITION NUMBER | N+1 |
|---|---|
| ID | 2 |
| FLAG | WAITING |
| PHYSICAL STARTING ADDRESS | 0x5500 |
| LENGTH | 0x0800 |
| LOGICAL STARTING ADDRESS | 0x1000 |
| POINTER TO LINKED TABLE | END |

FIG. 46

| MICRO-PARTITION NUMBER | N-1 |
|---|---|
| ID | 2 |
| FLAG | WAITING |
| PHYSICAL STARTING ADDRESS | 0x3000 |
| LENGTH | 0x0800 |
| LOGICAL STARTING ADDRESS | 0x0000 |
| POINTER TO FIRST MCB | |
| POINTER TO LINKED TABLE | |

| MICRO-PARTITION NUMBER | N |
|---|---|
| ID | 2 |
| FLAG | STOP |
| PHYSICAL STARTING ADDRESS | 0x4000 |
| LENGTH | 0x0800 |
| LOGICAL STARTING ADDRESS | 0x0800 |
| POINTER TO FIRST MCB | |
| POINTER TO LINKED TABLE | |

| MICRO-PARTITION NUMBER | N+1 |
|---|---|
| ID | 2 |
| FLAG | WAITING |
| PHYSICAL STARTING ADDRESS | 0x5500 |
| LENGTH | 0x0800 |
| LOGICAL STARTING ADDRESS | 0x1000 |
| POINTER TO FIRST MCB | |
| POINTER TO LINKED TABLE | END |

FIG. 51

| MICRO-PARTITION NUMBER | 1 | |
|---|---|---|
| ID | 2 | |
| FLAG | WAITING | |
| PHYSICAL STARTING ADDRESS | 0x3000 | |
| LENGTH | 0x0800 | |
| LOGICAL STARTING ADDRESS | 0x0000 | |
| POINTER TO MCB (SIZE#1) | | EG. SIZE#1=0x0000 TO 0x000F |
| POINTER TO MCB (SIZE#2) | | EG. SIZE#2=0x0010 TO 0x00FF |
| POINTER TO MCB (SIZE#3) | | EG. SIZE#3=0x0100 TO 0x0FFF |
| POINTER TO MCB (SIZE#4) | | EG. SIZE#4=0x1000 OR LARGER |
| POINTER TO LINKED TABLE | | |

FIG. 52

| MICRO-PARTITION NUMBER | N-1 |
|---|---|
| ID | 2 |
| FLAG | WAITING |
| PHYSICAL STARTING ADDRESS | 0x3000 |
| LENGTH | 0x0800 |
| LOGICAL STARTING ADDRESS | 0x0000 |
| POINTER TO MCB (SIZE#1) | |
| POINTER TO MCB (SIZE#2) | |
| POINTER TO MCB (SIZE#3) | |
| POINTER TO MCB (SIZE#4) | |
| POINTER TO LINKED TABLE | |

E.G. SIZE#1= 0x0000 TO 0x000F
E.G. SIZE#2= 0x0010 TO 0x00FF
E.G. SIZE#3= 0x0100 TO 0x0FFF
E.G. SIZE#4= 0x1000 OR LARGER

| MICRO-PARTITION NUMBER | N |
|---|---|
| ID | 2 |
| FLAG | STOP |
| PHYSICAL STARTING ADDRESS | 0x4000 |
| LENGTH | 0x0800 |
| LOGICAL STARTING ADDRESS | 0x0800 |
| POINTER TO MCB (SIZE#1) | |
| POINTER TO MCB (SIZE#2) | |
| POINTER TO MCB (SIZE#3) | |
| POINTER TO MCB (SIZE#4) | |
| POINTER TO LINKED TABLE | |

E.G. SIZE#1= 0x0000 TO 0x000F
E.G. SIZE#2= 0x0010 TO 0x00FF
E.G. SIZE#3= 0x0100 TO 0x0FFF
E.G. SIZE#4= 0x1000 OR LARGER

| MICRO-PARTITION NUMBER | N+1 |
|---|---|
| ID | 2 |
| FLAG | WAITING |
| PHYSICAL STARTING ADDRESS | 0x5500 |
| LENGTH | 0x0800 |
| LOGICAL STARTING ADDRESS | 0x1000 |
| POINTER TO MCB (SIZE#1) | |
| POINTER TO MCB (SIZE#2) | |
| POINTER TO MCB (SIZE#3) | |
| POINTER TO MCB (SIZE#4) | |
| POINTER TO LINKED TABLE | END |

E.G. SIZE#1= 0x0000 TO 0x000F
E.G. SIZE#2= 0x0010 TO 0x00FF
E.G. SIZE#3= 0x0100 TO 0x0FFF
E.G. SIZE#4= 0x1000 OR LARGER

FIG. 54A

| A: IN USE | B: NOT IN USE | C: IN USE | D: NOT IN USE | E: IN USE |
|---|---|---|---|---|

⇩ IF "C" IS RELEASED

| A: IN USE | B+C+D: NOT IN USE | | | E: IN USE |
|---|---|---|---|---|

PREVIOUS AREA NOT IN USE IS "B".
    (ADDRESS OF "B") + (LENGTH OF "B") = ADDRESS OF "C"
NEXT AREA NOT IN USE IS "D".
    (ADDRESS OF "C") + (LENGTH OF "C") = ADDRESS OF "D"

FIG. 54B

| A: NOT IN USE | B: IN USE | C: IN USE | D: NOT IN USE | E: IN USE |
|---|---|---|---|---|

⇩ IF "C" IS RELEASED

| A: NOT IN USE | B: IN USE | C+D: NOT IN USE | | E: IN USE |
|---|---|---|---|---|

PREVIOUS AREA NOT IN USE IS "A".
    (ADDRESS OF "A") + (LENGTH OF "A") < ADDRESS OF "C"
NEXT AREA NOT IN USE IS "D".
    (ADDRESS OF "C") + (LENGTH OF "C") = ADDRESS OF "D"

FIG. 54C

| A: IN USE | B: NOT IN USE | C: IN USE | D: IN USE | E: NOT IN USE |
|---|---|---|---|---|

⇩ IF "C" IS RELEASED

| A: IN USE | B+C: NOT IN USE | | D: IN USE | E: NOT IN USE |
|---|---|---|---|---|

PREVIOUS AREA NOT IN USE IS "B".
    (ADDRESS OF "B") + (LENGTH OF "B") = ADDRESS OF "C"
NEXT AREA NOT IN USE IS "E".
    (ADDRESS OF "C") + (LENGTH OF "C") < ADDRESS OF "E"

FIG. 54D

| A: NOT IN USE | B: IN USE | C: IN USE | D: IN USE | E: NOT IN USE |
|---|---|---|---|---|

⇩ IF "C" IS RELEASED

| A: NOT IN USE | B: IN USE | C: NOT IN USE | D: IN USE | E: NOT IN USE |
|---|---|---|---|---|

PREVIOUS AREA NOT IN USE IS "A".
    (ADDRESS OF "A") + (LENGTH OF "A") < ADDRESS OF "C"
NEXT AREA NOT IN USE IS "E".
    (ADDRESS OF "C") + (LENGTH OF "C") < ADDRESS OF "E"

MEMORY MANAGEMENT SYSTEM

CROSS-REFERENCE TO RELATED APPLICATIONS

This application is a divisional application of U.S. patent application Ser. No. 12/607,673 filed Oct. 28, 2009, now U.S. Pat. No. 8,291,192 and relates to and claims priority rights from Japanese Patent Applications:
No. 2008-279210, filed on Oct. 30, 2008,
No. 2009-020810, filed on Jan. 30, 2009,
No. 2009-047280, filed on Feb. 27, 2009, and
No. 2009-047281, filed on Feb. 27, 2009,
the entire disclosures of which are hereby incorporated by reference herein.

BACKGROUND OF THE INVENTION

1. Field of the Invention

This invention relates to memory management systems.

2. Description of the Related Art

Some electronic apparatuses have memory devices such semiconductor memory or magnetic disc, and the electronic apparatuses are technically required to efficiently manage memories. A memory is allocated as a required area when necessary, and released after finishing using the memory to re-use it. Repeatedly performing such allocation and release of memories results in fragmentation, that is, a state where available memory areas separately exist in an address space, and consequently, a large continuous memory area can not be allocated even though the memory usage rate is still low.

In ordinary techniques, data processing apparatuses such as image forming apparatus use some memory management methods as follows in order to tend not to result in fragmentation and not to cause decline of throughput due to waiting for free area in a memory, transferring data within a memory and so on. In a method, if a page detection processing unit detects the beginning of a page, then a memory resource allocation unit allocates a memory; and then the memory is divided into partitions, and memory areas for input data and processed data are allocated in the partitions. While a data processing unit generates the processed data and stores it in a memory area for the processed data, the memory resource release unit releases unnecessary memory areas. The released unnecessary memory areas will be a part of free areas in the partition specified for the processed data.

In another method, to provide a host device capable of writing at high speed, a management system allocates unit blocks in a memory area in turn to obtain a writing area for storing writing data, and sets a management block as some natural number of the allocates unit blocks, and allocates the management block as the writing area for a writing function call with regard to a writing speed of the management block; and then a controller provides an instruction to a memory card to write data in the unit blocks allocated by the management system.

SUMMARY OF THE INVENTION

A memory management system according to an aspect of this invention has: a logical partition management unit that manages allocation and release of a virtual memory used by an application in a logical address space; a physical partition management unit that manages allocation and release of small size parts into which a physical memory is divided in a physical address space; and a converter unit that converts an address between the logical address space and the physical address space.

A memory management system according to an aspect of this invention has: a memory-control-block table management unit that has memory-control-block table, and manages memory allocation in a physical address space by using the memory-control-block table, the memory-control-block table having memory-control-blocks of which each indicates an allocation position of a physical memory; and a memory-control-block control table management unit that has a memory-control-block table control table which organizes the memory-control-blocks for each application, and manages memory allocation using the memory-control-block table control table for each application.

A memory management system according to an aspect of this invention has: a logical partition management unit that manages allocation and release of a virtual memory used by an application in a logical address space; a physical partition management unit that manages allocation and release of small-size physical partitions into which a physical memory is divided in a physical address space; and a converter unit that converts an address between the logical address space and the physical address space. The physical partition management unit watches fragmentation rates in the physical partitions, and prohibits physical memory allocation in the physical partition in which the fragmentation rate exceeds a predetermined upper-most threshold value.

A memory management system according to an aspect of this invention has: a logical partition management unit that manages allocation and release of a virtual memory used by an application in a logical address space; a physical partition management unit that manages allocation and release of small-size parts into which a physical memory is divided in a physical address space; and a converter unit that converts an address between the logical address space and the physical address space. The physical partition management unit identifies sizes of parts not in use out of the small-size parts, and searches the parts not in use for a part having a size specified in a memory allocation request and selects the part having the size for the memory allocation request.

These and other objects, features and advantages of the present invention will become more apparent upon reading of the following detailed description along with the accompanied drawings.

BRIEF DESCRIPTION OF THE DRAWINGS

FIG. 5 shows an instance of a conversion table in Embodiment 1;

FIG. 24 shows a diagram which indicates a relationship between a memory map and physical partitions in Embodiment 3 (when return to waiting for memory allocation);

FIG. 25 shows an instance of a conversion table in Embodiment 3;

FIG. 45 shows an instance of a conversion table in case that memory blocks not in use are linked through all physical partitions in a list structure;

FIG. 46 shows an instance of a conversion table in case that physical partitions separately have respective list structures of memory blocks not in use;

FIG. 51 shows an instance of a conversion table in case that list structures are used corresponding to respective allocation sizes of memory blocks not in use;

FIG. 52 shows an instance of linkage in a conversion table in case that list structures are used corresponding to respective allocation sizes of memory blocks not in use;

FIGS. 54A to 54D show diagrams for explaining memory release in case of one list structure of memory blocks not in use;

DETAILED DESCRIPTION OF THE PREFERRED EMBODIMENT

Embodiment 1

Partition

Figure 1A:
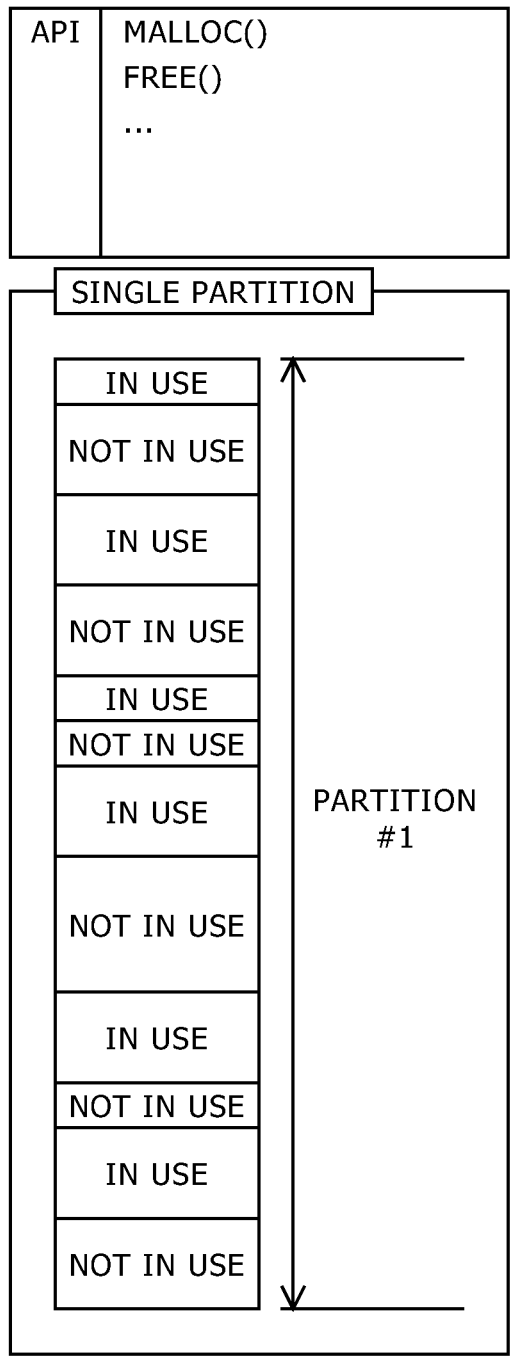
FIG. 1A shows a diagram for explaining an instance of ordinary partitions.
Figure 2A:
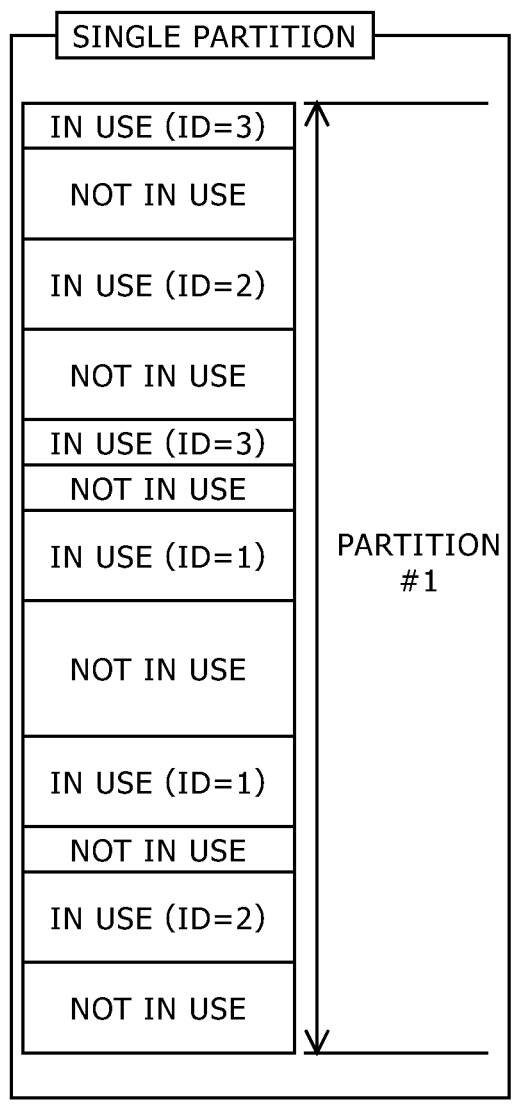
FIGS. 2A and 2B show memory allocation to the ordinary partitions.
Figure 2B:
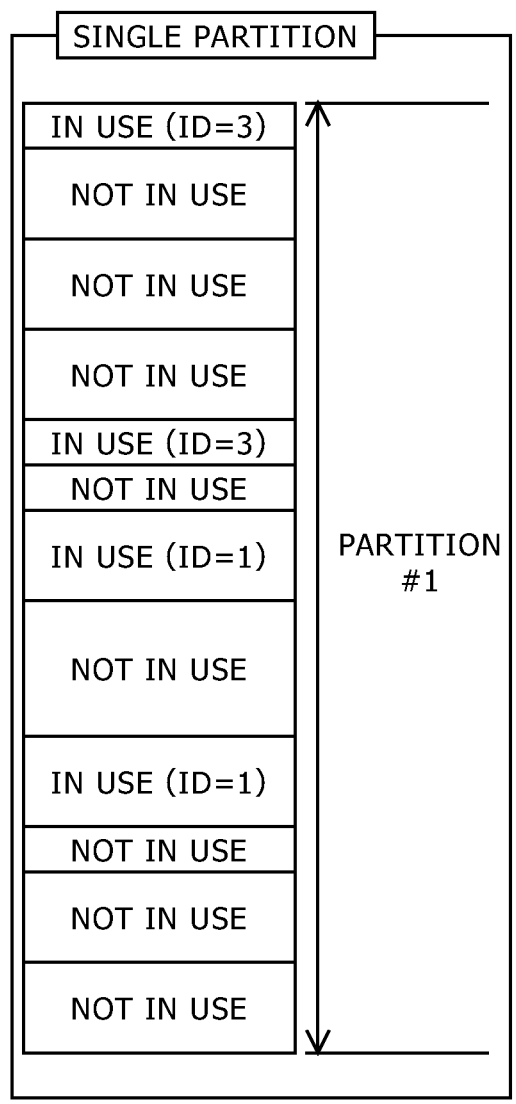

FIG. 1A shows a diagram for explaining physical memory allocation in an address space of an ordinary memory management system. The ordinary memory management system uses the address space as a single partition, and performs physical memory allocation (malloc( )) and release (free( )) by using memory management APIs (Application Program Interfaces) in the single partition. Under such memory management, repeatedly performing physical memory allocation and release results in fragmentation, that is, areas in use and areas not in use are separately positioned as shown in FIG. 2A to FIG. 2B, and therefore, it is not possible to allocate a large continuous physical memory area without transferring data within the physical memory. It takes a lot of time to transfer data within the physical memory, and the physical memory is considerably limited to be used while transferring data, and thus this would be a large problem in an electronic apparatus such as image forming apparatus performing a real-time process.

Figure 1B:
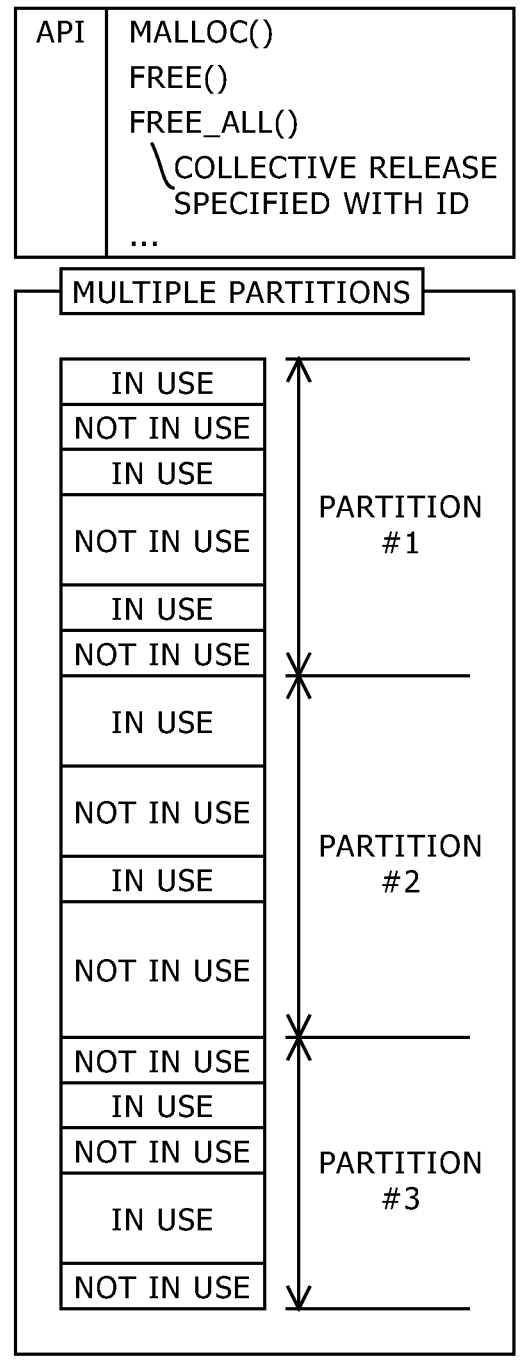
FIG. 1B shows a diagram for explaining an instance of partitions according to Embodiment 1 of this invention.
Figure 3A:
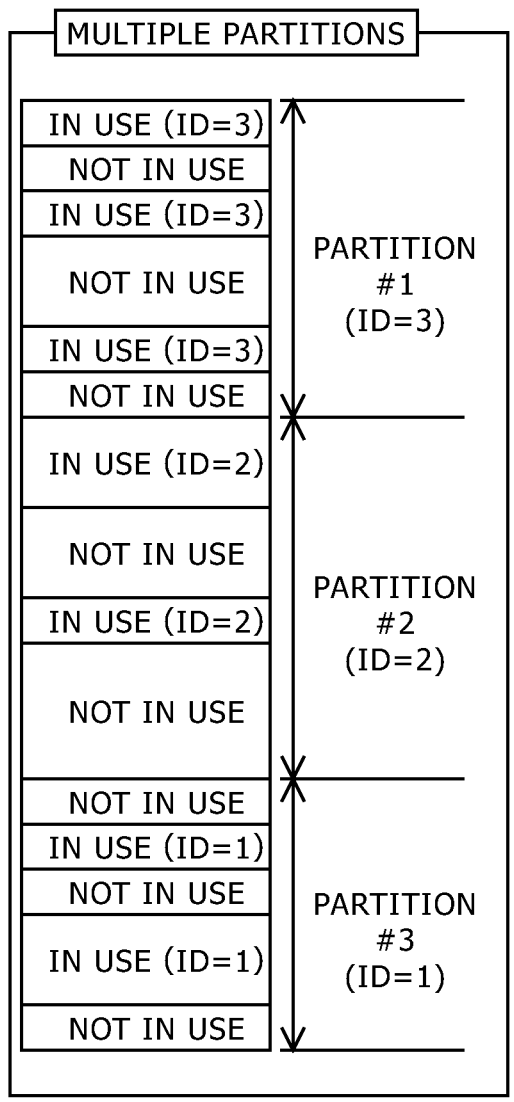
FIGS. 3A and 3B show memory allocation to the partitions according to Embodiment 1.
Figure 3B:
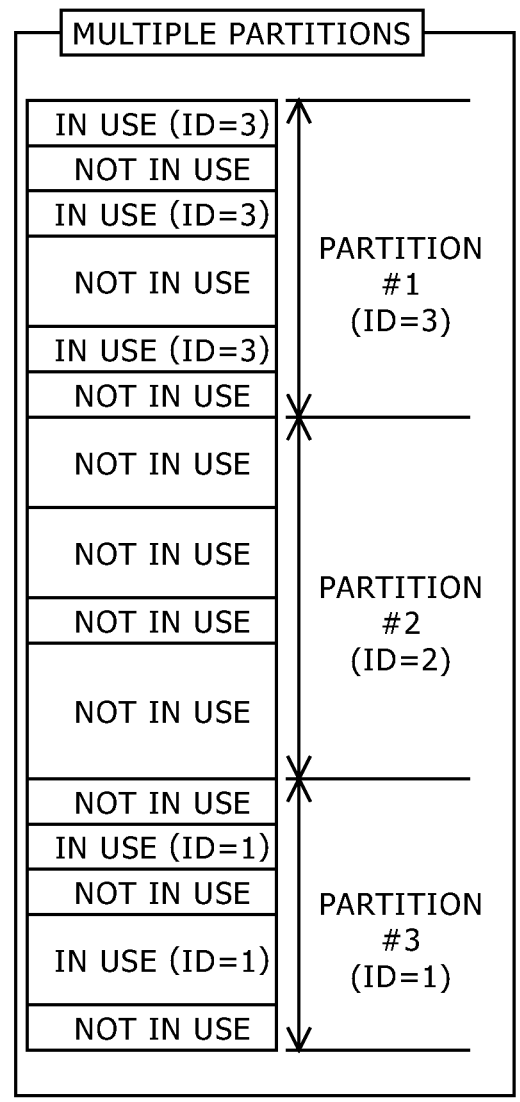

FIG. 1B shows a diagram for explaining allocation of a physical address space in case of the physical address space is divided into partitions according to Embodiment 1 of this invention. As shown in FIG. 3A, a whole physical address space is divided into a plurality of partitions and each of the partition has an ID, and then partition is assigned to an application by associating the ID of the partition with the application. In FIG. 3B, if a collective memory release with specifying ID=2 is performed for partitions with ID=2 (that is, free_all(ID=2) in FIG. 1B is executed) when the application with which ID=2 is associated ends, then a large continuous address space becomes available.

However, in the method dividing a physical memory space into partitions, if there is a large difference between an initially defined partition size and an actually used memory size, then physical memory available within a partition may not be enough to allocate a large continuous physical address space.

Therefore, in Embodiment 1 of this invention, this problem is solved by converting a logical address space required by an application into a physical address space of micro-partitions into which a physical memory space is divided.

[Configuration]

Figure 4:
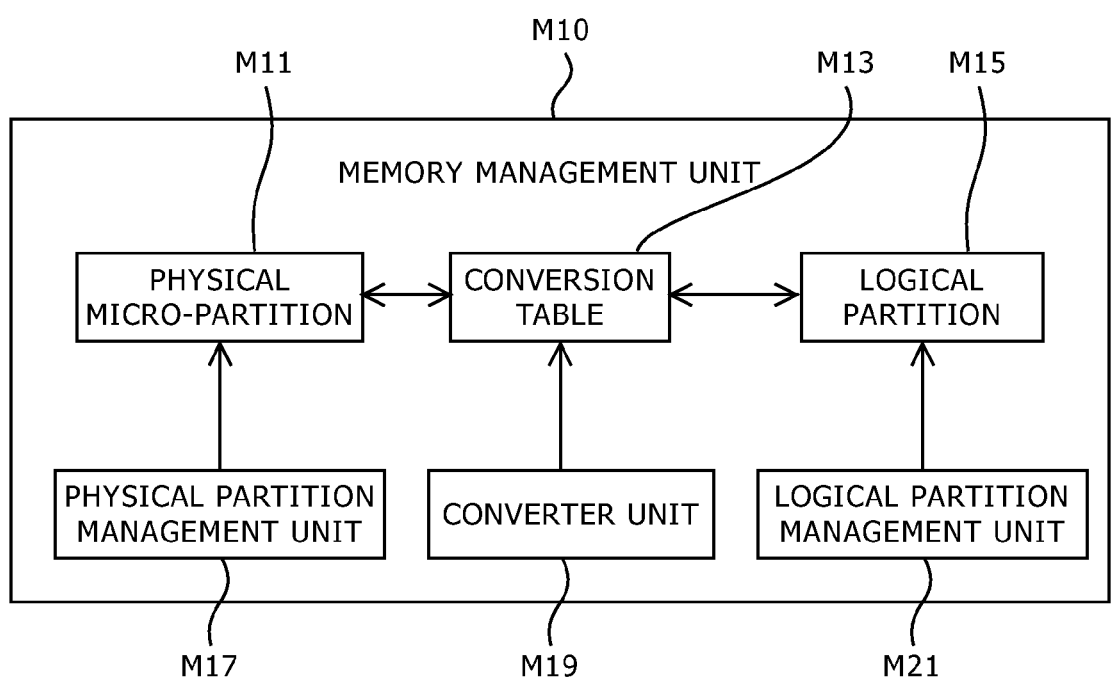
FIG. 4 shows a functional block diagram of a memory management system in Embodiment 1.

FIG. 4 shows a functional block diagram of a memory management system of Embodiment 1.

A memory management unit M10 has functional units: a physical partition management unit M17, a converter unit M19, and a logical partition management unit M21.

The functional units access a physical micro-partition M11 in a physical address space, generate and delete a conversion table M13 between the physical address space and a logical address space, and access logical partitions M15 in the logical address space.

Below explained are operations of the functional units.

The logical partition management unit M21 manages allocation of a virtual memory to be used by an application in a logical address space, and manages partitions (i.e. the logical partition M15) into which the allocated virtual memory is divided. Each of the logical partitions has continuous logical addresses for an application.

The converter unit M19 performs address conversion between the logical address space and the physical address space. In the address conversion, used is the conversion table M13 in which a logical address in the logical address space and a physical address in the physical address space are associated with each other (detailed is mentioned below). Specifically, the converter unit M19 obtains areas not in use in the virtual memory and the physical memory from the logical partition management unit M19 and the physical partition management unit M17, respectively, and associates the physical address space with the logical address space. The converter unit M19 generates and deletes a conversion table M13 according to memory usage status of an application. Specifically, the converter unit M19 generates a conversion table M13 according to a request due to startup or an operation of an application, and deletes the conversion table M13 according to the end of the application.

The physical partition management unit M17 manages allocation and release of a physical memory based on physical micro-partitions M11 into which the physical memory is divided in the physical address space.

[Conversion Table and Micro-Partition]

In the following part, the conversion table is explained with reference to FIG. 5. As shown in a conversion table T01, a physical address space is divided into micro-partitions, and each of the micro-partitions has a size of 0x0800 (this size is an instance, can be another size). Each of the micro-partitions has an ID, a physical address, and a logical address corresponding to the physical address. The ID in a micro-partition indicates an application which uses the micro-partition.

For instance, regarding micro-partitions used by an application of ID=2, the first micro-partition is a micro-partition which has the micro-partition number of 1 among micro-partitions of ID=2 as shown in a conversion table T11. The pointer to the linked table in the conversion table T11 specifies the next conversion table T31 of a micro-partition which has the micro-partition number of 3. The pointer to the linked table in the conversion table T31 specifies the next conversion table T61 of a micro-partition which has the micro-partition number of 6.

As mentioned above, the converter unit M19 is capable of converting physical addresses separately allocated in a physical address space by the physical partition management unit M17 to continuous logical addresses. Further, the logical partition management unit M15 is capable of allocating the continuous logical addresses obtained from the converter unit M19 to the virtual memory space to be used by an application.

Figure 6A:
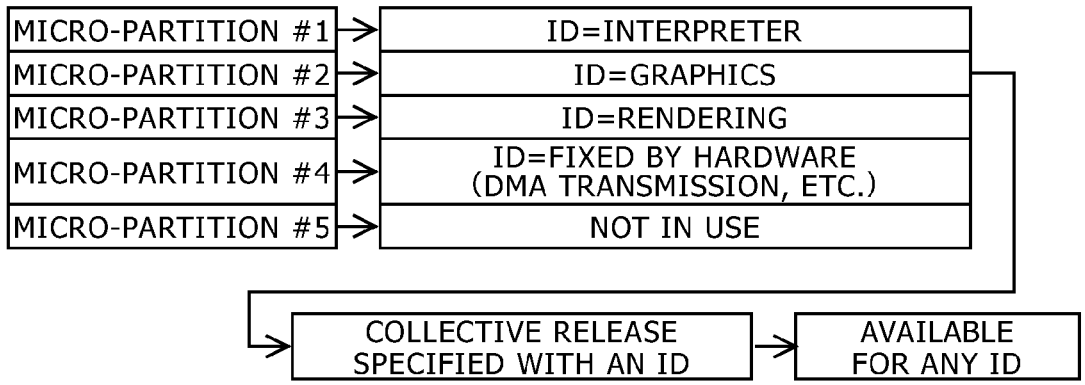
FIGS. 6A to 6C show diagrams for explaining usage instances of micro-partitions in Embodiment 1; F

FIG. 6A shows an instance of collective physical memory release corresponding to a specified an ID. In this case, the micro-partition #2 has been exclusively used for a graphic application, but since the graphic application ends, a physical memory of the micro-partition #2 becomes unnecessary. Thus, the physical partition management unit M17 performs collective memory release with specifying the ID=Graphics (i.e. the ID of the graphic application). Tracing the pointers to the linked tables and identifying positions of physical memory areas from the conversion tables such as the conversion tables T11 to T61, all of the physical memories that has been allocated of ID=Graphics are released together. Consequently, the micro-partitions are released. The released micro-partitions are available for another application.

Figure 6B:
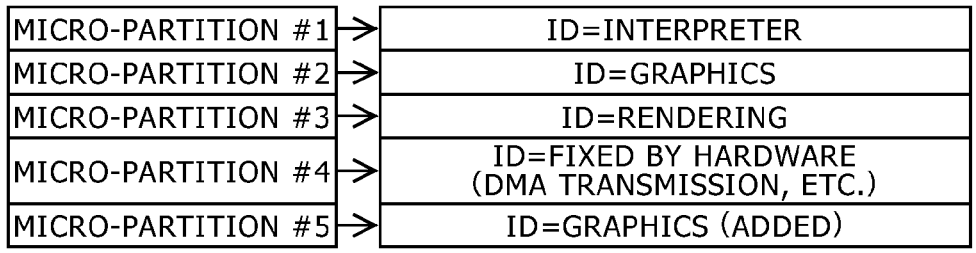

FIG. 6B shows an instance of re-allocation of a physical memory partition which has been allocated. If a physical memory space originally allocated by the physical partition management unit M17 runs short, then the micro-partition #5 not in use is newly allocated of ID=Graphics. In this case, the physical address spaces are separately positioned, but the logical address space is still continuous. Consequently, the micro-partition is added.

Figure 6C:
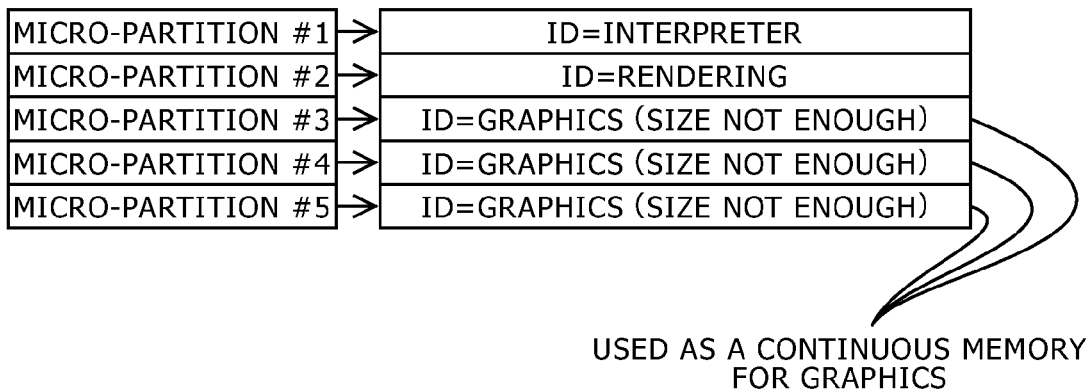

FIG. 6C shows an instance of allocation of a plurality of new micro-partitions. If an address space required for allocation is greater than the size of one micro-partition, then pluralities of micro-partitions (e.g. three micro-partitions #3 to #5 in FIG. 6C) can be allocated. Consequently, it is possible to allocate a memory larger than the size of one micro-partition.

Figure 7:
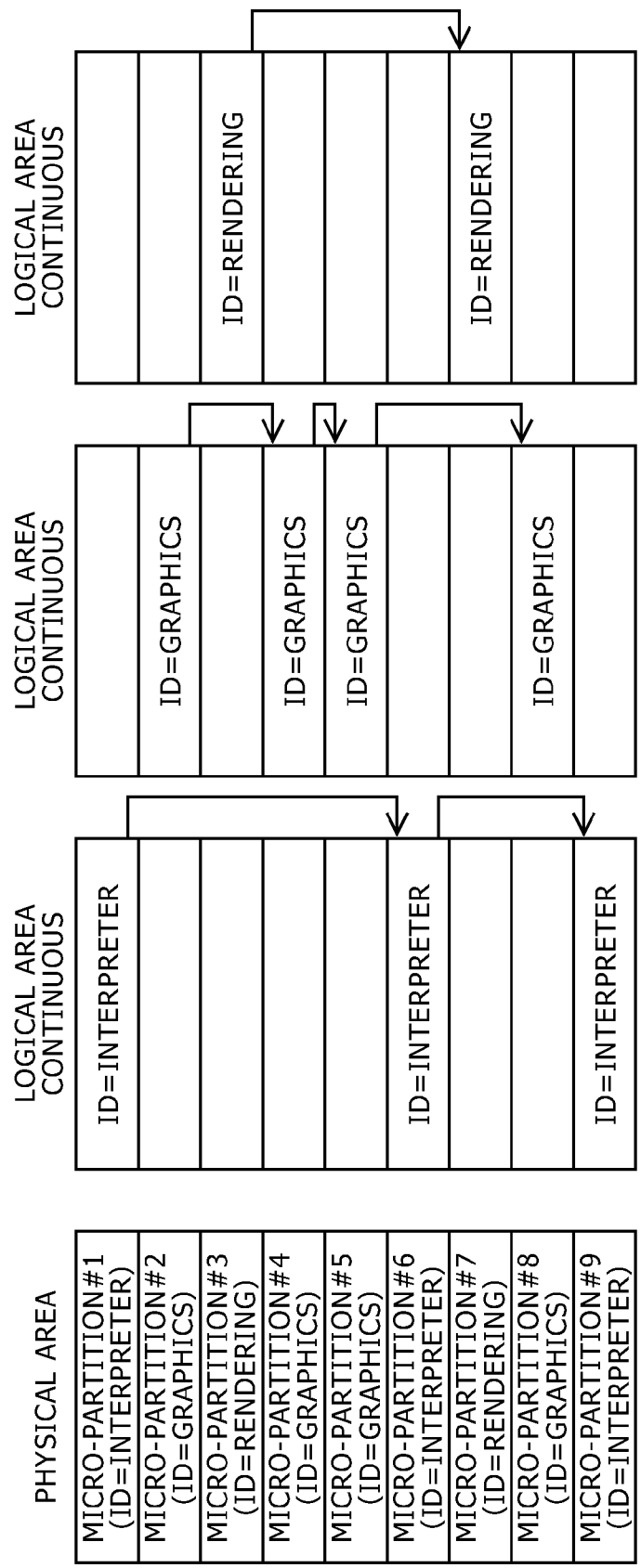
FIG. 7 shows an instance of allocating micro-partitions for a certain size in Embodiment 1.

Referring to FIG. 7, it will be explained that a continuous logical address space is obtained even if areas of micro-partitions in a physical address space are separately positioned. In FIG. 7, for instance, physical memories used by the application of ID=Interpreter are separately positioned in the micro-partitions #1, #6 and #9. However, since the converter unit M19 performs address conversion between physical addresses and logical addresses using the conversion table M13, the logical partition management unit M21 can access a continuous memory space with the logical addresses. The same memory management is performed for applications of ID=Graphics and ID=Rendering.

A logical partition is a collective body of physical micro-partitions having a same ID. A logical partition of the application "Interpreter" consists of three physical micro-partitions. A logical partition of the application "Graphics" consists of four physical micro-partitions. A logical partition of the application "Rendering" consists of two physical micro-partitions. The size of a logical partition (i.e. a collective body of physical micro-partitions) can be changed dynamically.

Figure 8:
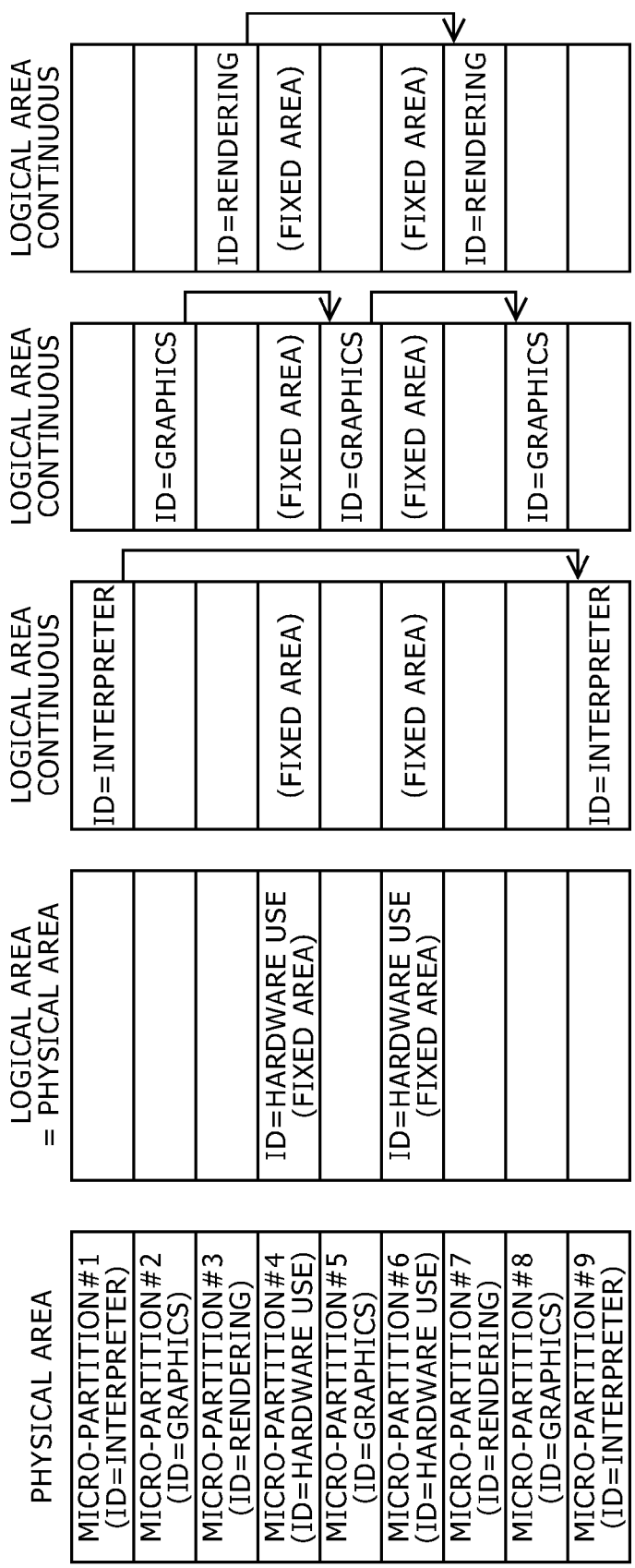
FIG. 8 shows a diagram for explaining micro-partitions specified as fix areas in Embodiment 1.

Referring to FIG. 8 as an instance, allocating micro-partitions to fixed memory areas will be explained. Some hardware such as DMA (Direct Memory Access) directly accesses an address space of a physical memory. This memory management system works well even if the hardware accesses fixed addresses. The converter unit M19 sets the ID of a micro-partition in the conversion table M13 as a value indicating that this micro-partition is fixed by hardware. The micro-partition with the ID of such value is a fixed area, and thus, the physical partition management unit M17 does not use such micro-partition (i.e. fixed area) for allocation even if a memory allocation request is received from the physical partition management unit M21. As shown in FIG. 8, even if memory allocation requests are received from the physical partition management unit M21 for the applications "Interpreter", "Graphics" and "Rendering", physical addresses of micro-partitions are allocated other than the fixed micro-partitions having the ID of such value. Therefore, the micro-partitions used for the applications do not compete with the micro-partitions fixed by hardware.

"Fixed by hardware" means requirement for fixing physical addresses to be used by specific hardware such as DMA transfer. Logical partitions (for the Interpreter, the Graphics and the Rendering) are allocated (mapped) to areas other than areas fixed by hardware.

[Advantages of Embodiment 1]

Advantages of the memory management system of Embodiment 1 are as follows.

It is possible to avoid fragmentation effectively.

Multiple partitions and dynamic movement of boundaries of partitions are used to avoid fragmentation effectively.

The order of releasing memories is not limited, and a memory which becomes unnecessary can be released immediately.

Embodiment 2

Figure 9A:
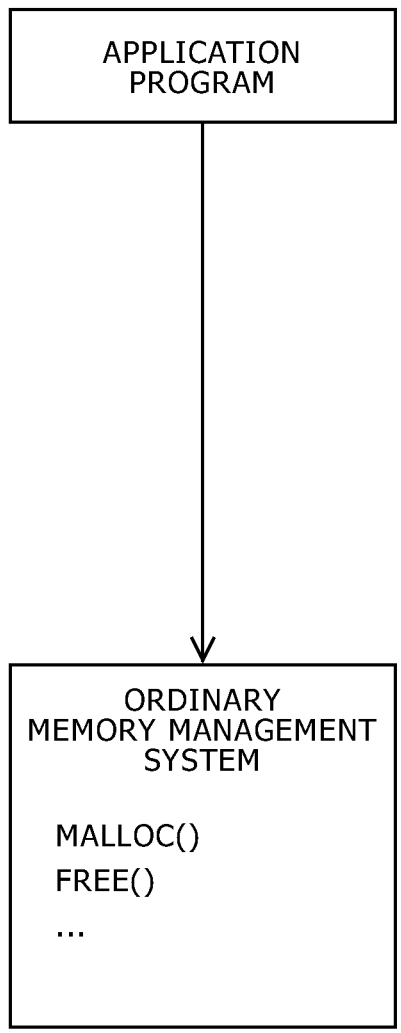
FIG. 9A shows a diagram which indicates an instance of an ordinary memory management system.
Figure 17:
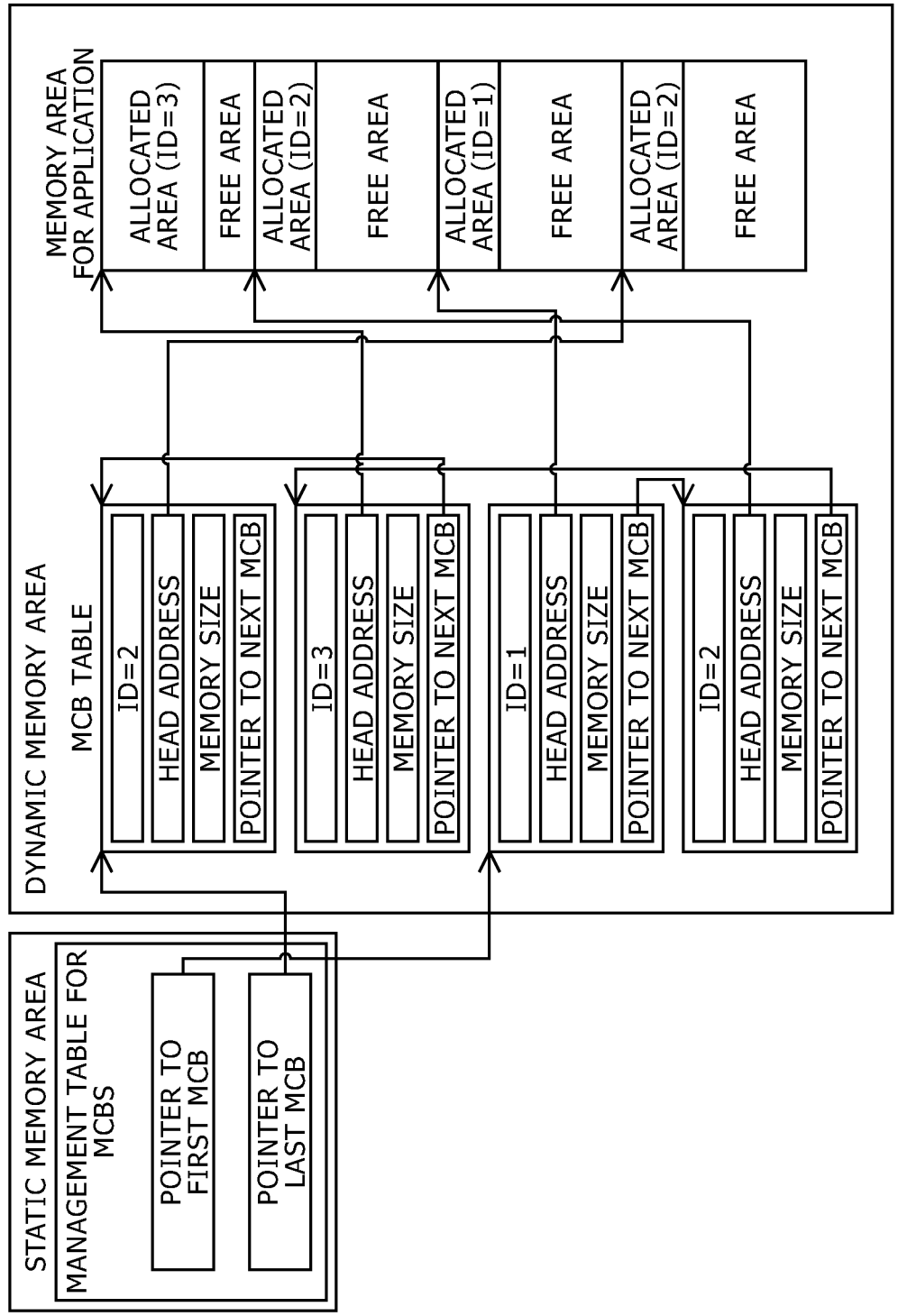
FIG. 17 shows a diagram that indicates a configuration of tables for collective memory release in an ordinary memory management system.

FIG. 9A shows a diagram for explaining memory allocation in an address space of an ordinary memory management system. The ordinary memory management system uses the address space as a single partition, and performs memory allocation (malloc( )) and release (free( )) by using memory management APIs (Application Program Interfaces) in the single partition. Under such memory management, repeatedly performing memory allocation and release results in fragmentation, that is, areas in use and areas not in use are separately positioned as shown in FIG. 17, and therefore, it is not possible to allocate a large continuous memory area without transferring data within the memory. However, it takes a lot of time to transfer data within the memory, and the memory is considerably limited to be used while transferring data, and thus this would be a large problem in an electronic apparatus such as image forming apparatus performing a real-time process.

Figure 9B:
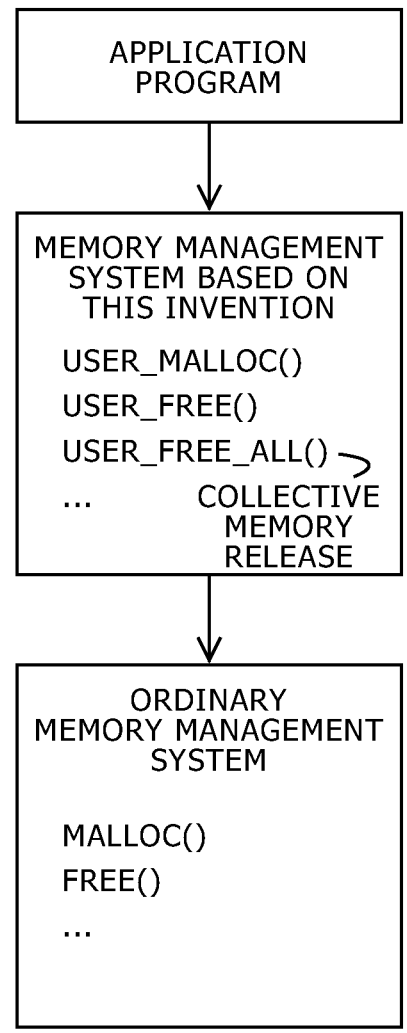
FIG. 9B shows a diagram which indicates an instance of a memory management system according to Embodiment 2 of this invention.
Figure 12:
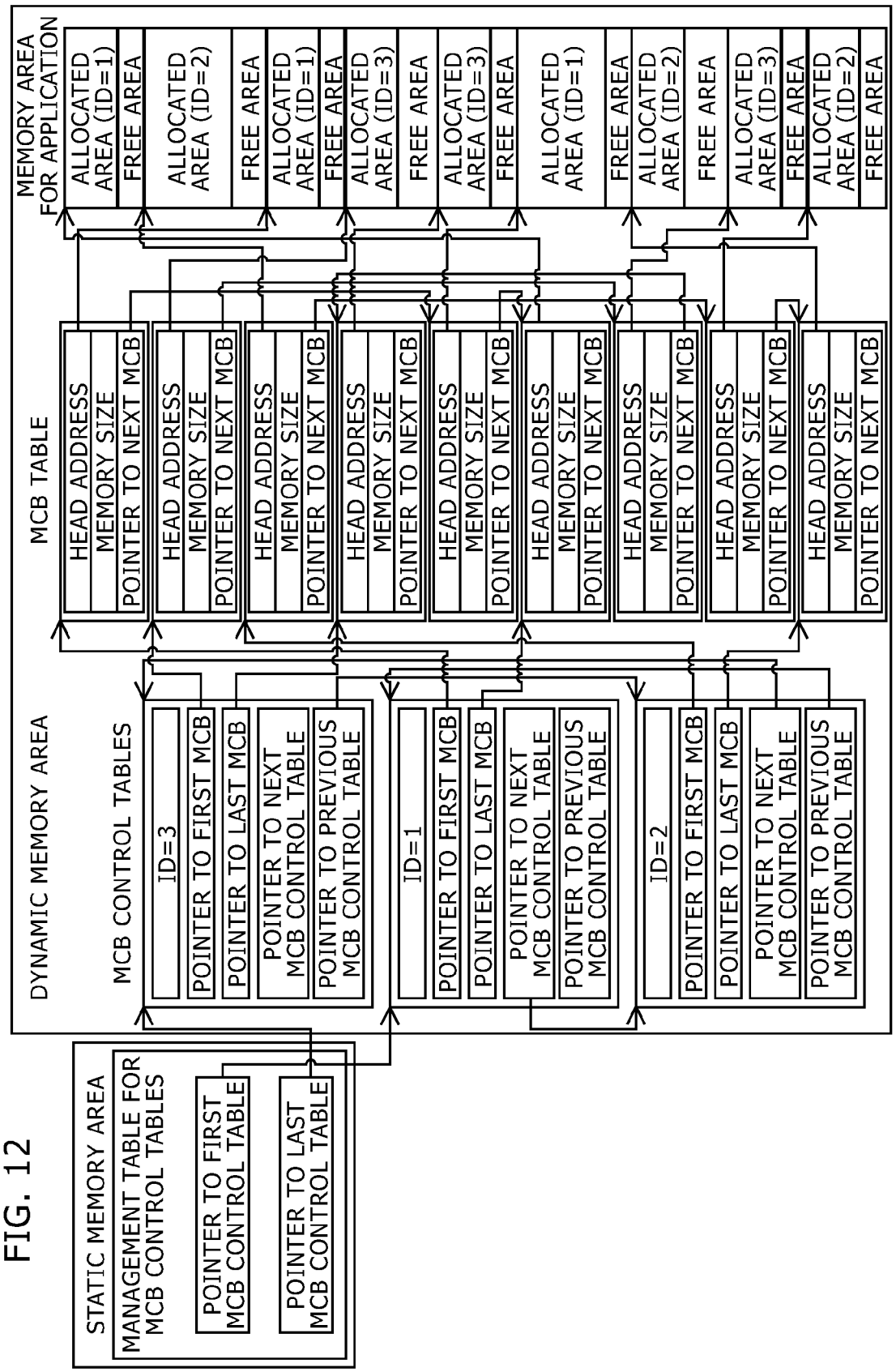
FIG. 12 shows a diagram which indicates an instance of a table configuration for collective memory release in the memory management system according to Embodiment 2 of this invention.

FIG. 9B shows a diagram for explaining a memory management system of Embodiment 2. This invention realizes a new specific memory management system capable of collective memory release. In this memory management system, specific functions of "user_malloc( )", "user_free( )" and "user_free_all( )" have been defined, and the specific functions call and use the predefined functions malloc( ) and free( ) according to a specific algorithm of the memory management system. In this invention, a whole physical address space is divided into a plurality of partitions and each of the partition has an ID, and then partition is assigned to an application by associating the ID of the partition with the application. In FIG. 12, if a collective memory release with specifying ID=2 is performed for partitions with ID=2 (that is, user_free_all(ID=2) in FIG. 9B is executed) when the application with which ID=2 is associated ends, then a large continuous address space becomes available.

[Configuration]

Figure 10:
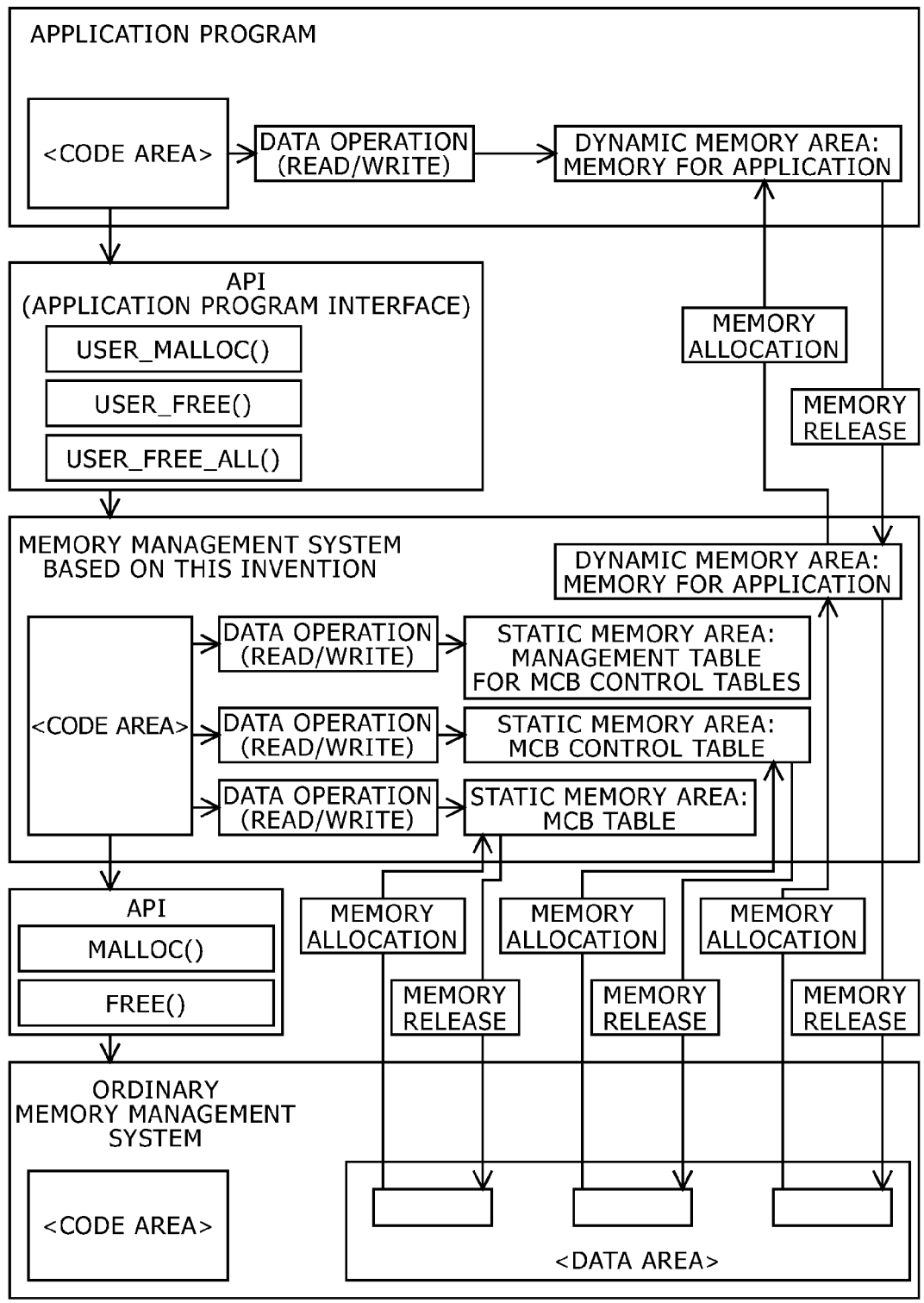
FIG. 10 shows a diagram which indicates a system configuration of the memory management system according to Embodiment 2 of this invention.

Referring to FIG. 10, a role of the memory management system in a whole program of Embodiment 2 will be explained.

An application calls and uses the APIs "user_malloc( )", "user_free( )" and "user_free_all( )" to handle dynamic memory area in this memory management system. When the APIs are called, the memory management system manages a memory by using a management table for MCB (Memory Control Block) control tables in a static memory area, and an MCB control table and an MCB block table in a dynamic memory area. The memory management system calls system APIs of memory allocation and release, that is, malloc( ) and free( ) to perform memory allocation and release using the ordinary memory management system.

Figure 11A:
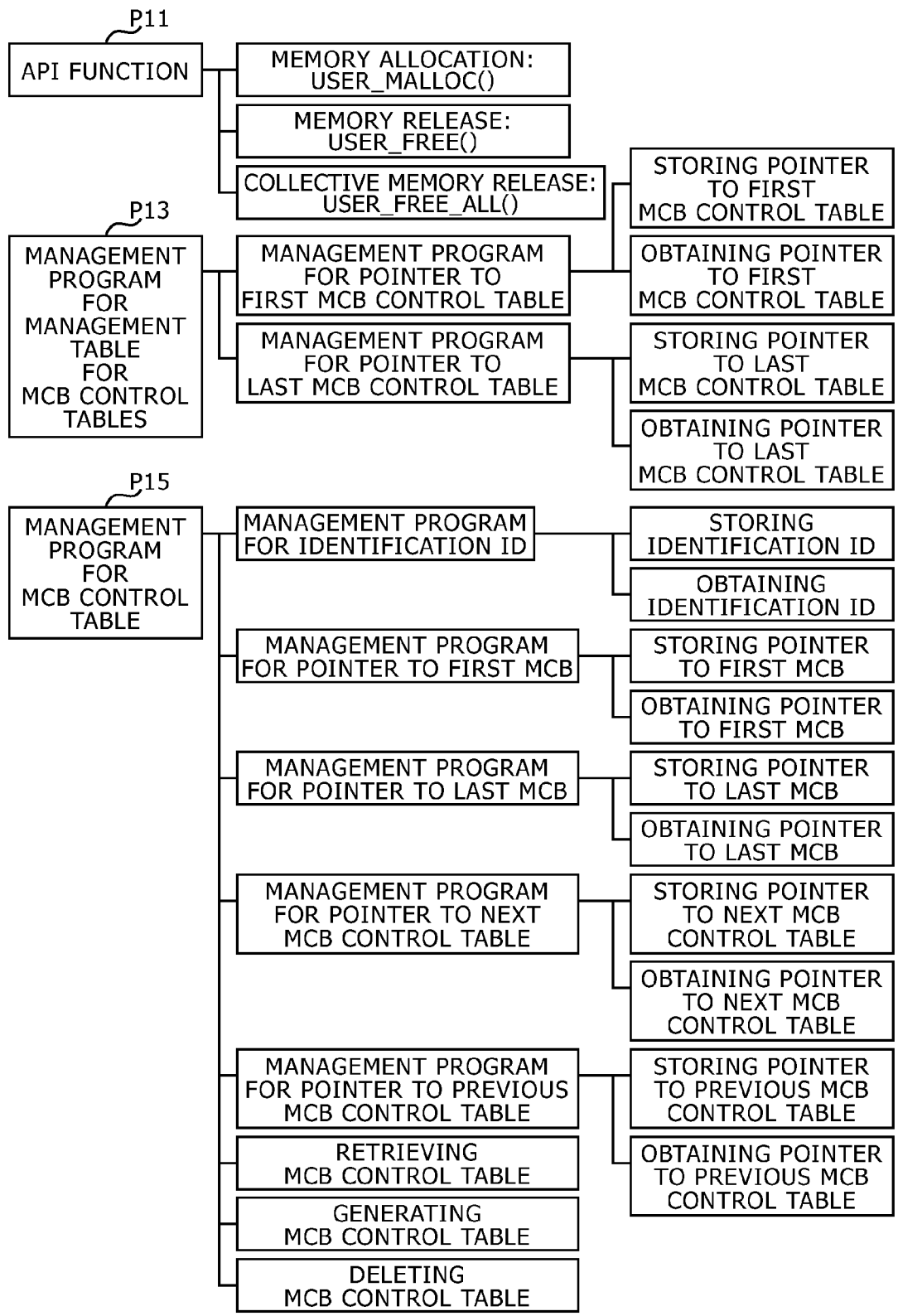
FIGS. 11A and 11B show a diagram which indicates a software configuration in the memory management system according to Embodiment 2 of this invention.
Figure 11B:
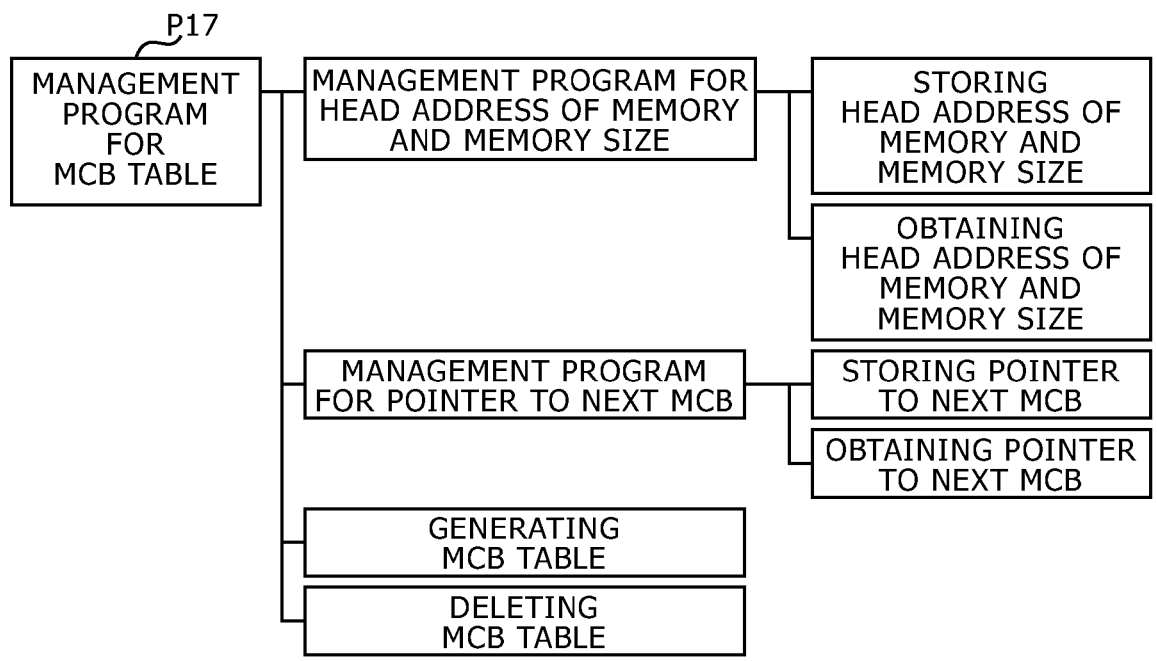

FIGS. 11A and 11B show a diagram which indicates a software configuration in the memory management system according to Embodiment 2. The memory management system has API functions P11, a management program P13 for the management table for MCB control tables, a management program P15 for an MCB control table (i.e. memory-control-block control table management unit), and a management program P17 for an MCB table (i.e. memory-control-block table management unit).

The API functions P11 receive requests of memory allocation, release, and collective release for an application program. In general, a programmer writes system functions such as malloc( ) and free( ) in his/her application program to realize memory management. On the other hand, in this memory management system, since the specific API functions (user_malloc( ), user_free( ) and user_free_all( )) are used for memory management of each application, especially user_free_all( ) is used for collective memory release, programmer's burden is reduced.

The management program P13 performs conversion between physical memory addresses in a physical memory address space allocated with MCBs (in a dynamic memory area) and logical memory addresses in a logical memory address (in a static memory area). Further, the management program P13 manages a pointer to the first MCB control block (mentioned below) and a pointer to the last MCB control block (mentioned below).

Using an MCB control table which organizes MCB tables for respective applications, the management program P15 (i.e. the memory-control-block control table management unit) manages memory allocation of a physical memory managed by the memory-control-block table management unit for each application.

Using an MCB table which indicates allocation positions of physical memories, the management program P17 (i.e. the memory-control-block table management unit) manages memory allocation in a physical address space.

[MCB Table and MCB Control Table]

Referring FIG. 17, an ordinary MCB table will be explained. As shown in FIG. 17, a memory area for an application contains areas specified by respective memory control blocks in the MCB table. A memory control block has an identification ID that indicates the application which requests allocation, but all of memory control blocks are managed with the MCB control table. Therefore, each of all blocks in the MCB table must be checked in order to perform memory management for each application (e.g. for collective memory release when an application ends).

A configuration of the MCB table in the memory management system of Embodiment 2 is shown in FIG. 12. Each memory block in the MCB table refers to a memory area for an application, and the MCB control table refers to memory blocks in the MCB table corresponding to an application. A block (i.e. an MCB control table) among the MCB control tables is used to manage a memory area allocated by an application, and the block has a pointer to the first MCB. Each MCB has a pointer to the next MCB allocated by the same application, and consequently the MCBs concatenated by the pointer forms a list structure. Therefore, for collective memory release, a block (i.e. an MCB control table) used by an application are identified among the MCB control tables, and then the MCBs for the application are identified from the identified block, and memory areas used by the application are identified from the identified MCBs. By tracing the list structure, finally the last MCB can be found, and thus, it is possible to easily perform collective memory release.

[Operations of the Ordinary Memory Management System—Flowcharts]

Memory operations of the ordinary memory management system will be explained with reference to flowcharts shown in FIGS. 18 to 21.

Figure 18:
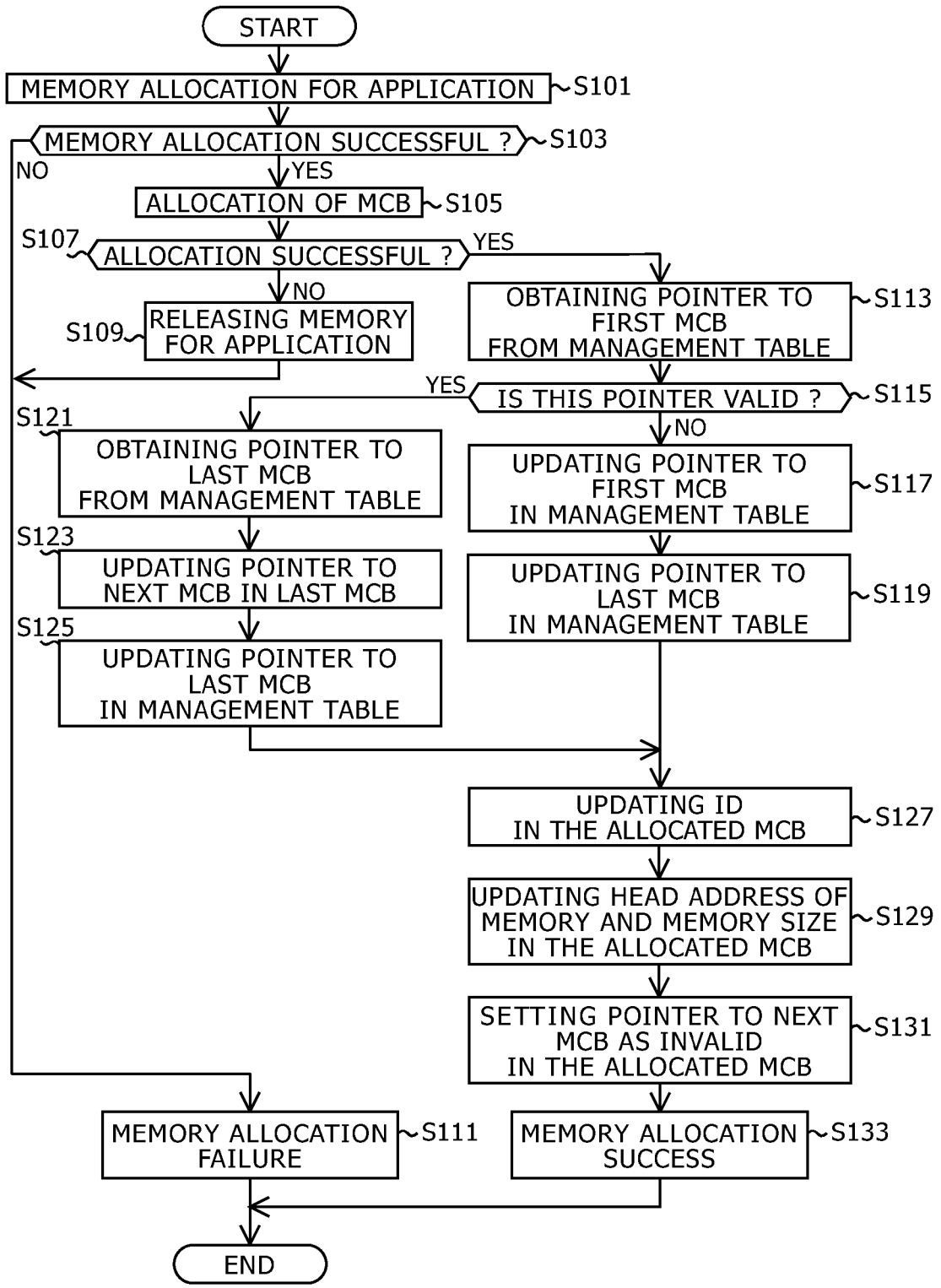
FIG. 18 shows a flowchart of memory allocation performed by the ordinary memory management system.

Referring to FIG. 18, ordinary memory allocation is explained.

Step S101: A memory for an application is allocated.

Step S103: It is determined whether or not the memory allocation is successful. If the memory allocation is successful, then Step S105 is next executed. If the memory allocation is not successful, then Step S111 is next executed.

Step S105: An MCB is allocated for the memory allocated in Step S101.

Step S107: It is determined whether or not the allocation of the MCB is successful. If the allocation is successful, then a new MCB is added into the MCB table, and Step S113 is next executed. If the allocation is not successful, then Step S109 is next executed.

Step S109: Since the allocation of the MCB is not successful, the memory allocated in Step S101 for the application is released.

Step S111: Since the memory allocation is failed, this process ends.

Step S113: A pointer to the first MCB is obtained from the management table for MCBs.

Step S115: It is determined whether or not the pointer to the first MCB is valid. If the pointer to the first MCB is valid, then Step S121 is next executed. If the pointer to the first MCB is not valid (i.e. there were not MCBs before the allocation in Step S101), then Step S117 is next executed.

Step S117: The pointer to the first MCB is updated in the management table for MCBs, with the pointer to the MCB allocated in Step S105.

Step S119: A pointer to the last MCB is updated in the management table for MCBs, with the pointer to the MCB allocated in Step S105.

Step S121: A pointer to the last MCB is obtained from the management table for MCBs.

Step S123: A pointer to the next MCB is updated in the last MCB in the MCB table, with the pointer to the MCB allocated in Step S105.

Step S125: The pointer to the last MCB is updated in the management table for MCBs, with the pointer to the MCB allocated in Step S105.

Step S127: An identification ID is set in the allocated MCB, with the ID of the application.

Step S129: A memory head address and a memory size are set in the allocated MCB, with the head address and the size of the memory allocated in Step S101.

Step S131: A pointer to the next MCB is set as invalid in the allocated MCB, since the allocated MCB is added as the last MCB.

Step S133: Memory allocation is succeeded.

By a series of the aforementioned operations in the ordinary method, a memory area for an application is allocated.

Figure 19:
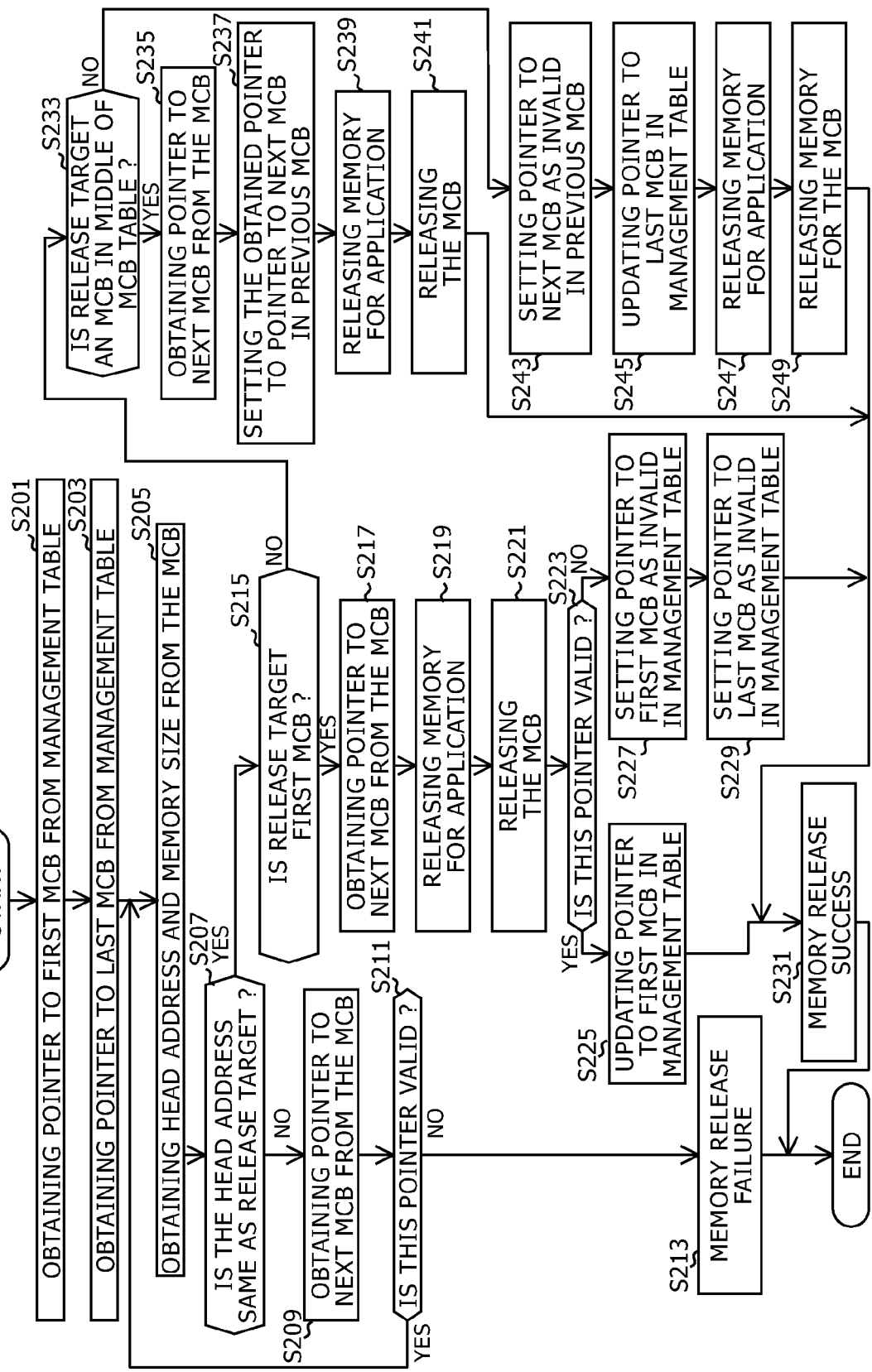
FIG. 19 shows a flowchart of memory release performed by the ordinary memory management system.

Next, referring to FIG. 19, ordinary memory release is explained.

Step S201: A pointer to the first MCB is obtained from the management table for MCBs.
Step S203: A pointer to the last MCB is obtained from the management table for MCBs.
Step S205: A memory head address and a memory size are obtained from the current MCB. At the first, the current MCB is the first MCB.
Step S207: It is determined whether or not the head address is the same as the address of the release target. If the head address is the same as the address of the release target, then Step S215 is next executed. If the head address is not the same as the address of the release target, then Step S209 is next executed.
Step S209: A pointer to the next MCB is obtained from the current MCB.
Step S211: It is determined whether or not the pointer to the next MCB is valid. If the pointer to the next MCB is valid (i.e. if the next MCB exists), then Step S205 is next executed, and in and after Step S205 the next MCB is processed as the current MCB. If the pointer to the next MCB is not valid (i.e. if the next MCB does not exist), then Step S213 is next executed.
Step S213: Since the memory release is failed, this process ends.
Step S215: It is determined whether or not the release target is the first MCB. If the release target is the first MCB, then Step S217 is next executed. If the release target is not the first MCB, then Step S233 is next executed.
Step S217: The pointer to the next MCB is obtained from the current MCB (i.e. the first MCB).
Step S219: A memory for an application is released. This memory is identified from the first MCB.
Step S221: The current MCB (i.e. the first MCB) is released from the memory.
Step S223: It is determined whether or not the pointer to the next MCB is valid. If the pointer to the next MCB is valid (i.e. if the next MCB exists), then Step S225 is next executed. If the pointer to the next MCB is not valid (if the next MCB does not exist), then Step S227 is next executed.
Step S225: The pointer to the first MCB is updated in the management table for MCBs, with the pointer obtained in Step S217.
Step S227: The pointer to the first MCB is set as invalid in the management table for MCBs, since there are no MCBs.
Step S229: The pointer to the last MCB is set as invalid in the management table for MCBs, since there are no MCBs.
Step S231: Since the memory release is succeeded, this process ends.
Step S233: It is determined whether or not the release target is an MCB in the middle of the MCB table. If the release target is an MCB in the middle of the MCB table (i.e. if the release target is neither the last MCB nor the first MCB), then Step S235 is next executed. If the release target is not MCBs in the middle of the MCB table, that is, if the release target is the last MCB, then Step S243 is next executed.
Step S235: A pointer to the next MCB is obtained from the current MCB.
Step S237: The obtained pointer is set to a pointer to the next MCB in the previous MCB.
Step S239: A memory for an application is released. This memory is identified from the current MCB.
Step S241: The current MCB is released from the memory. After Step S241, through Step S231, then this process ends.
Step S243: A pointer to the next MCB is set as invalid in the previous MCB of the current MCB, since the previous MCB will be the last MCB after the release.
Step S245: The pointer to the last MCB is updated in the management table for MCBs, with the pointer to the previous MCB.
Step S247: A memory area for an application is released. This memory is identified from the current MCB.
Step S249: The current MCB is released from the memory. After Step S249, through Step S231, then this process ends.

By a series of the aforementioned operations in the ordinary method, a memory area for an application is released.

Figure 20:
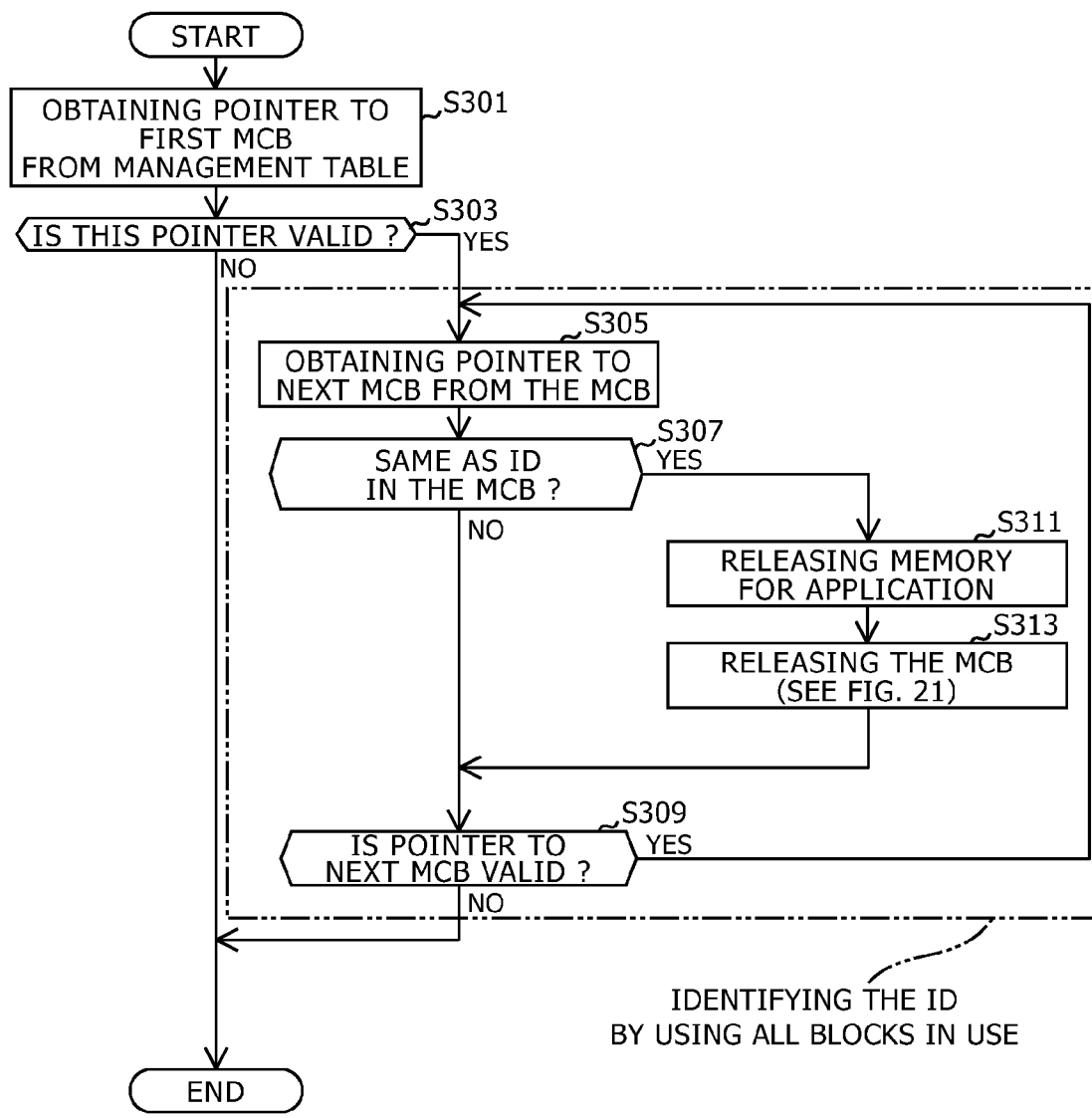
FIG. 20 shows a flowchart of collective memory release performed by the ordinary memory management system.

Next, referring to FIG. 20, ordinary collective memory release is explained.

Step S301: A pointer to the first MCB is obtained from the management table for MCBs.
Step S303: It is determined whether or not the pointer to the first MCB is valid. If the pointer to the next MCB is valid (i.e. if at least one MCB exists), then Step S305 is next executed. If the pointer to the next MCB is not valid, then this process ends.
Step S305: A pointer to the next MCB is obtained from the current MCB. At the first, the current MCB is the first MCB.
Step S307: It is determined whether or not the identification ID in the current MCB is the same as the release target's ID. If the identification ID in the current MCB is the same as the release target's ID, then Step S311 is next executed. If the identification ID in the current MCB is not the same as the release target's ID, then Step S309 is next executed.
Step S309: It is determined whether or not the pointer to the next MCB is valid. If the pointer to the next MCB is valid, then Step S305 is next executed, and in and after Step S305 the next MCB is processed as the current MCB. If the pointer to the next MCB is not valid, then this process ends.
Step S311: A memory for an application is released. This memory is identified from the current MCB.
Step S313: The current MCB is released from the memory (see FIG. 21). Next to Step S313, Step S309 is executed.

By a series of the aforementioned operations in the ordinary method, all memory areas for an application are released together.

Figure 21:
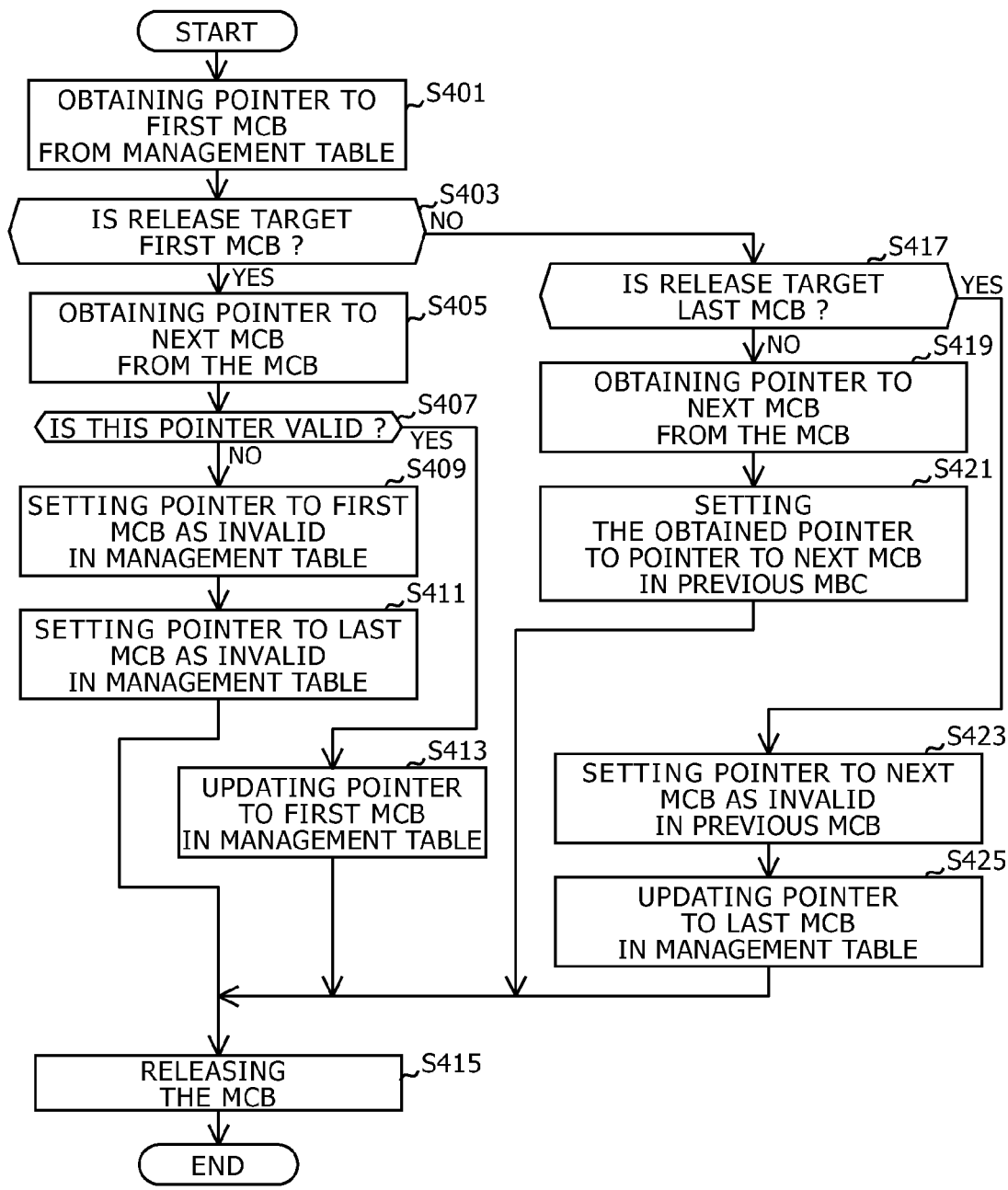
FIG. 21 shows a flowchart of releasing an MCB in the collective memory release.

Next, referring to FIG. 21, releasing an MCB in the collective memory release is explained.

Step S401: A pointer to the first MCB is obtained from the management table for MCBs.
Step S403: It is determined whether or not the release target is the first MCB. If the release target is the first MCB, then Step S405 is next executed. If the release target is not the first MCB, then Step S417 is next executed.
Step S405: A pointer to the next MCB is obtained from the first MCB.
Step S407: It is determined whether or not the pointer to the next MCB is valid. If the pointer to the next MCB is valid, then Step S413 is next executed. If the pointer to the next MCB is not valid, then Step S409 is next executed.
Step S409: The pointer to the first MCB is set as invalid in the management table for MCBs, since there will be no MCBs after the release.
Step S411: The pointer to the last MCB is set as invalid in the management table for MCBs, since there will be no MCBs after the release.
Step S413: The pointer to the first MCB is updated in the management table for MCBs, with the pointer obtained in Step S405.
Step S415: The MCB as the release target is released, and then this process ends.
Step S417: It is determined whether or not the release target is the last MCB. If the release target is the last MCB, then Step S423 is next executed. If the release target is not the last MCB, then Step S419 is next executed.

Step S419: A pointer to the next MCB is obtained from the MCB as the release target.

Step S421: The obtained pointer is set to a pointer to the next MCB in the previous MCB of the release target. Next to Step S421, Step S415 is executed, then this process ends.

Step S423: A pointer to the next MCB is set as invalid in the previous MCB of the release target, since the previous MCB will be the last MCB after the release.

Step S425: The pointer to the last MCB is updated in the management table for MCBs, with the pointer to the previous MCB. Next to Step S425, Step S415 is executed, and then this process ends.

By a series of the aforementioned operations in the ordinary method, an MCB in collective memory release are released.

[Operations of the Memory Management System of Embodiment 2—Flowcharts]

Figure 13A:
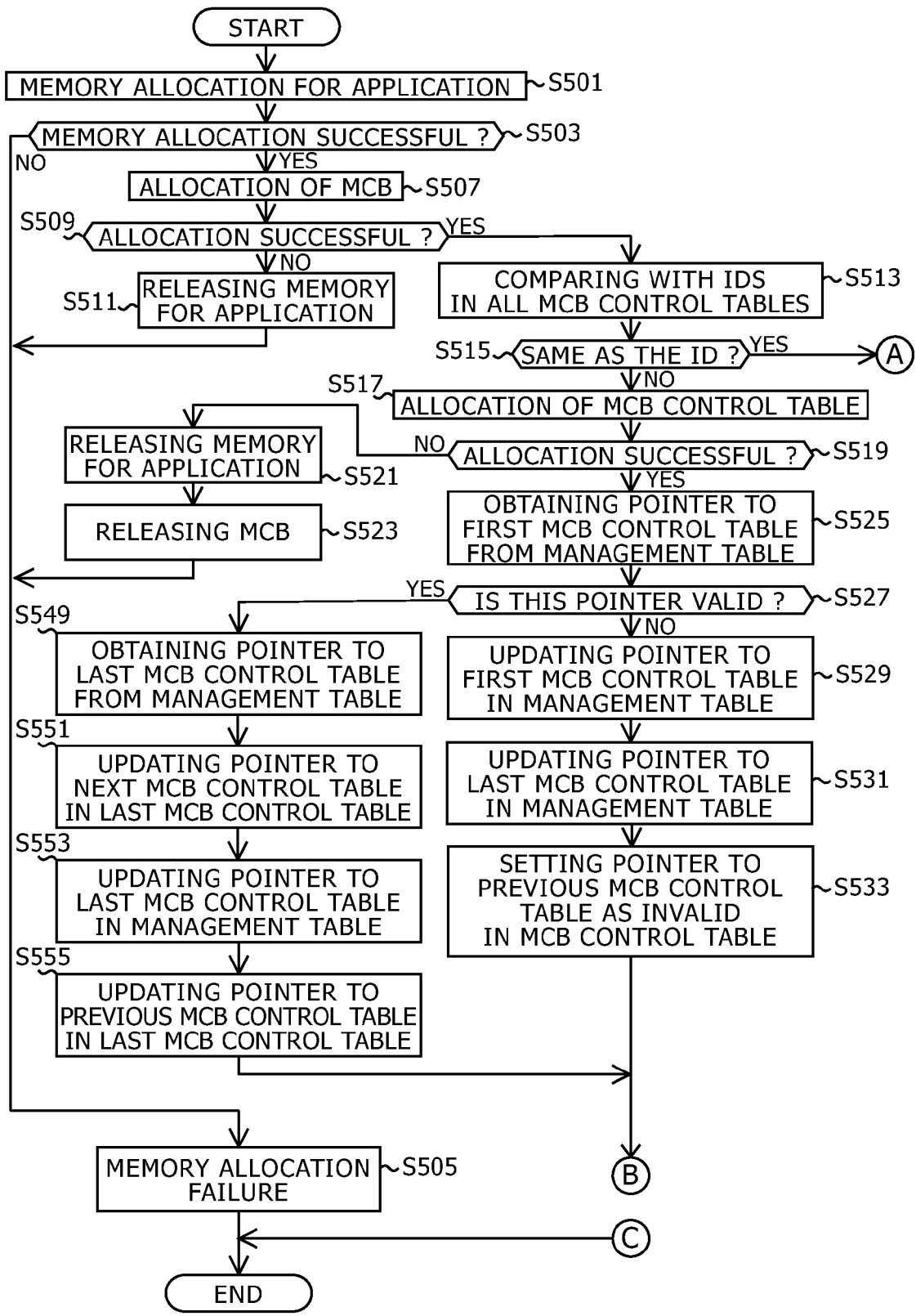
FIGS. 13A and 13B show a flowchart of memory allocation performed by the memory management system according to Embodiment 2 of this invention.
Figure 13B:
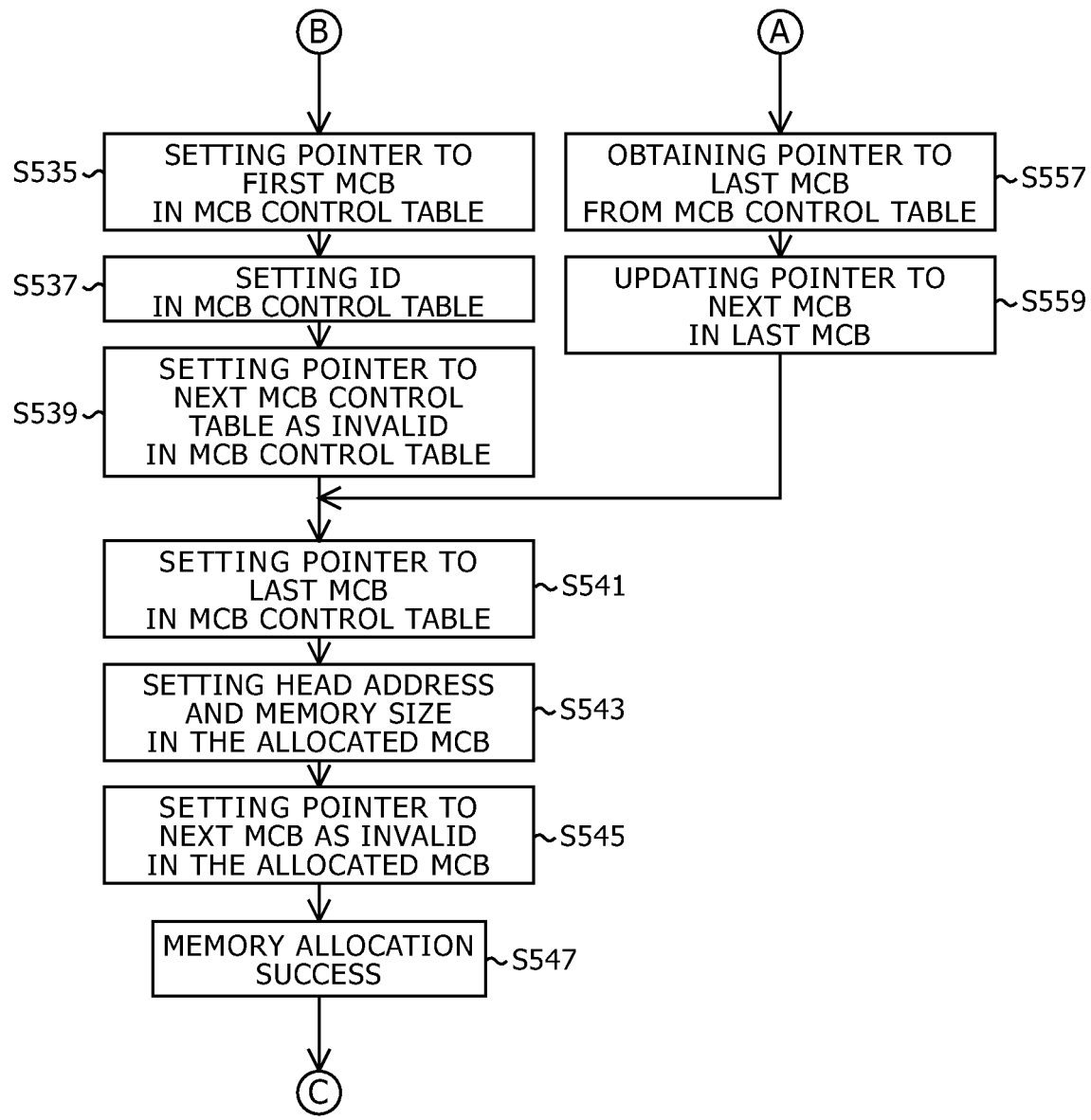

Referring to FIGS. 13A and 13B, a memory allocation process in Embodiment 2 will be explained.

Step S501: A memory for an application is allocated.

Step S503: It is determined whether or not the memory allocation in Step S501 is successful. If the memory allocation is successful, then Step S507 is next executed. If the memory allocation is not successful, then Step S505 is next executed.

Step S505: Since the memory allocation is failed, this process ends.

Step S507: An MCB is allocated to manage the memory allocated in Step S501.

Step S509: It is determined whether or not the memory allocation in Step S507 is successful. If the memory allocation is successful, then Step S513 is next executed. If the memory allocation is not successful, then Step S511 is next executed.

Step S511: The memory allocated in Step S501 for an application is released. Next to Step S511, through Step S505, then this process ends.

Step S513: The ID specified in this allocation request is compared with IDs in the MCB control tables.

Step S515: According to the result of Step S513, it is determined whether or not the ID specified in this allocation request is the same as any of IDs in the MCB control tables. If the ID specified in this allocation request is the same as any of the IDs, then Step S557 (in FIG. 13B) is next executed. If the ID specified in this allocation request is not the same as any of the IDs, then Step S517 is next executed.

Step S517: A new MCB control table is allocated to manage MCBs having the specified ID.

Step S519: It is determined whether or not the memory allocation in Step S517 is successful. If the memory allocation is successful, then Step S525 is next executed. If the memory allocation is not successful, then Step S521 is next executed.

Step S521: The memory allocated in Step S501 for an application is released.

Step S523: The MCB allocated in Step S507 is released from the memory. Next to Step S523, through Step S505, then since the memory allocation is failed, this process ends.

Step S525: A pointer to the first MCB control table is obtained from the management table for MCB control tables.

Step S527: It is determined whether or not the pointer to the first MCB control table is valid. If the pointer to the first MCB control table is valid, then Step S549 is next executed. If the pointer to the first MCB control table is not valid (i.e. if there are no MCB control tables), then Step S529 is next executed.

Step S529: The pointer to the first MCB control table is updated in the management table for MCB control tables, with the pointer to the MCB control table allocated in Step S517.

Step S531: The pointer to the last MCB control table is updated in the management table for MCB control tables, with the pointer to the MCB control table allocated in Step S517.

Step S533: A pointer to the previous MCB control table is set as invalid in the new MCB control table allocated in Step S517.

Step S535: A pointer to the first MCB is set in the new MCB control table, with the pointer to the MCB allocated in Step S507.

Step S537: An identification ID is set in the new MCB control table, with the ID specified in the allocation request.

Step S539: A pointer to the next MCB control table is set as invalid in the new MCB control table, since the new MCB control table is added as the last table in the list of MCB control tables.

Step S541: A pointer to the last MCB is set as the pointer to the MCB allocated in Step S507, in either the new MCB control table allocated in Step S517 or the existent MCB control table having the same ID as that specified in the allocation request.

Step S543: A memory head address and a memory size are set in the allocated MCB.

Step S545: A pointer to the next MCB is set as invalid in the allocated MCB, since the allocated MCB is the last MCB.

Step S547: Since the memory allocation is succeeded, this process ends.

Step S549: A pointer to the last MCB control table is obtained from the management table for MCB control tables.

Step S551: A pointer to the next MCB control table is updated in the last MCB control table, with the pointer to the MCB control table allocated in Step S517.

Step S553: A pointer to the last MCB control table is updated in the management table for MCB control tables, with the pointer to the MCB control table allocated in Step S517.

Step S555: A pointer to the previous MCB control table is set in the last MCB control table, with the pointer obtained in Step S549. Next to Step S555, Step S535 is executed.

Step S557: A pointer to the last MCB is obtained from the MCB control table which has the same ID as the ID specified in this allocation request.

Step S559: A pointer to the next MCB is updated in the last MCB, with the pointer to the MCB allocated in Step S507. Next to Step S559, Step S541 is executed.

By a series of the aforementioned operations in this embodiment, a process for allocating a memory area for an application is performed.

Figure 14:
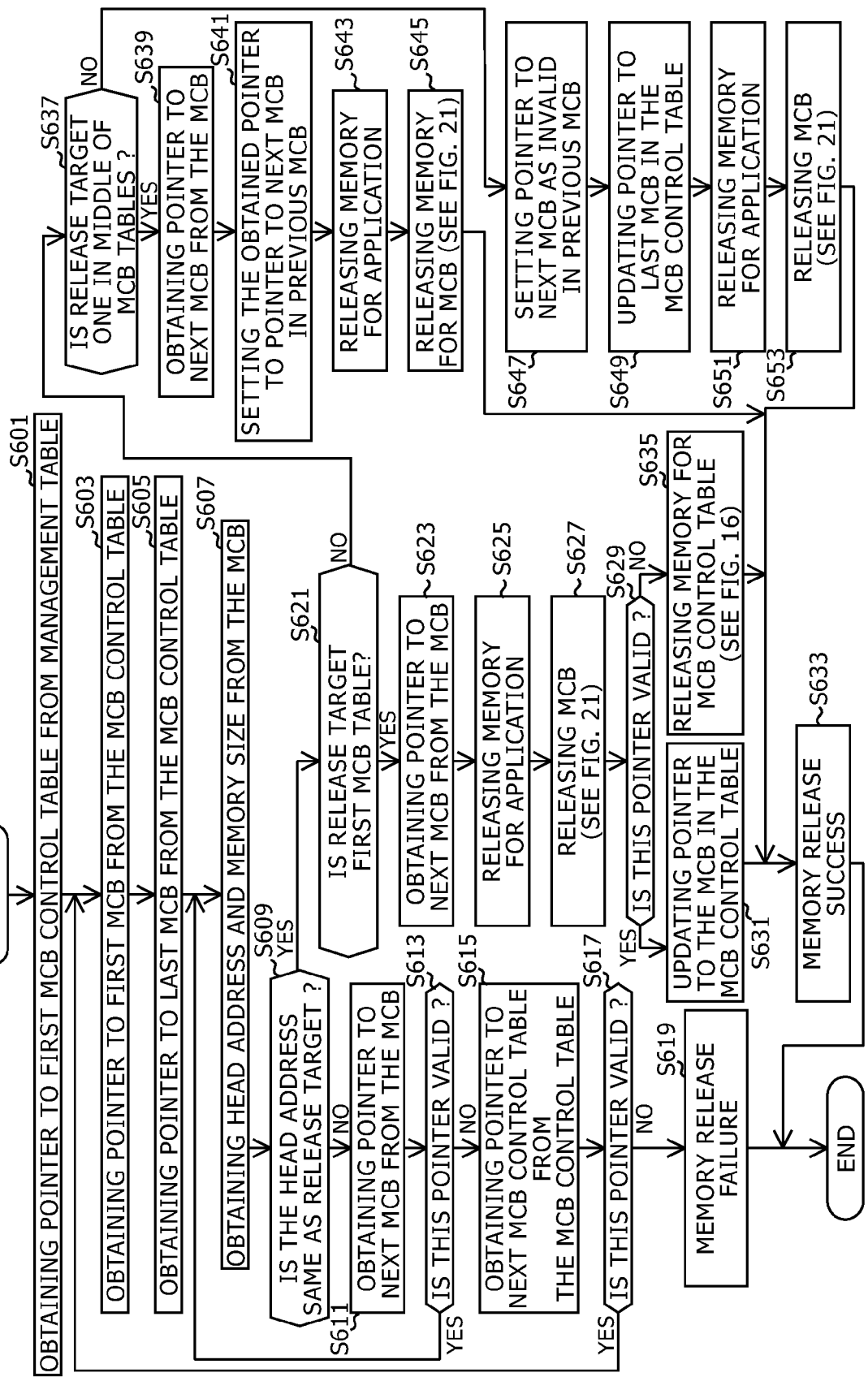
FIG. 14 shows a flowchart of memory release performed by the memory management system according to Embodiment 2 of this invention.

Next, referring FIG. 14, a memory release process in Embodiment 2 is explained.

Step S601: A pointer to the first MCB control table is obtained from the management table for MCB control tables.

Step S603: A pointer to the first MCB is obtained from the current MCB control table. At the first, the current MCB control table is the first MCB control table.

Step S605: A pointer to the last MCB is obtained from the current MCB control table.

Step S607: A memory head address and a memory size are obtained from the current MCB. At the first, the current MCB is the first MCB.

Step S609: It is determined whether or not the head address is the same as the address of the release target. If the head address is the same as the address of the release target, then Step S621 is next executed. If the head address is not the same as the address of the release target, then Step S623 is next executed.

Step S611: A pointer to the next MCB is obtained from the current MCB.

Step S613: It is determined whether or not the pointer to the next MCB is valid. If the pointer to the next MCB is valid, then Step S607 is next executed, and in and after Step S607 the next MCB is processed as the current MCB. If the pointer to the next MCB is not valid, then Step S615 is next executed.

Step S615: A pointer to the next MCB control table is obtained from the current MCB control table.

Step S617: It is determined whether or not the pointer to the next MCB control table is valid. If the pointer to the next MCB control table is valid, then Step S603 is next executed, and in and after Step S603 the next MCB control table is processed as the current MCB control table. If the pointer to the next MCB control table is not valid, then Step S619 is next executed.

Step S619: Since the memory release is failed, this process ends.

Step S621: It is determined whether or not the release target is the first MCB. If the release target is the first MCB, then Step S623 is next executed. If the release target is not the first MCB, then Step S637 is next executed.

Step S623: A pointer to the next MCB is obtained from the current MCB (i.e. the first MCB).

Step S625: A memory for an application is released. This memory is identified from the current MCB.

Step S627: The first MCB is released from the memory (see FIG. 21).

Step S629: It is determined whether or not the pointer to the next MCB (i.e. the pointer obtained in Step S623) is valid. If the pointer to the next MCB is valid, then Step S631 is next executed. If the pointer to the next MCB is not valid, then Step S635 is next executed.

Step S631: The pointer to the first MCB is updated in the current MCB control table, with the pointer obtained in Step S623.

Step S633: Since the memory release is succeeded, this process ends.

Step S635: The current MCB control table is released from the memory (see FIG. 16), since due to the release there will be no MCBs to be managed with the current MCB control table. Next to Step S635, through Step S633, since the memory release is succeeded, this process ends.

Step S637: It is determined whether or not the release target is an MCB in the middle of the MCB table. If the release target is an MCB in the middle of the MCB table (i.e. if the release target is neither the last MCB nor the first MCB), then Step S639 is next executed. If the release target is not MCBs in the middle of the MCB table, that is, if the release target is the last MCB, then Step S647 is next executed.

Step S639: A pointer to the next MCB is obtained from the current MCB.

Step S641: The obtained pointer is set to a pointer to the next MCB in the previous MCB of the release target.

Step S643: A memory for an application is released. This memory is identified from the current MCB.

Step S645: The current MCB is released from the memory (see FIG. 21). Next to Step S645, through Step S633, since the memory release is succeeded, this process ends.

Step S647: A pointer to the next MCB is set as invalid in the previous MCB of the release target, since the previous MCB will be the last MCB after the release.

Step S649: A pointer to the last MCB is updated in the current MCB control table, with the pointer to the previous MCB.

Step S651: A memory for an application is released. This memory is identified from the current MCB.

Step S653: The current MCB is released from the memory (see FIG. 21). Next to Step S653, through Step S633, since the memory release is succeeded, this process ends.

By a series of the aforementioned operations in Embodiment 2, a memory area for an application is released.

Figure 15:
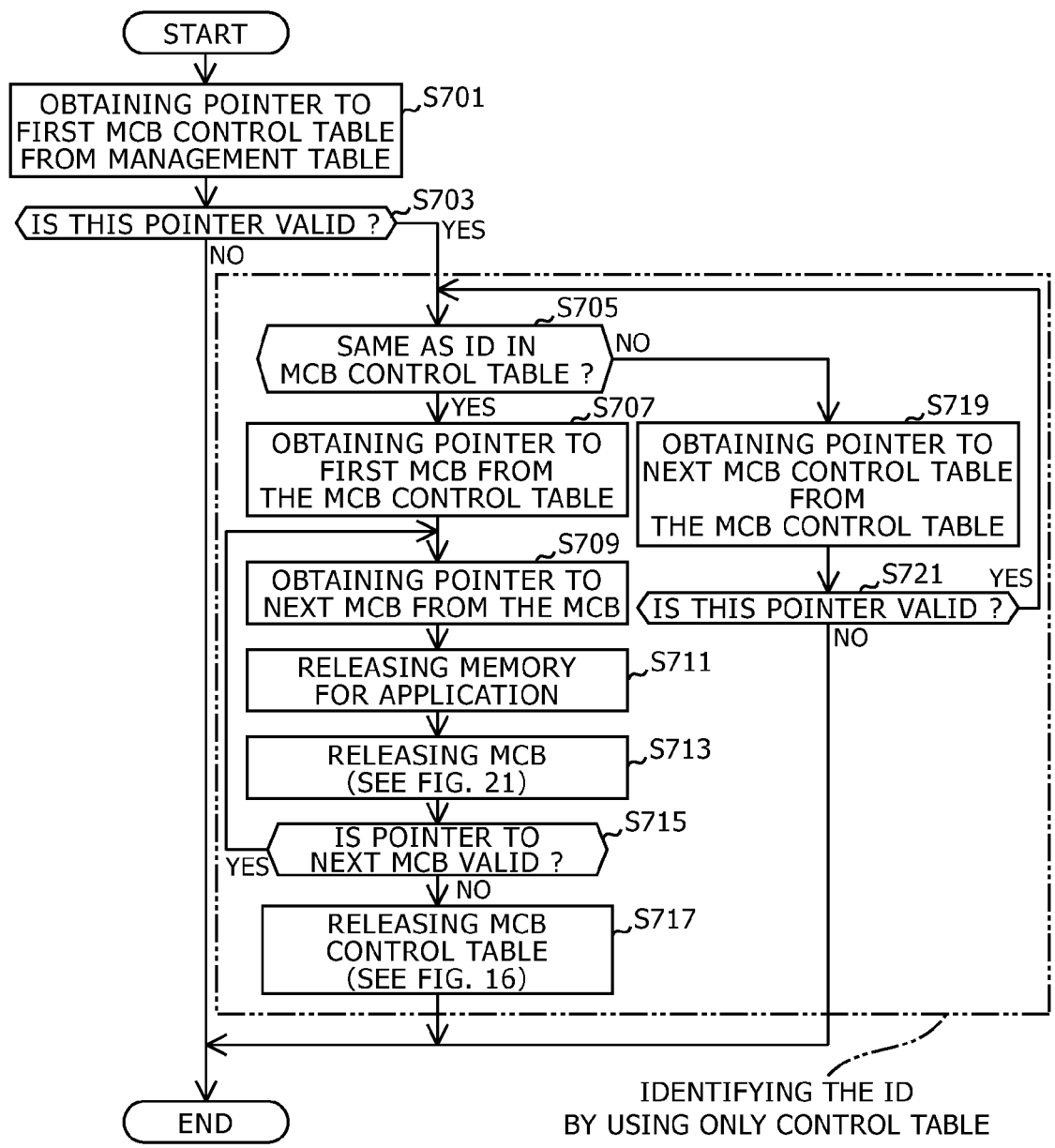
FIG. 15 shows a flowchart of collective memory release performed by the memory management system according to Embodiment 2 of this invention.

Referring to FIG. 15, a collective memory release process in Embodiment 2 will be explained.

Step S701: A pointer to the first MCB control table is obtained from the management table for MCB control tables.

Step S703: It is determined whether or not the pointer to the first MCB control table is valid. If the pointer to the first MCB control table is valid (i.e. if at least one MCB control table exists), then Step S705 is next executed. If the pointer to the first MCB control table is not valid, then this process ends.

Step S705: It is determined whether or not the ID specified in the collective memory release request is the same as the ID of the current MCB control table. At the first, the current MCB control table is the first MCB control table. If the specified ID is the same as the ID of the current MCB control table, then Step S707 is next executed. If the specified ID is not the same as the ID of the current MCB control table, then Step S719 is next executed.

Step S707: A pointer to the first MCB is obtained from the current MCB control table.

Step S709: A pointer to the next MCB is obtained from the current MCB. At the first, the current MCB is the first MCB.

Step S711: A memory area for the application is released. This memory is identified from the current MCB.

Step S713: The current MCB is released from the memory (see FIG. 21).

Step S715: It is determined whether or not the pointer to the next MCB (i.e. the pointer obtained in Step S707) is valid. If the pointer to the next MCB is valid, then Step S709 is next executed, and in and after Step S709 the next MCB is processed as the current MCB. If the pointer to the next MCB is not valid, then Step S717 is next executed.

Step S717: The current MCB control table is released from the memory (see FIG. 16).

Step S719: A pointer to the next MCB control table is obtained from the current MCB control table.

Step S721: It is determined whether or not the pointer to the next MCB control table is valid. If the pointer to the next MCB control table is valid, then Step S705 is next executed, in and after Step S705 the next MCB control table is processed as the current MCB control table. If the pointer to the next MCB control table is not valid, then this process ends.

By a series of the aforementioned operations in Embodiment 2, all memory areas for an application are released together.

Figure 16:
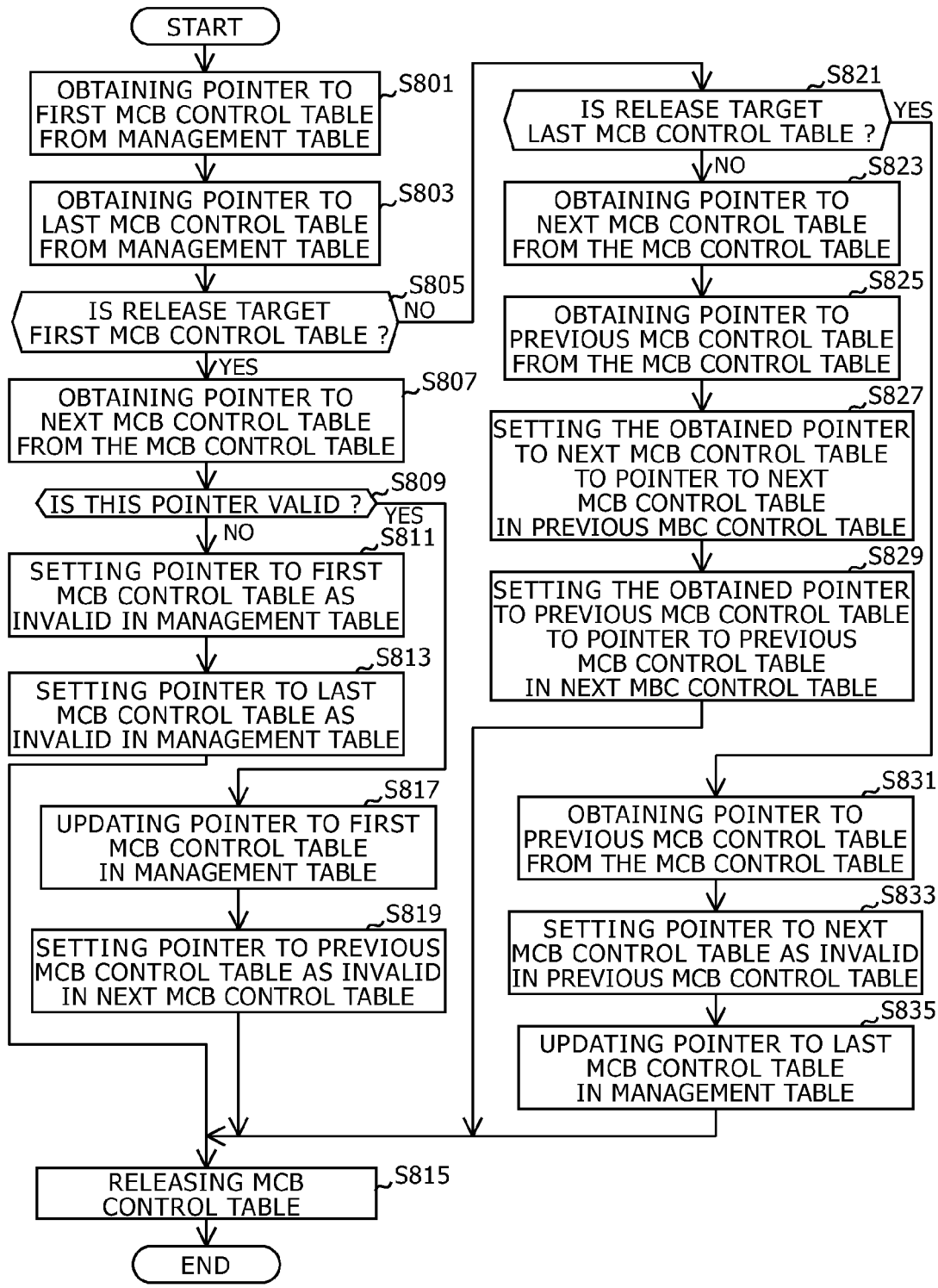
FIG. 16 shows a flowchart of releasing an MCB control table in the collective memory release according to Embodiment 2 of this invention.

Next, referring to FIG. 16, releasing an MCB control table in the collective memory release of Embodiment 2 is explained.

Step S801: A pointer to the first MCB control table is obtained from the management table for MCB control tables.

Step S803: A pointer to the last MCB control table is obtained from the management table for MCB control tables.

Step S805: It is determined whether or not the release target is the first MCB control table. If the release target is the first MCB control table, then Step S807 is next executed. If the release target is not the first MCB control table, then Step S821 is next executed.

Step S807: A pointer to the next MCB control table is obtained from the first MCB control table.

Step S809: It is determined whether or not the pointer to the next MCB control table is valid. If the pointer to the next MCB control table is valid, then Step S817 is next executed. If the pointer to the next MCB control table is not valid (i.e. if only one MCB control table exists), then Step S811 is next executed.

Step S811: The pointer to the first MCB control table is set as invalid in the management table for MCB control tables, since there will be no MCB control table after the release.
Step S813: The pointer to the last MCB control table is set as invalid in the management table for MCB control tables, since there will be no MCB control table after the release.
Step S815: The MCB control table as the release target is released from the memory, and then this process ends.
Step S817: The pointer to the first MCB control table is updated in the management table for MCB control tables, with the pointer obtained in Step S807.
Step S819: A pointer to the previous MCB control table is set as invalid in the next MCB control table of the first MCB control table, since the next MCB control table will be the first MCB control table after the release. Next to Step S819, in Step S815, the first MCB control table is released, and then this process ends.
Step S821: It is determined whether or not the release target is the last MCB control table. If the release target is the last MCB control table, then Step S831 is next executed. If the release target is not the last MCB control table, then Step S823 is next executed.
Step S823: A pointer to the next MCB control table is obtained from the MCB control table as the release target.
Step S825: A pointer to the previous MCB control table is obtained from the current MCB control table as the release target.
Step S827: The pointer obtained in Step S823 is set to a pointer to the next MCB control table in the previous MCB control table of the release target.
Step S829: The pointer obtained in Step S825 is set to a pointer to the previous MCB control table in the next MCB control table of the release target. Next to Step S829, in Step S815, the MCB control table as the release target is released, and then this process ends.
Step S831: A pointer to the previous MCB control table is obtained from the last MCB control table.
Step S833: A pointer to the next MCB control table is set as invalid in the previous MCB control table of the last MCB control table.
Step S835: A pointer to the last MCB control table is updated in the management table for MCB control tables, with the pointer to the previous MCB control table. Next to Step S835, in Step S815, the last MCB control table is released, and then this process ends.

By a series of the aforementioned operations in Embodiment 2, an MCB in collective memory release are released.
[Advantages of Embodiment 2]

The memory management system of Embodiment 2 manages MCBs for each application by using the MCB table and the MCB control tables in two layers.

Therefore, memory spaces are allocated and released for each of applications, and consequently, fragmentation tends not to occur and it is possible to allocate a large continuous memory space.

Further, the memory management system has application program interfaces for memory management. The memory-control-block table management unit and the memory-control-block control table management unit perform memory management for each of applications. If an application program calls the application program interfaces, then the memory-control-block table management unit and the memory-control-block control table management unit perform memory management for each application. Therefore, a programmer is not required to write complex memory operations in his/her application program, and the programmer's burden is reduced.

Further, in the memory management system of Embodiment 2, one MCB table consists of a concatenation list in which memory control blocks only for one application are concatenated. In terms of such simple concatenate list structure, the system can reach the allocated memory areas in a short time. For example, the collective memory release is performed as simple procedures in a short time. Specifically, by calling user_free_all( ) with an ID of an application as a parameter when an instance of the application ends, all memory areas that have been used by the application are released at one time.

Embodiment 3

A configuration of a memory management system according to Embodiment 3 is the same as that of Embodiment 1 (in FIG. 4).

In Embodiment 3, the physical partition management unit M17 manages allocation and release of a physical memory based on physical micro-partitions M11 into which the physical memory is divided in the physical address space. Further, the physical partition management unit M17 watches fragmentation rates in respectives of the physical partitions, and prohibits physical memory allocation in the physical partition in which the fragmentation rate exceeds a predetermined upper-most threshold value. Further, the physical partition management unit M17 allows physical memory allocation again in the physical partition for which physical memory allocation has been prohibited, if the fragmentation rate of the physical partition becomes less than a predetermined lower-most threshold value. Typically, the upper-most threshold value and the lower-most threshold value may be, for instance, 70 percent and 30 percent, respectively. Alternatively, the upper-most threshold value may be 99 percent, that is, a value near the maximum value.

Here, the fragmentation rate is derived according to the following expression.

Fragmentation rate (%)={[Number of fragments]/[Number of micro-partitions]−1}×100

By this method that prohibits allocation in the physical partition using the upper-most threshold value, even if memory allocation is required when the fragmentation rate is equal to or greater than the upper-most threshold value, the required memory is allocated in another physical partition.
[Software Configuration]

Figure 30:
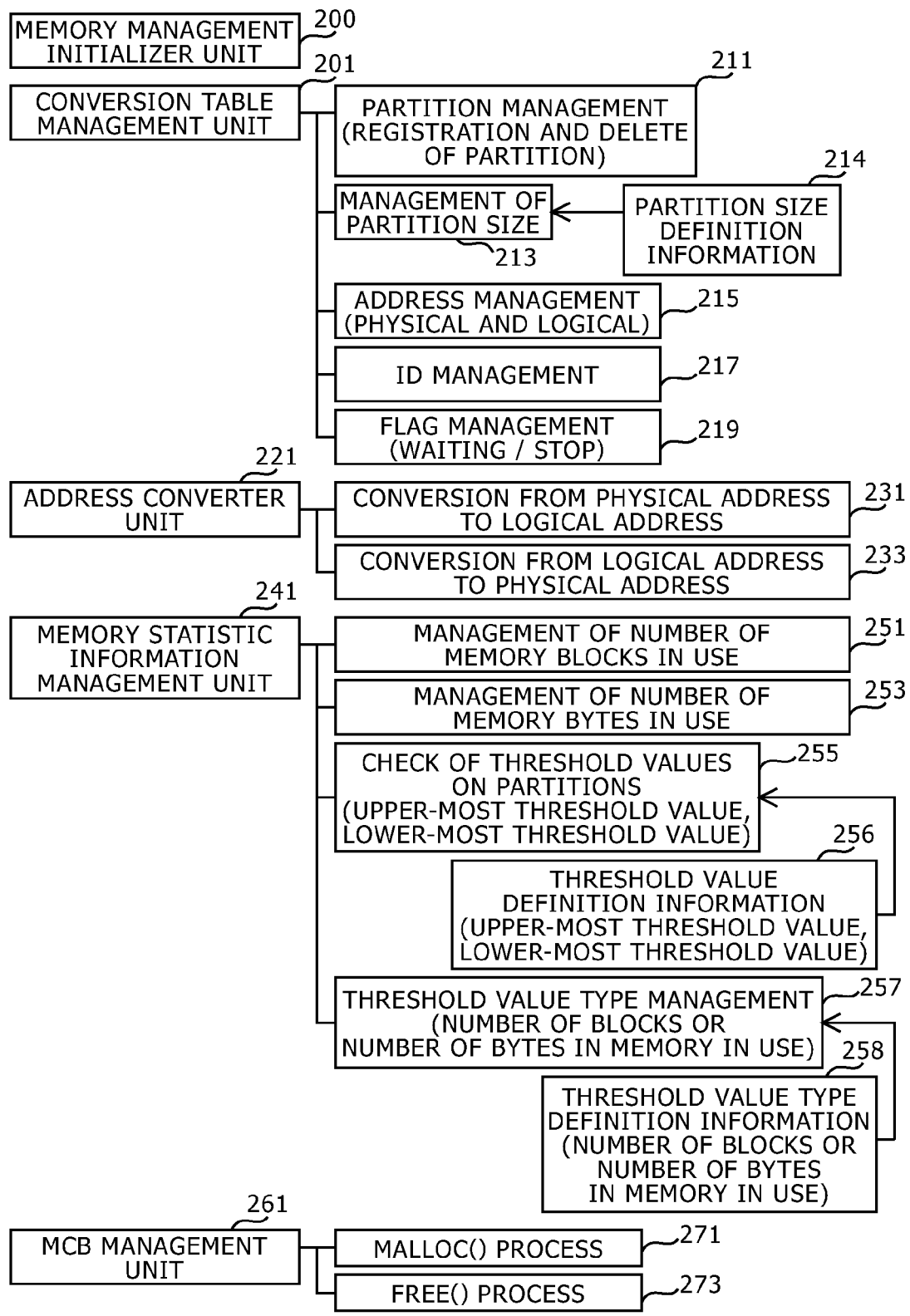
FIG. 30 shows a diagram of a software configuration of a memory management system in Embodiment 3.

Referring FIG. 30, a software configuration of the memory management system of Embodiment 3 will be explained.

This memory management system has a memory management initializer unit 200, a conversion table management unit 201, an address converter unit 221, a memory statistic information management unit 241, and an MCB management unit 261. In the following part, these functional blocks are explained.

The memory management initializer unit 200 performs operations necessary for initialization of memory management. In the initialization, the unit 200 sets a memory area to be managed, a physical address space, a logical address space, fixed address spaces, etc.

The conversion table management unit 201 (an instance of the logical partition management unit and the physical partition management unit) manages allocation and release of micro-partitions into which a physical memory is divided in the physical address space. Further, the conversion table management unit 201 manages allocation and release of a virtual memory to be used by an application in a logical memory space. The conversion table management unit 201 contains some function units such as a partition management unit 211, a partition-size management unit 213, an address management unit 215, an ID management unit 217, and a flag management unit 219.

The partition management unit 211 manages allocation and release of micro-partitions into which the aforementioned physical address space is divided. The partition management unit 211 manages information on the partitions by using a list structure.

The partition-size management unit 213 manages sizes of the partitions. The unit 213 reads-in partition size definition information 214 in its initialization.

The address management unit 215 performs memory allocation and release in logical addresses, and manages physical addresses corresponding to the logical addresses.

The ID management unit 217 manages IDs assigned to respective applications, and inserts an ID to a conversion table to identify the application which uses a memory block specified with the ID in the conversion table.

The flag management unit 219 manages status (e.g. waiting or stop) of each memory block.

The address converter unit 221 (an instance of the converter unit) performs address conversion between the logical address space and the physical address space. The address converter unit 221 contains a converter unit 231 for converting a physical address to a logical address, and a converter unit 233 for converting a logical address to a physical address.

The memory statistic information management unit 241 acts as a part of the physical partition management unit. The unit 241 identifies sizes of areas not in use in the physical partition, and forms list structures of the areas having respectives of the sizes, and searches for an area not in use in the list structure corresponding to an optimum size to the request.

A management unit 251 manages the number of memory blocks in use.

A management unit 253 manages the number of memory bytes in use.

A threshold value checking unit 255 checks the fragmentation rates of the partitions, and prohibits further memory allocation in the partition if the fragmentation rate of the partition is greater than an upper-most threshold value. After prohibiting further memory allocation in the partition, the threshold value checking unit 255 allows further memory allocation if the fragmentation rate of the partition becomes less than a lower-most threshold value. The upper-most threshold value and the lower-most threshold value may be, for instance, 70 percent and 30 percent, respectively. Alternatively, the upper-most threshold value may be 99 percent. The threshold value checking unit 255 changes a value of a flag when the fragmentation rate becomes greater than the upper-most threshold value and when the fragmentation rate becomes less than the lower-most threshold value. The threshold value checking unit 255 reads-in threshold value definition information 256 in its initialization.

A threshold value type management unit 257 identifies sizes of areas not in use in the physical partition, and forms groups of the areas not in use having respectives of the sizes in a physical partition. The threshold value type management unit 257 reads-in threshold value type definition information 258 in its initialization.

The MCB management unit 261 manages memory control blocks (MCBs). An MCB is a part which contains a pointer to the head of a physical memory block, the size of the physical memory block, and so on. The MCB will be explained below in detail.

[Micro-Partition]

In FIG. 7, for instance, physical memories used by the application of ID=Interpreter are isolated in the micro-partitions #1, #6 and #9, and the number of fragments is two (i.e. one is the micro-partitions #2 to #5, and the other is the micro-partitions #7 and #8). Similarly, physical memories used by the application of ID=Graphics are isolated in the micro-partitions #2, #4, #5 and #8, and the number of fragments is two (i.e. one is the micro-partition #3, and the other is the micro-partitions #6 and #7). Similarly, physical memories used by the application of ID=Rendering are isolated in the micro-partitions #3 and #7, and the number of fragment is one (i.e. the one is the micro-partitions #4 to #6). In this physical partition, the total number of fragments is five, and the total number of micro-partitions is nine, and therefore, the fragmentation rate is 62.5 percent (={5/(9−1)}×100).

Although the physical memories are isolated, since the converter unit M19 performs address conversion between physical addresses and logical addresses by using the conversion table M13, it is possible to access the logical partition management unit M21 with logical addresses to a regularly continuous memory space. For the applications of the Graphics and the Rendering, memory management is performed as well as that.

For instance, in FIG. 7, logical addresses for the application of ID=Interpreter are continuous over the micro-partitions #1, #6 and #9 in the order of #1, #6, #9. Similarly, logical addresses for the application of ID=Graphics are continuous over the micro-partitions #2, #4, #5 and #8 in the order of #2, #4, #5, #8; and logical addresses for the application of ID=Rendering are continuous over the micro-partitions #3 and #7 in the order of #3, #7.

FIG. 8 shows an instance of certain micro-partitions specified as fixed memory areas. Some hardware such as DMA (Direct Memory Access) directly accesses an address space of a physical memory (i.e. without a logical address space). This memory management system works well even if the hardware accesses fixed addresses in the physical memory. If there are fixed addresses in the physical memory, then the converter M19 sets the ID of a micro-partition in the conversion table M13 as a value indicating that this micro-partition is fixed by hardware. The micro-partition with the ID of such value is a fixed area, and thus, the physical partition management unit M17 does not use such micro-partition (i.e. the fixed area) for allocation even if a memory allocation request is received from the physical partition management unit M21. As shown in FIG. 8, even if memory allocation requests are received from the physical partition management unit M21 for the applications "Interpreter", "Graphics" and "Rendering", physical addresses of micro-partitions are allocated other than the fixed micro-partitions having the ID of such value. Therefore, the micro-partitions used for the applications do not compete with the micro-partitions fixed by hardware.

[Allowance and Prohibition of Further Allocation with Reference to a Fragmentation Rate of Areas not in Use]

In the following part, explained is detailed operations of allowance and prohibition of further memory allocation with reference to fragmentation rates of areas not in use.

Figure 22:
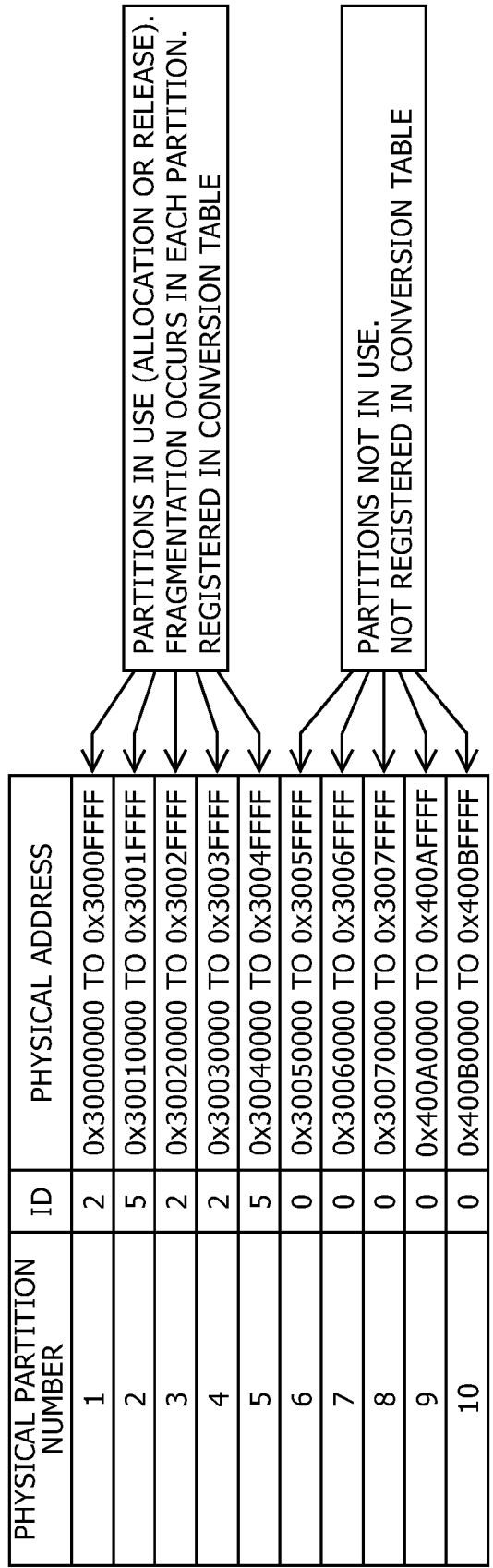
FIG. 22 shows a diagram which indicates a relationship between a memory map and physical partitions in the ordinary memory management system.

Although defragmentation of a memory can be performed in an ordinary memory management system using a double pointer method, the performance declines due to data transmission within the memory. Therefore, here is proposed the aforementioned memory management system using micro-partitions. This memory management system allocates a partition exclusively specified for each of applications which use memories, and releases all memories in the partition when the application finishes using all the memories. Further, this memory management system uses a logical address space for concatenating partitions, and also uses a conversion table for mutual conversion between a physical address and a logical address. FIG. 22 shows a relationship between a memory map and physical partitions in the ordinary memory management system. In this system, while an application is using a memory, fragmentation of the memory occurs within a partition (the memory usage efficiency declines). On the other hand, an objective of the memory management system of Embodiment 3 is to efficiently reduce fragmentation in a partition while an application is using a memory.

To achieve the objective, here used are an "upper-most threshold value" and a "lower-most threshold value". On each of partitions, if over the "upper-most threshold value", it is determined that fragmentation occurs much, and then further allocation in the partition is stopped, and release can be only performed in the partition. In this situation, for memory allocation, a new partition is generated (and partition information on the new partition), and the allocation is performed in the new partition. Areas will be released gradually in the partition where further allocation is stopped, and consequently, if less than the "lower-most threshold value", then in the partition where further allocation is stopped, further allocation is allowed again, since the fragmentation is small. As mentioned, using the "upper-most threshold value" and the "lower-most threshold value", each of partitions is managed by identifying its status out of two statuses: the status that the partition is available for allocation (i.e. "waiting"), and the status that the partition is not available for allocation, that is, memory release is only performed (i.e. "stop"). Therefore, even if a partition is being used, defragmentation can be efficiently performed in the partition. These threshold values may be set as certain numbers of memory blocks in use, certain numbers of memory bytes in use, or the like.

Figure 23:
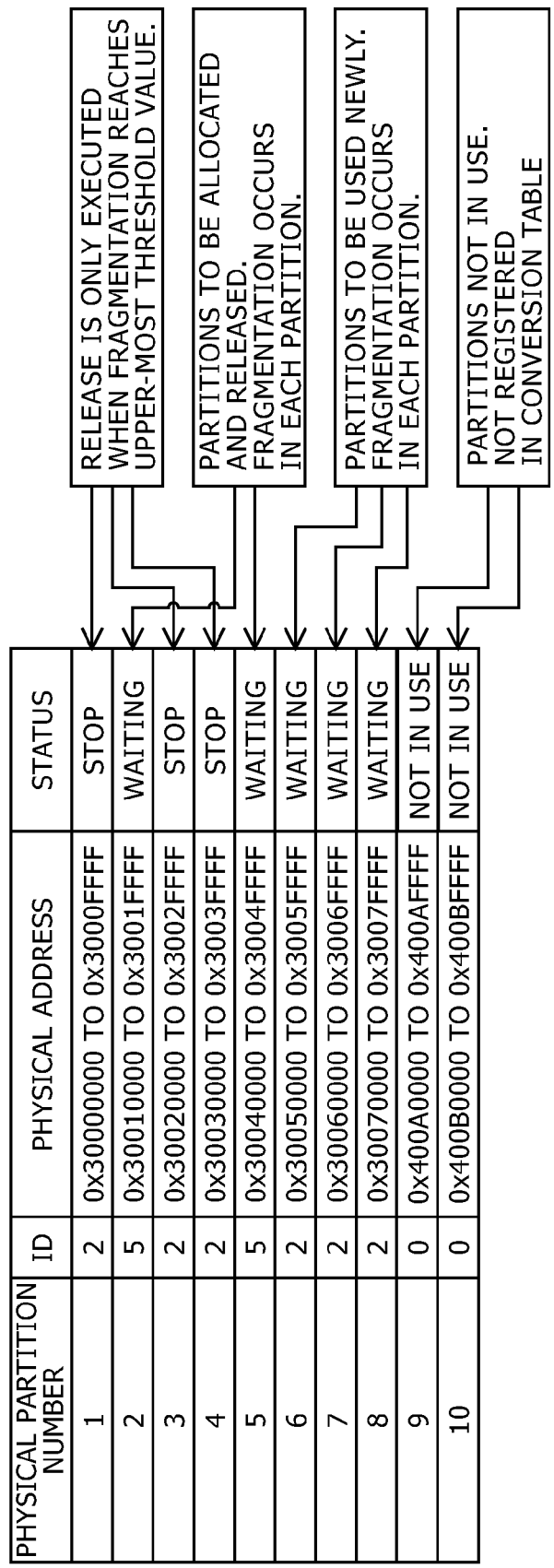
FIG. 23 shows a diagram which indicates a relationship between a memory map and physical partitions in Embodiment 3 (when stopping memory allocation)

FIG. 23 shows a relationship between a memory map and physical partitions when stopping memory allocation in some partitions in Embodiment 3.

In the physical partitions #1, #3 and #4, since fragmentation reaches the upper-most threshold value, further allocation is stopped and release is only performed. Instead of these partitions, the physical partitions #6, #7 and #8 is used for further allocation.

FIG. 24 shows a relationship between a memory map and physical partitions when return to waiting for memory allocation in Embodiment 3.

After stopping further allocation in the physical partitions #1, #3 and #4, since fragmentation reaches the lower-most threshold value due to release, further allocation is allowed again.

The upper-most threshold value is a threshold value for stopping further allocation in a partition. If over the upper-most threshold value, then release is only executed, and consequently, fragmentation can be gradually reduced.

The lower-most threshold value is a threshold value for allowing further allocation again. If less than the lower-most threshold value, then further allocation is allowed again.

For instance, relationships among the micro-partition number, the ID, the flag, the physical starting address (i.e. head address), the length, and the corresponding logical addresses, mentioned above, are shown in Table 1.

TABLE 1

| MICRO-PARTITION NUMBER | ID | FLAG | PHYSICAL STARTING ADDRESS | LENGTH | CORRESPONDING LOGICAL ADDRESS |
|---|---|---|---|---|---|
| 1 | 2 | WAITING | 0x3000 | 0x0800 | (ID = 2) 0x0000 TO 0x07FF |
| 2 | 3 | WAITING | 0x3800 | 0x0800 | (ID = 3) 0x0000 TO 0x07FF |
| 3 | 2 | STOP | 0x4000 | 0x0800 | (ID = 2) 0x0800 TO 0x0FFF |
| 4 | 1 | WAITING | 0x4800 | 0x0800 | (ID = 1) 0x0000 TO 0x07FF |
| 5 | 3 | WAITING | 0x5000 | 0x0800 | (ID = 3) 0x0800 TO 0x0FFF |
| 6 | 2 | WAITING | 0x5500 | 0x0800 | (ID = 2) 0x1000 TO 0x17FF |

[Address Conversion Method]

In Embodiment 3, the partitions are concatenated under the logical address space, and therefore, memory allocation and memory release are executed through the logical address space. For example, in memory release, an address of a release target is specified as a logical address.

[Address Conversion Method from a Logical Address to a Physical Address]

In the following part, referring FIG. 25, explained is the address conversion from a logical address to a physical address. Here, it is assumed that the application of ID=2 releases a memory area of which the head address is the logical address 0x1234. Firstly, the conversion program in the memory management system refers to the conversion table.

In the first conversion table in FIG. 25, the corresponding logical addresses 0x0000 to 0x07FF is derived from the logical starting address 0x0000 and the length 0x0800, and it is determined that the specified address 0x1234 is out of the corresponding logical addresses 0x0000 to 0x07FF.

Next, the second conversion table is identified from the pointer to the linked table in the first conversion table. In the second conversion table, the corresponding logical addresses 0x0800 to 0x0FFF is derived from the logical starting address 0x0800 and the length 0x0800, and it is determined that the specified address 0x1234 is out of the corresponding logical addresses 0x0800 to 0x0FFF.

Next, the third conversion table is identified from the pointer to the linked table in the second conversion table. In the third conversion table, the corresponding logical addresses 0x01000 to 0x17FF is derived from the logical starting address 0x01000 and the length 0x0800, and it is determined that the specified address 0x1234 is within the corresponding logical addresses 0x1000 to 0x17FF.

When these corresponding logical addresses are found, the difference is calculated between the specified address 0x1234 and this logical starting address 0x1000. The difference, that is, the offset value is 0x0234.

Finally, by adding the offset value 0x0234 to the physical starting address 0x5500 in the third conversion table, the physical address 0x5734 is calculated as a physical address corresponding to the logical address 0x1234.

[Address Conversion Method from a Physical Address to a Logical Address]

In the following part, referring FIG. 25, explained is the address conversion from a physical address to a logical address. Here, it is assumed that the application of ID=2 allocates a memory area of which the head address is the physical address 0x5734.

Firstly, the conversion program in the memory management system refers to the conversion table. In the first conversion table in FIG. 25, the corresponding physical addresses 0x3000 to 0x37FF is derived from the physical starting address 0x3000 and the length 0x0800, and it is determined that the specified address 0x5734 is out of the corresponding physical addresses 0x3000 to 0x37FF.

Next, the second conversion table is identified from the pointer to the linked table in the first conversion table. In the second conversion table, the corresponding physical addresses 0x4000 to 0x47FF is derived from the physical starting address 0x4000 and the length 0x0800, and it is determined that the specified address 0x5734 is out of the corresponding physical addresses 0x4000 to 0x47FF.

Next, the third conversion table is identified from the pointer to the linked table in the second conversion table. In the third conversion table, the corresponding physical addresses 0x5500 to 0x5CFF is derived from the physical starting address 0x5500 and the length 0x0800, and it is determined that the specified address 0x5734 is within the corresponding physical addresses 0x5500 to 0x5CFF.

When these corresponding physical addresses are found, the difference is calculated between the head address 0x5734 of the allocation and the head physical address of this physical partition 0x5500. The difference, that is, the offset value is 0x0234.

Finally, by adding the offset value 0x0234 to the logical starting address 0x1000 in the third conversion table, the logical address 0x1234 is calculated as a logical address corresponding to the physical address 0x5734.

[Instances of Allocation, Release and Collective Release]

The following part shows instances of allocation, release and collective release.

An instance of allocation: "void *malloc(int id, size_t size)"

N.B. the return value is a logical address.

An instance of release: "void free(int id, void *pointer)"

N.B. "Pointer" is a logical address.

An instance of collective release: "void free_all(int id)"

When executing the aforementioned operations, the following matters must be checked.

(a) when DMA transmission is performed, certain areas in the physical partition must be fixed.

(b) when a memory access takes place by using a library function such as memcpy, strcpy, or the like, this library function must be replaced with a specific library function to which a target address is specified as a logical address.

[Operation Flow—Flowchart]

In the following part, actual operation flows are explained with reference to flowcharts.

Figure 26:
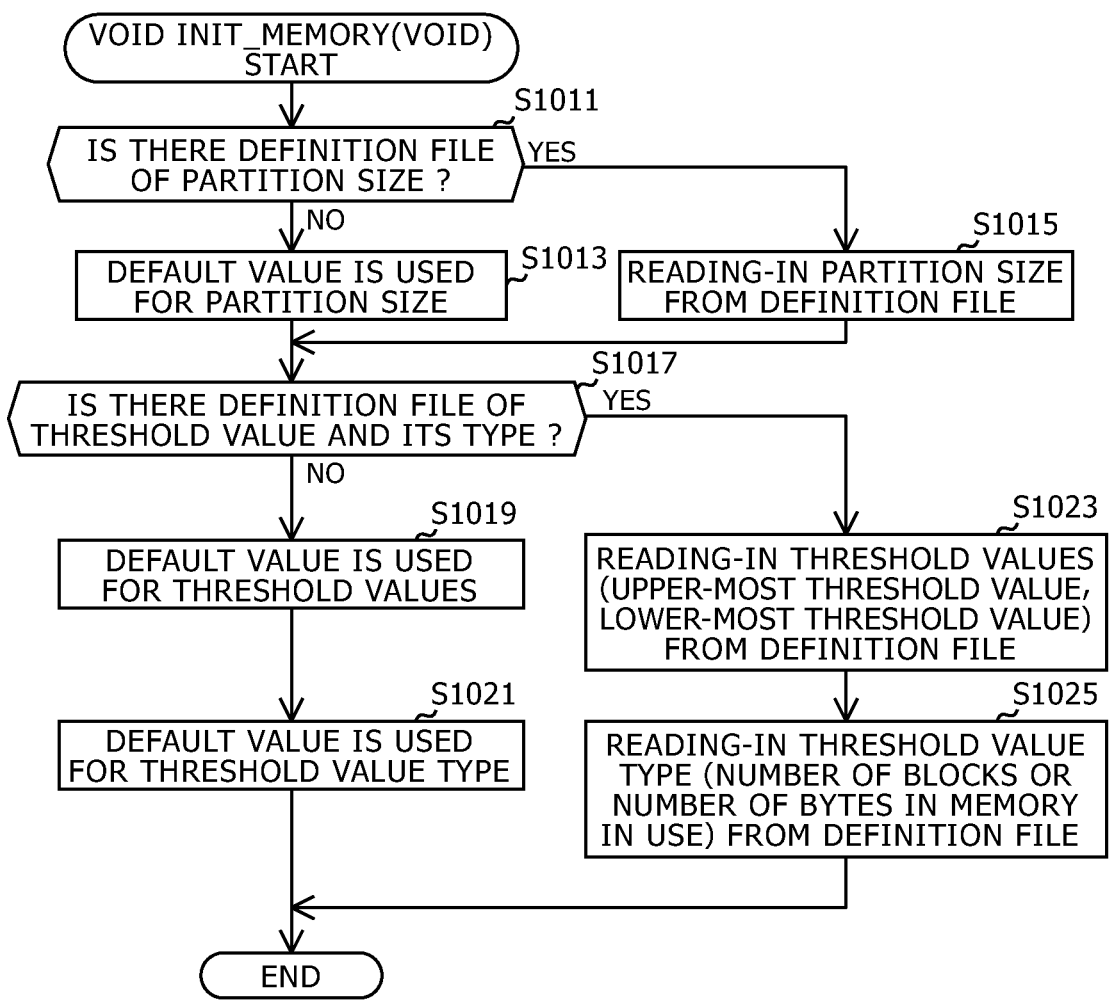
FIG. 26 shows a flowchart of an initialization process in Embodiment 3.

Firstly, an initialization process is explained. The operation flow of "void init_memory(void)" is explained with reference to FIG. 26.

Step S1011: It is determined whether or not there is a partition size definition table. If there is the partition size definition table, then Step S1015 is next executed. If there is not the partition size definition table, then Step S1013 is next executed.

Step S1013: A default value is used for the partition size.

Step S1015: The partition size definition table is read-in.

Step S1017: It is determined whether or not there are a threshold value definition table and a threshold value type definition table. If there are both definition tables, then Step S1023 is next executed. If there are not both definition tables, then Step S1019 is next executed.

Step S1019: Default values are used for the threshold values.

Step S1021: A default value is used for the threshold value type.

Step S1023: The threshold values (i.e. the upper-most threshold value and the lower-most threshold value) are read-in from the definition table.

Step S1025: The threshold value type (i.e. information for selecting either number of memory blocks in use or number of memory bytes in use) is read-in from the definition table.

By a series of the aforementioned operations, the initialization process is performed.

Figure 27:
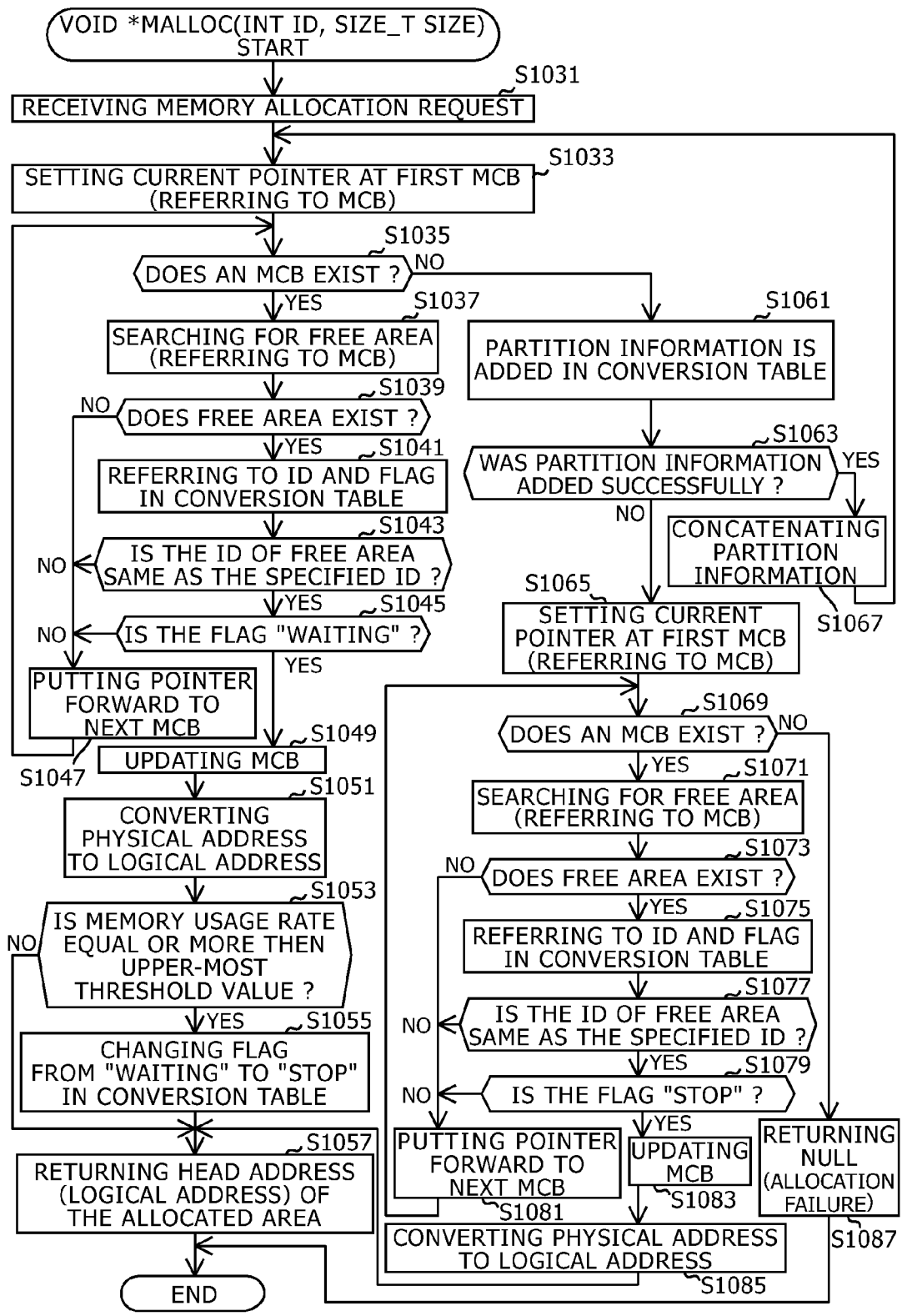
FIG. 27 shows a flowchart of a memory allocation process in Embodiment 3.

Next, referring to the flowchart shown in FIG. 27, a memory allocation process is explained.

Step S1031: A memory allocation request is received.

Step S1033: The current pointer is set as a pointer to the first MCB. The current pointer is used to specify the MCB to be processed currently.

Step S1035: It is determined whether or not there is the current MCB. If there is the MCB, then Step S1037 is next executed. If there is not the MCB, then Step S1061 is next executed.

Step S1037: A free area is searched for.

Step S1039: It is determined whether or not a free area is found. If a free area is found, then Step S1041 is next executed. If any free areas are not found, then Step S1047 is next executed.

Step S1041: The ID and the flag of the found free area in the conversion table are referred to.

Step S1043: It is determined whether or not the ID of the free area is the same as the specified ID. If the IDs are same, then Step S1045 is next executed. If the IDs are not same, then Step S1047 is next executed.

Step S1045: It is determined whether or not the flag is "waiting". If the flag is "waiting", then Step S1049 is next executed. If the flag is not "waiting", then Step S1047 is next executed.

Step S1047: The current pointer is put forward to the next MCB.

Step S1049: The current MCB is updated to allocate the free area.

Step S1051: The physical address (i.e. the head address) is converted to the logical address.

Step S1053: It is determined whether or not the memory usage rate is equal to or greater than an upper-most threshold value. If the memory usage rate is equal to or greater than the upper-most threshold value, then Step S1055 is next executed; otherwise, Step S1057 is next executed.

Step S1055: The flag in the conversion table is changed from "waiting" to "stop".

If a partition were added here, partitions with small memories would increase. Without adding a new partition, an existent partition is used for allocation, if a memory size specified in the next memory allocation request is small. Therefore, the number of partitions is reduced here so as to easily allocate a large memory area.

An instance of processes related to Step S1055 is as follows.

Step (a): A partition in "waiting" status is found as the first partition.

Step (b): In response of a request of a large memory size, the second partition is generated.

Step (c): In the second partition, memory allocation is performed some times.

Step (d): The fragmentation of the second partition becomes equal to or greater than the upper-most threshold value, and the second partition is changed to "stop" status. Here, a new partition is not generated.

Step (e): When a memory allocation request is received, memory allocation is performed in the first partition.

Step S1057: The head address of the allocated area (as a logical address) is returned.

Step S1061: Partition information is added in the conversion table, and the flag is set as "waiting".

Step S1063: It is determined whether or not the partition information was added successfully. If the partition information was added successfully, then Step S1067 is next executed; otherwise, Step S1065 is next executed.

Step S1065: The current pointer is set as a pointer to the first MCB.

Step S1067: The partition information is concatenated.

Step S1069: It is determined whether or not there is the current MCB. If there is the MCB, then Step S1071 is next executed. If there is not the MCB, then Step S1087 is next executed.

Step S1071: A free area is searched for.

Step S1073: It is determined whether or not there is a free area. If there is a free area, then Step S1075 is next executed. If there are any free areas, then Step S1081 is next executed.

Step S1075: The ID and the flag of the found free area in the conversion table are referred to. Even if the flag of the partition corresponding to the specified ID is "waiting", there may be a large free area (in the case that the threshold value of the partition is equal to or greater than percent or the case that the threshold value of the partition is any in the range from 30 percent to 70 percent.

Step S1077: It is determined whether or not the ID of the free area is the same as the specified ID. If the IDs are same, then Step S1079 is next executed. If the IDs are not same, then Step S1081 is next executed.

Step S1079: It is determined whether or not the flag is "stop". If the flag is "stop", then Step S1083 is next executed. If the flag is not "stop", then Step S1081 is next executed.

Step S1081: The current pointer is put forward to the next MCB.

Step S1083: The current MCB is updated.

Step S1085: The physical address (i.e. the head address) is converted to the logical address.

Step S1087: NULL (i.e. allocation failure) is returned.

By a series of the aforementioned operations, the memory allocation process is performed.

Figure 28:
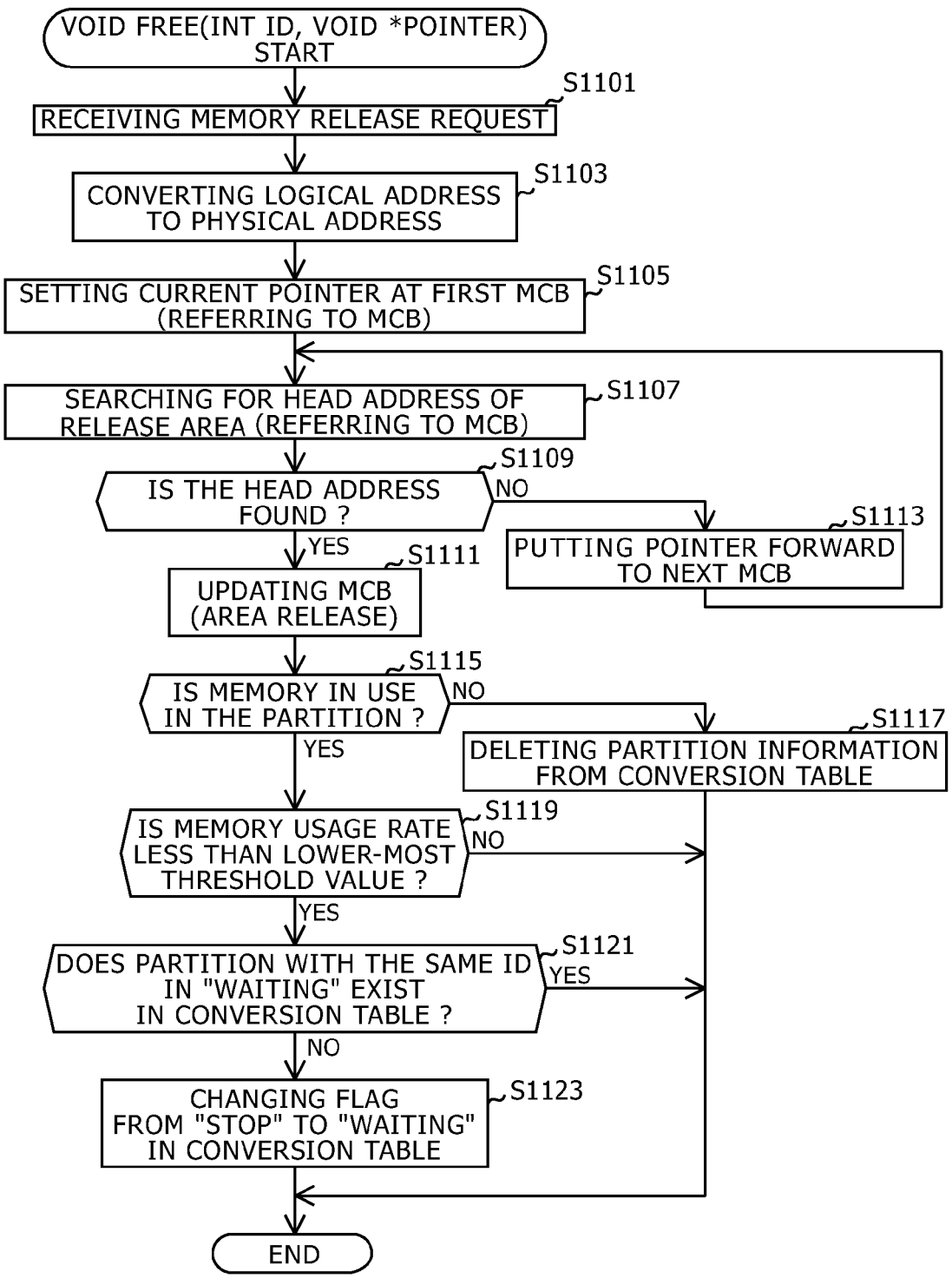
FIG. 28 shows a flowchart of a memory release process in Embodiment 3.
Figure 29:
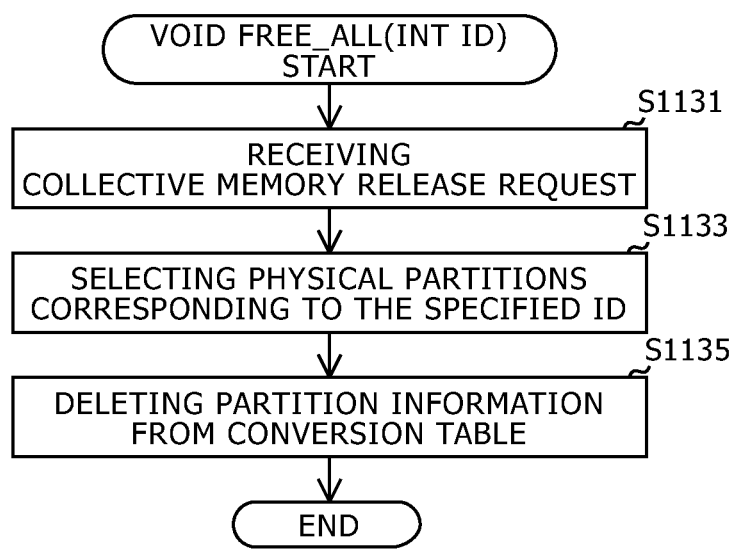
FIG. 29 shows a flowchart of a collective memory release process in Embodiment 3.

Next, referring to the flowchart shown in FIG. 28, a memory release process is explained.

Step S1101: A memory release request is received.

Step S1103: The logical address of the release target is converted to a physical address.

Step S1105: The current pointer is set as a pointer to the first MCB.

Step S1107: The head address of an area to be released is searched for.

Step S1109: It is determined whether or not the head address is found. If the head address is found, then Step S1111 is next executed. If the head address is not found, then Step S1113 is next executed.

Step S1111: The area to be released is released, and the MCBs related to the released area are updated.

Step S1113: The current pointer is put forward to the next MCB.

Step S1115: It is determined whether or not there is a memory in use in the partition. If there is a memory in use in the partition, then Step S1119 is next executed. If there are not any memories in use in the partition, then Step S1117 is next executed.

Step S1117: The partition information is deleted from the conversion table, and then this process ends.

Step S1119: It is determined whether or not the memory usage rate is less than the lower-most threshold value. If the memory usage rate is less than the lower-most threshold value, then Step S1121 is next executed; otherwise, this process ends.

Step S1121: It is determined whether or not there is a partition with the same ID in "waiting". If there is a partition with the same ID in "waiting", then Step S1123 is next executed; otherwise, this process ends. Only if there are no partitions with the same ID in "waiting", the status is changed from "stop" to "waiting". Consequently, generating unnecessary partitions in "waiting" are stopped.

Step S1123: The flag is changed from "stop" to "waiting" in the conversion table.

By a series of the aforementioned operations, the memory release process is performed.

Next, referring to the flowchart shown in FIG. 2, a collective memory release process is explained.

Step S1131: A collective memory release request is received.

Step S1133: Physical partitions corresponding to the specified ID are selected.

Step S1135: The partition information of the physical partitions is deleted from the conversion table.

By a series of the aforementioned operations, the collective memory release process is performed.

[Advantages of Embodiment 3]

Advantages of the memory management system of Embodiment 3 are as follows.

It is possible to avoid fragmentation effectively.

Multiple partitions are used to avoid fragmentation effectively.

Dynamic movement of boundaries of partitions is used to avoid fragmentation effectively.

The order of releasing memories is not limited, and a memory which becomes unnecessary can be released immediately.

Fragmentation rates are watched in the physical partitions, and physical memory allocation is prohibited in the physical partition if the fragmentation rate exceeds the upper-most threshold value. Therefore, it is possible to reduce the decline of the processing rate due to using fragmented memory areas. Further, since prohibition of allocation is canceled if the fragmentation rate of the physical partition becomes less than the lower-most threshold value, a new partition is not required and consequently, memory usage efficiency becomes higher.

Embodiment 4

Comparison with an Ordinary Memory Pool System

Figure 31:
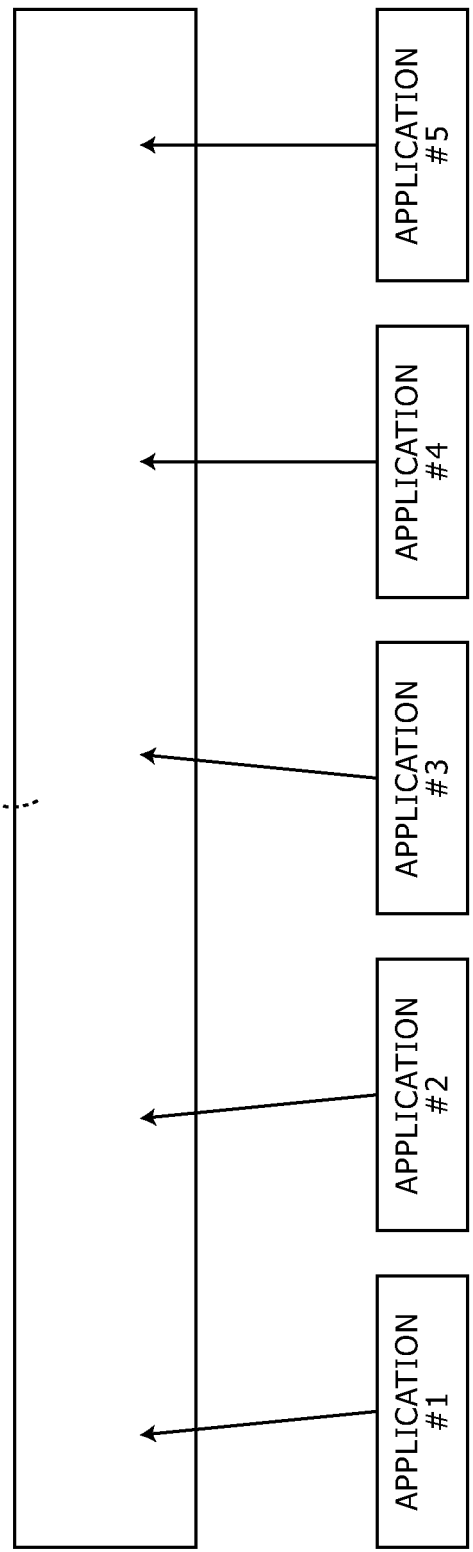
FIG. 31 shows a diagram which indicates a relationship between an application and a memory map in an ordinary memory pool method #1.

As shown in FIG. 31, in an ordinary memory pool system, an application allocates a memory area when it is required, and releases the memory area after the end of using the memory area. Such operations result in fragmentation, and due to the fragmentation, a continuous large memory area tends not to be allocated.

Figure 32:
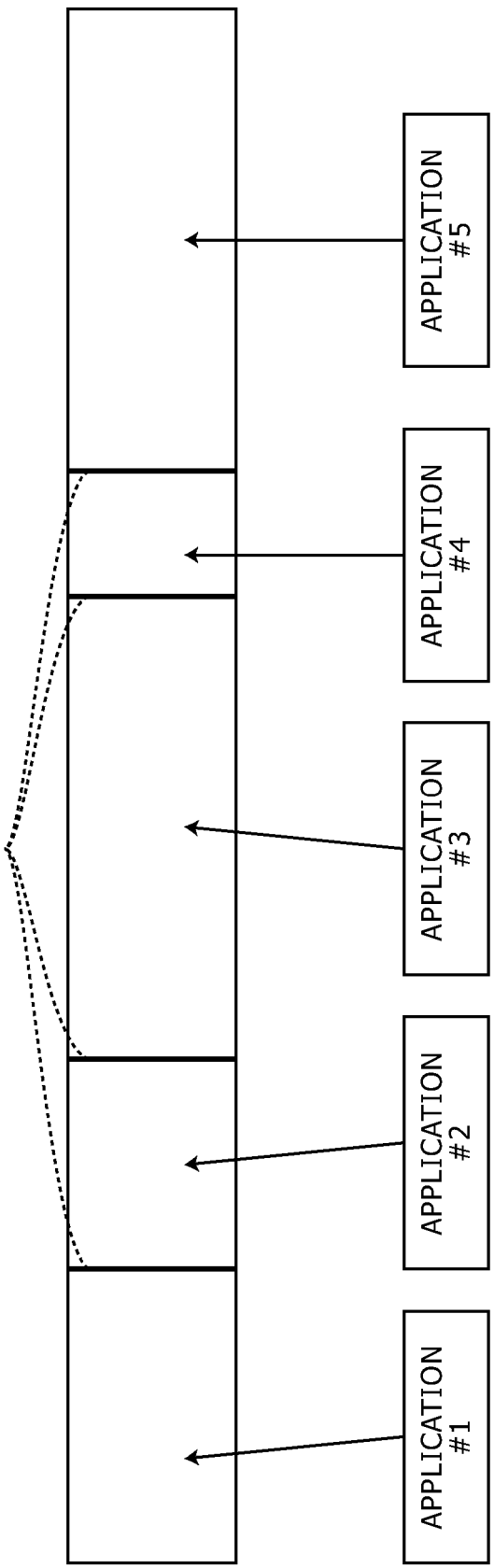
FIG. 32 shows a diagram which indicates a relationship between an application and a memory map in an ordinary memory pool method #2.

FIG. 32 shows an improved ordinary memory pool system. In the improved ordinary memory pool system, when an application is started, the application allocates a memory area which has a predetermined size corresponding to the application. When a memory manager of the system receives a memory allocation request from the application, the manager obtains a memory within the memory area (i.e. the memory pool) allocated by the application. The method shown in FIG. 32 is better than that shown in FIG. 31. In the method shown in FIG. 32, at the end of an application, all of the memory area allocated for the application is released at one time. Therefore, this method enables the system to allocate a large continuous memory area.

Since some applications handle large image data in some apparatuses such as image forming apparatus, the respective maximum memory sizes required by applications are sometimes different from each other. At the result, even if using the method shown in FIG. 32, that is, the method which fixes areas of memory pools for application, memory usage is not efficient.

[Conversion Between a Physical Address Space and a Logical Address Space with Micro-Partitions]

Figure 33:
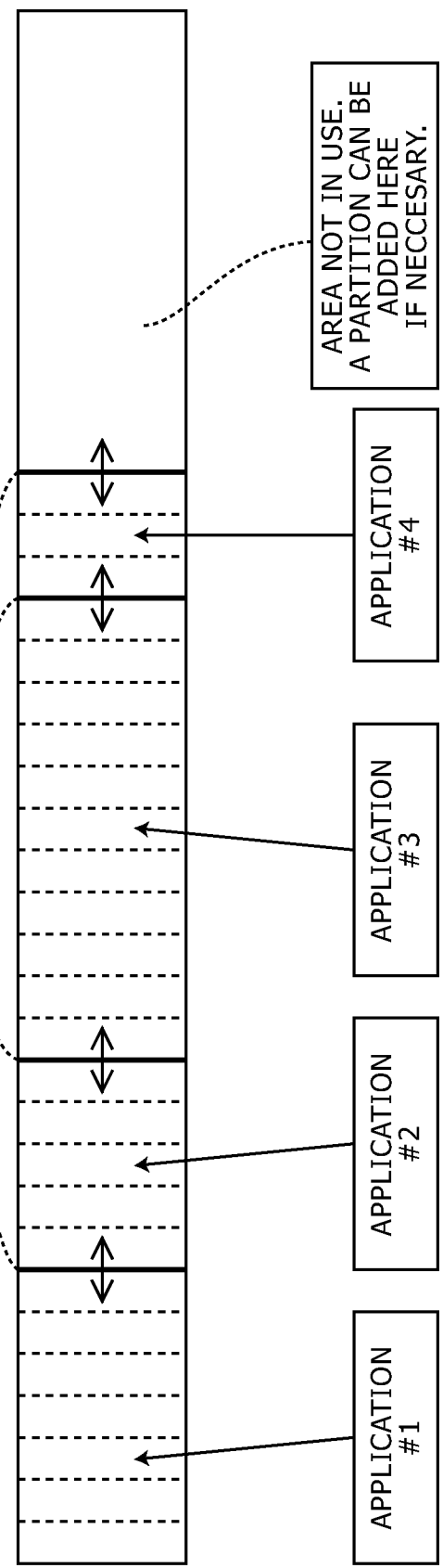
FIG. 33 shows a diagram which indicates a relationship between an application and a memory map in an ordinary memory pool method #3.

In order to solve the aforementioned problem, a physical memory space is divided into small-size areas (hereinafter, this small-size area is called as "micro-partition"), and a logical address space is converted to a physical memory space in the micro-partitions (see FIG. 33).

According to this method, even if physical address spaces are not continuous over the micro-partitions, a continuous logical address space is allocated. As the result, a continuous large memory space is allocated.

Figure 34:
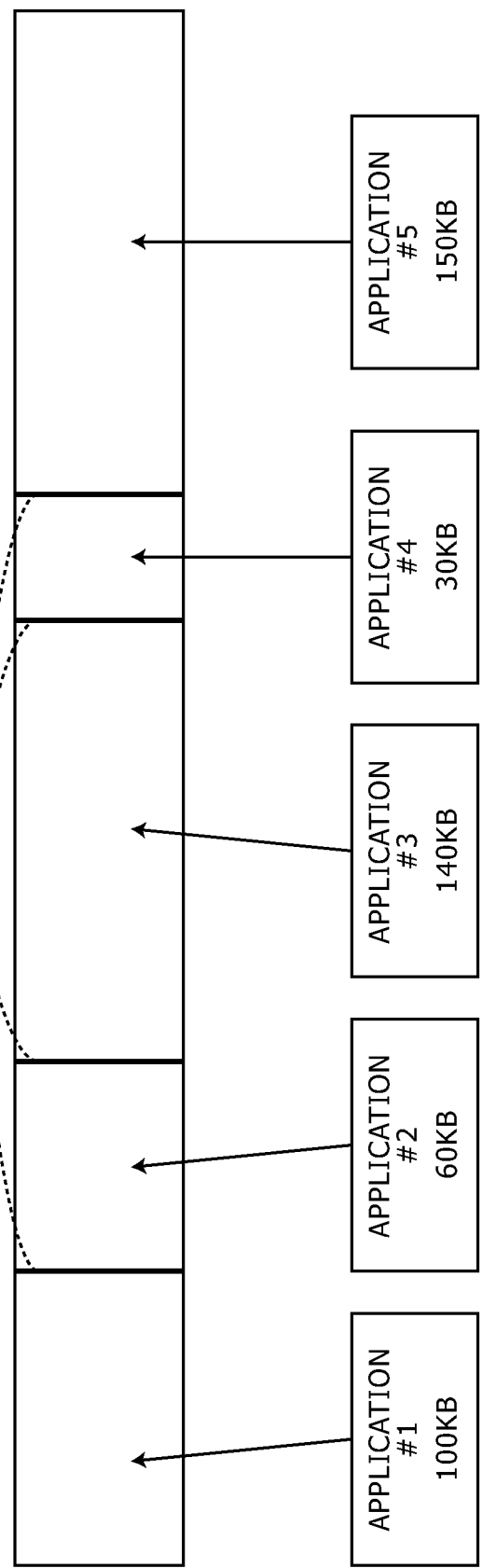
FIG. 34 shows a diagram which indicates a relationship between a memory map and partitions in the ordinary memory pool method #2.

For example, in the ordinary system of memory pools for applications as shown in FIG. 32, at first, memory areas are allocated with partition sizes specified in Table 2, and afterward, if memory areas are required for data with data sizes specified in Table 2, then since the data sizes are greater than the partition sizes, memory allocation can not be performed. The memory map in this situation is shown in FIG. 34.

TABLE 2

| APPLI-CATION | PARTITION SIZE | DATA SIZE | DESCRIPTION |
| --- | --- | --- | --- |
| APPLI-CATION#1 | 100 KB | 110 KB | DISABLE TO ALLOCATE DUE TO FULL CAPACITY |
| APPLI-CATION#2 | 60 KB | 40 KB | |
| APPLI-CATION#3 | 140 KB | 130 KB | |
| APPLI-CATION#4 | 30 KB | 70 KB | DISABLE TO ALLOCATE DUE TO FULL CAPACITY |
| APPLI-CATION#5 | 150 KB | 130 KB | |
| TOTAL | 480 KB | 480 KB | |

Figure 35:
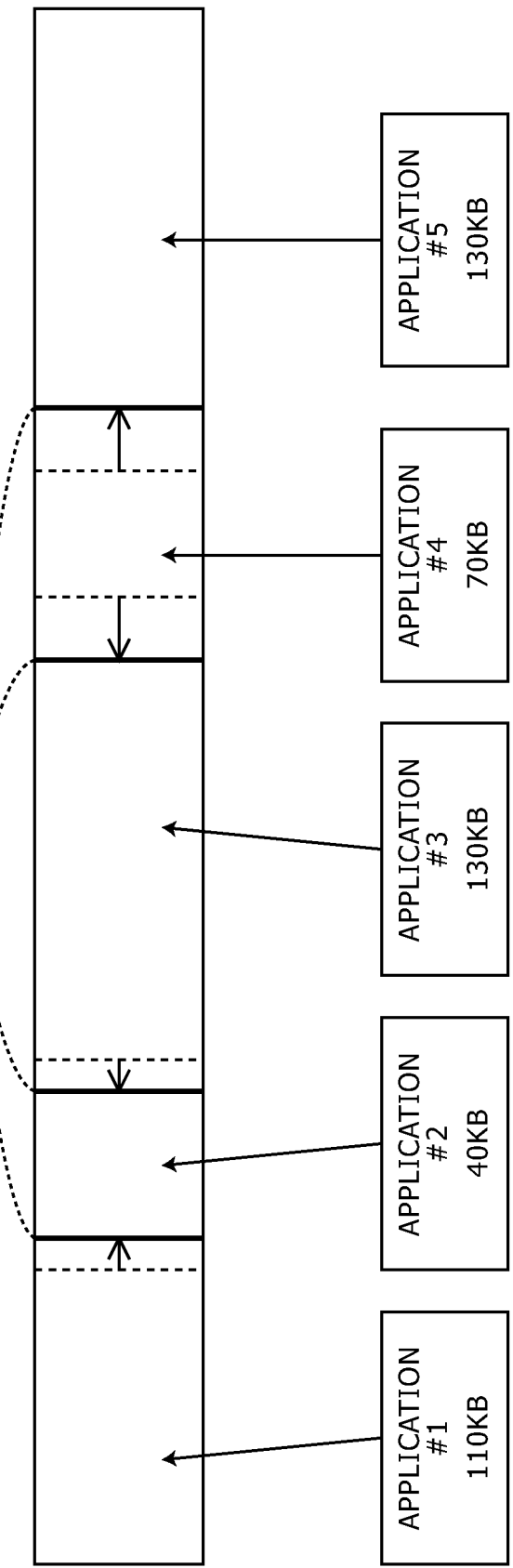
FIG. 35 shows a diagram which indicates a relationship between a memory map and partitions in the ordinary memory pool method #3.
Figure 36:
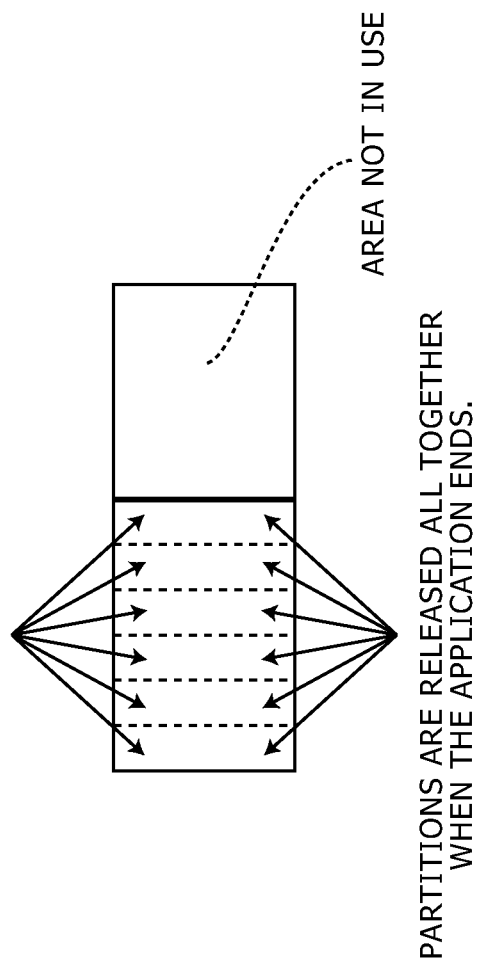
FIG. 36 shows a diagram which indicates a memory map of partitions to be collectively released for an application.
Figure 37:
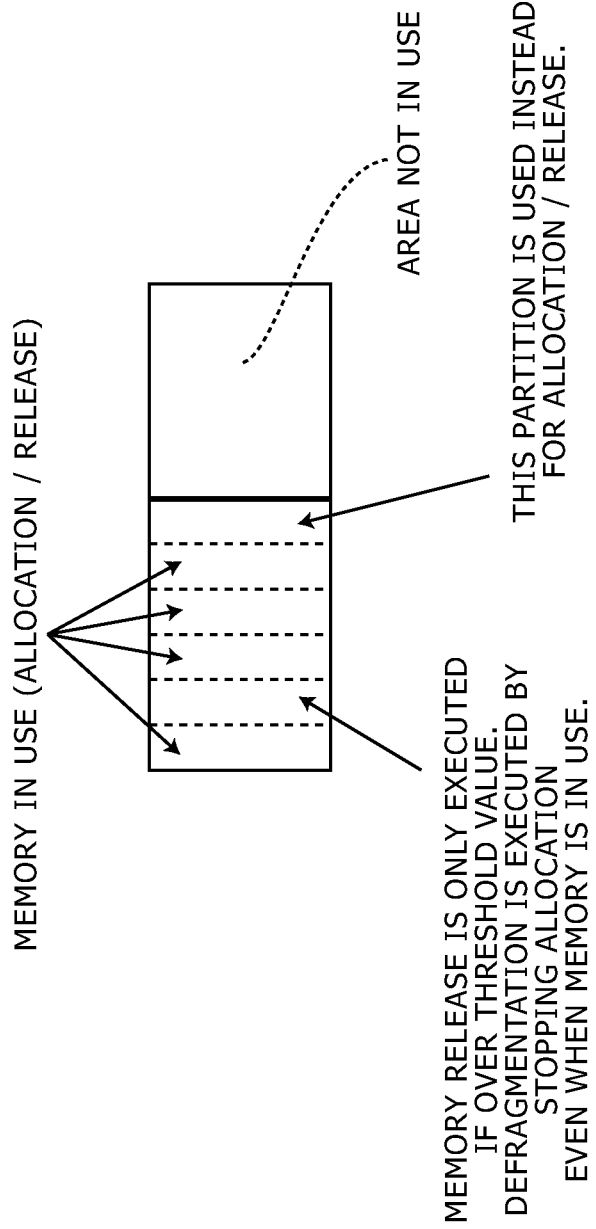
FIG. 37 shows a diagram which indicates a memory map in a memory management method having an upper-most threshold value of fragmentation.

On the other hand, in the system which performs conversion between a physical address space and a logical address space by using micro-partitions, the partition sizes are changeable, and are changed if necessary as shown in Table 3 (that is, the partition size is changed by allocating an additional micro-partition to the logical address space or releasing a micro-partition which has been allocated to the logical address space). Therefore, this solves the aforementioned problem due to the large data size (see FIGS. 33, 36 and 37). In this method, the application is not required to allocate its memory pool when it is started, and the memory manager allocates a memory using divided physical partitions. The memory map in this situation is shown in FIG. 35. The physical partitions in FIG. 35 are continuous, but the physical partitions may not be continuous.

TABLE 3

| APPLI-CATION | PARTITION SIZE | DATA SIZE | STATUS |
| --- | --- | --- | --- |
| APPLI-CATION#1 | CHANGEABLE | 110 KB | AVAILABLE TO ALLOCATE DUE TO CHANGEABLE PARTITION SIZE |
| APPLI-CATION#2 | CHANGEABLE | 40 KB | |
| APPLI-CATION#3 | CHANGEABLE | 130 KB | |
| APPLI-CATION#4 | CHANGEABLE | 70 KB | AVAILABLE TO ALLOCATE DUE TO CHANGEABLE PARTITION SIZE |
| APPLI-CATION#5 | CHANGEABLE | 130 KB | |
| TOTAL | 480 KB | 480 KB | |

[Areas not in Use in a Partition]

Figure 38:
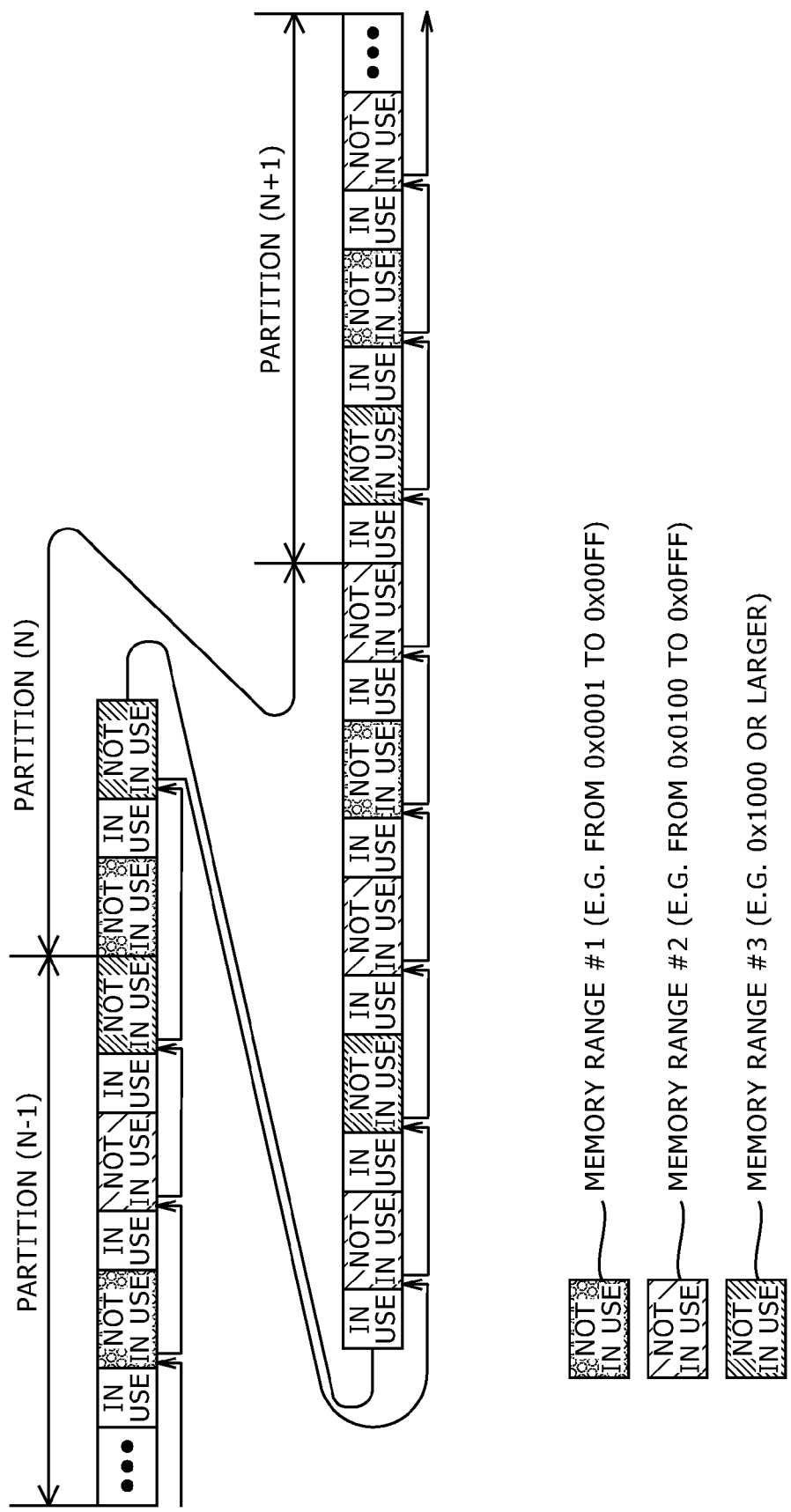
FIG. 38 shows a memory map which indicates linkage between areas not in use using MCBs.

In the method which converts a logical address space and a physical address space by using the aforementioned micro-partitions, the whole memory space is classified into (a) memory spaces used by applications and (b) memory spaces not in use. The memory spaces not in use are concatenated with a link list structure as shown in FIG. 38.

This method is adopted to search for a memory space sufficient for a memory allocation request from an application. Here, by searching for a memory space of which the size is greater than the size required in the request and as small as possible, memory usage efficiency increase, and fragmentation does not increase. In this method, at first, the size of a memory area specified by a pointer is compared with the required size; if the size of the memory area is sufficient for the required size, then this area is allocated; but if the size of the memory area is not sufficient for the required size, then the next memory area is identified with a pointer in this area, and is also checked. This link list structure is independent from the size of a memory area not in use, and simply has a series of linkages in an address space, and thus, it takes a lot of time to find an area not in use having the optimal size.

To solve this problem, in the memory management system of Embodiment 4, each of physical partitions has independent link list structures of areas not in use (i.e. blocks not in use), and the link list structures are formed for respective different memory ranges (i.e. size ranges) into which the sizes of areas are classified.

Figure 39:
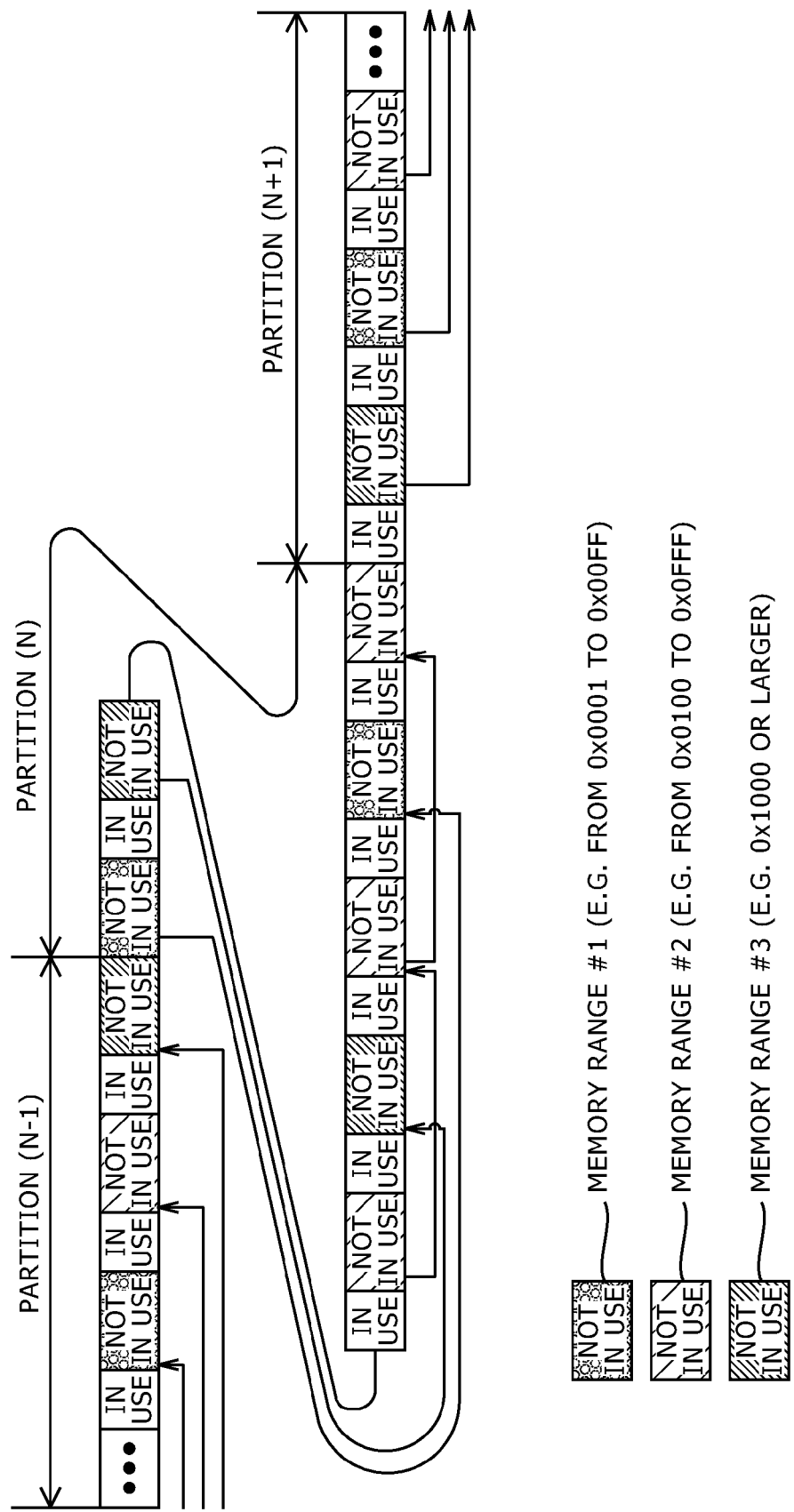
FIG. 39 shows a memory map which indicates grouping areas not in use for each size of the areas in each partition in Embodiment 4.

In an instance shown in FIG. 39, memory areas not in use are classified into three ranges:

(1) Memory range #1, that is, the range from 0x0001 to 0x00FF, (2) Memory range #2, that is, the range from 0x0100 to 0x0FFF, and (3) Memory range #3, that is, the range of 0x1000 or larger.

For each of the memory ranges, there is an independent link list structure to concatenate areas not in use.

[Configuration]

A configuration of a memory management system according to Embodiment 4 is the same as that of Embodiment 3.

[Explanation of Detailed Operations]

Comparing with the method described in "The C programming language (2nd edition)" (Authors: Karnighan and Ritchie, Prentice Hall) (hereinafter, this is called as "Literature 1"), the detailed mechanism of this system is explained below.

FIG. 39 shows a detailed structure of areas not in use and areas in use in the memory map. Each of the memory areas has a header which is called as MCB (Memory Control Block), and has an available area next to the MCB. The MCB has a pointer (ptr) at the head, and has area size (size). The pointer specifies the next memory area in the same group (i.e. in the same memory range).

The pointer (ptr) in an area in use is not used, and the pointer (ptr) in an area not in use is used to specify the next area not in use. The set of the MCB and the available area is called as "memory block". Contents of the MCB are indicated in Table 4.

TABLE 4

| NAME | VALUE | DESCRIPTION |
|---|---|---|
| PTR | POINTER TO MCB | INDICATE A HEAD ADDRESS OF A MEMORY BLOCK NOT IN USE |
| SIZE | NUMBER OF BYTES | INDICATE THE SIZE OF AVAILABLE AREA IN THE MEMORY BLOCK |

Figure 40:
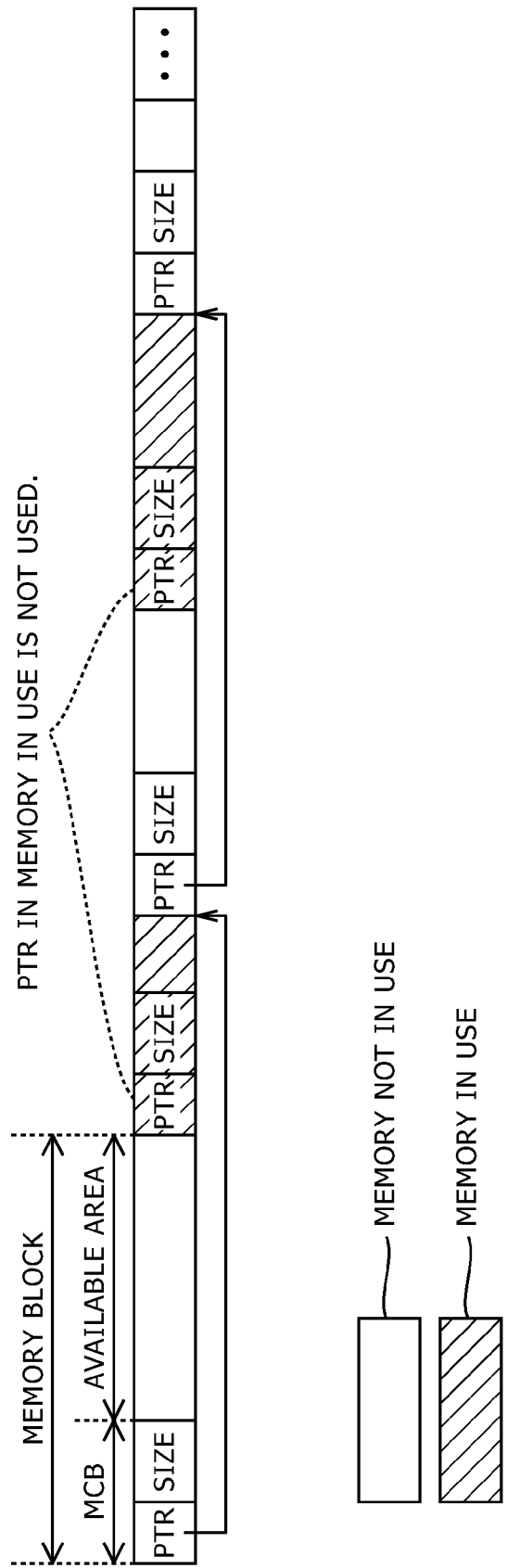
FIG. 40 shows a diagram foe explaining memory allocation in an ordinary memory management system.

In the algorithm shown in FIG. 40 according to Literature 1, a list structure of memory blocks not in use ranges over all the partitions. Therefore, it sometimes takes a lot of time for an allocation process.

Further, the mean time for an allocation process according to this algorithm is longer than that according the aforementioned algorithm that uses list structures in respective physical partitions.

Figure 41:
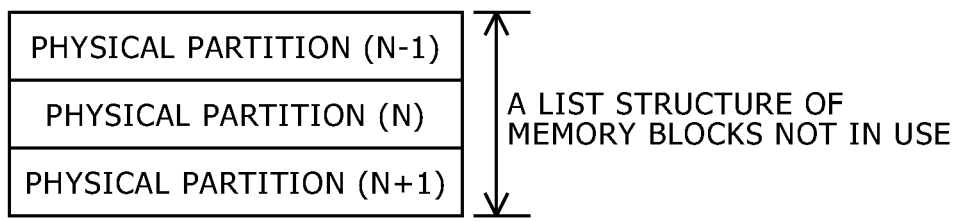
FIG. 41 shows a diagram which indicates that memory blocks not in use are linked through all partitions in a list structure.
Figure 42:
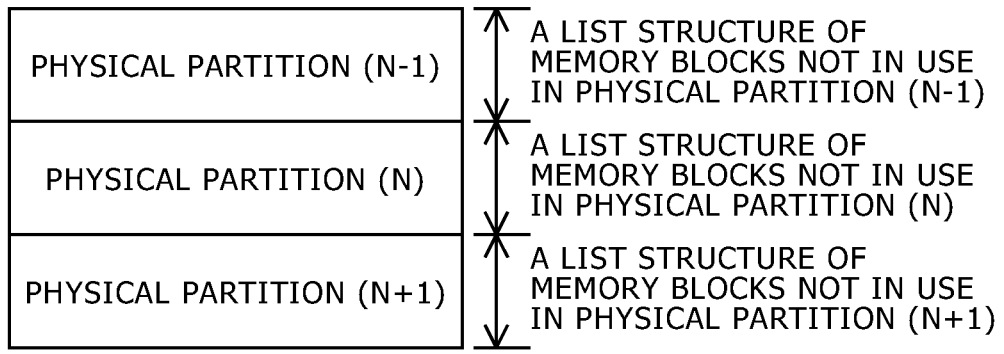
FIG. 42 shows a diagram which indicates that physical partitions separately have respective list structures of memory blocks not in use.

FIG. 41 shows a list structure of memory blocks not in use through all the partitions. FIG. 42 shows list structures of memory blocks not in use in respectives of the physical partitions.

Figure 43:
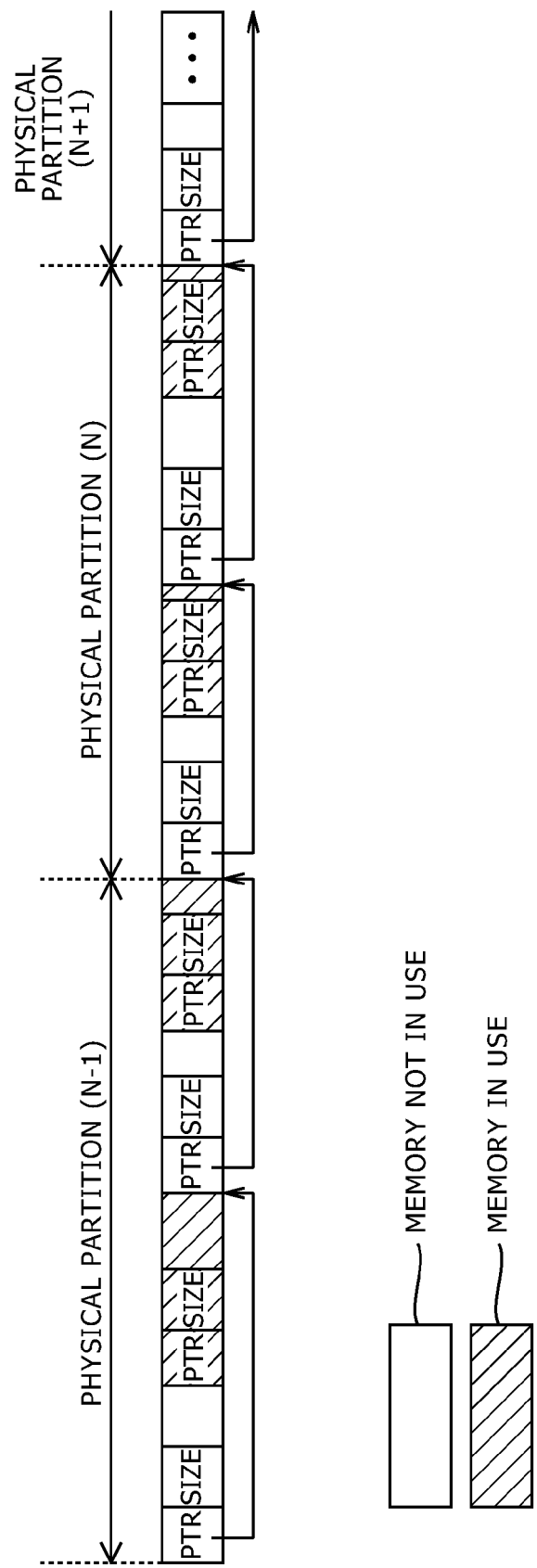
FIG. 43 shows a diagram which indicates that memory blocks not in use are linked through all physical partitions in a list structure.
Figure 44:
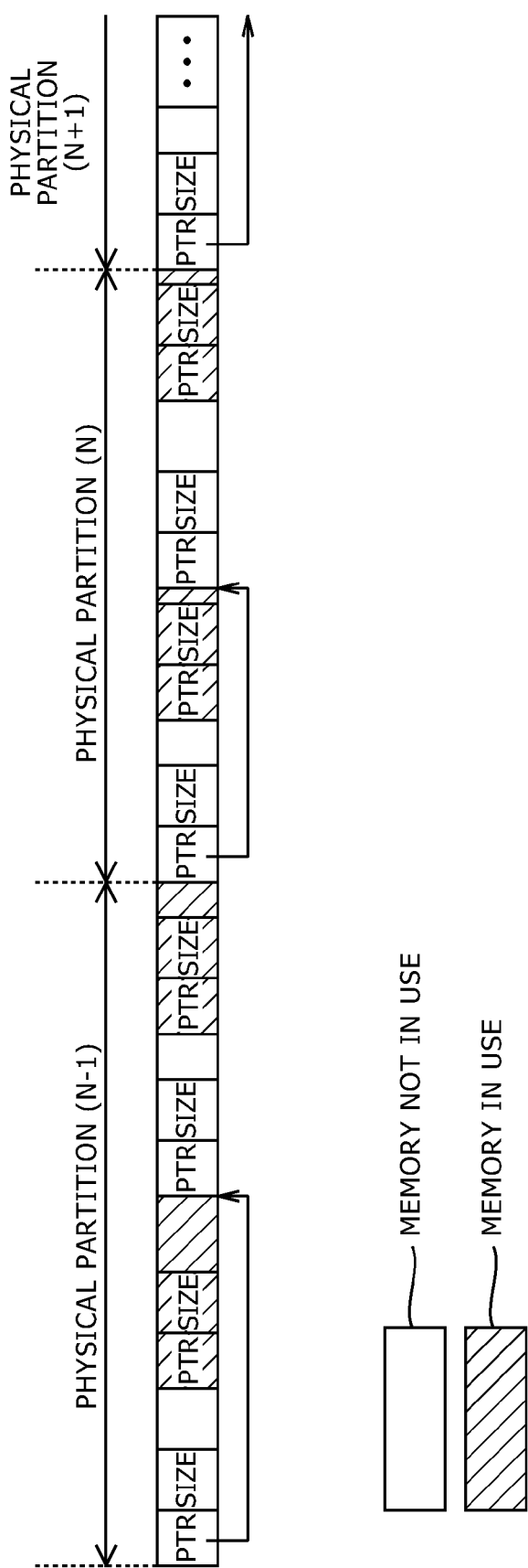
FIG. 44 shows a diagram which indicates that physical partitions separately have respective list structures of memory blocks not in use.

FIG. 43 shows the memory map with the list structure of memory blocks not in use through all the partitions, and FIG. 44 shows the memory map with the list structures of memory blocks not in use in respectives of the physical partitions.

FIG. 45 shows an instance of the conversion tables for the list structure of memory blocks not in use through all the partitions, and FIG. 46 shows an instance of the conversion tables for the list structures of memory blocks not in use in respectives of the physical partitions.

Both of the conversion tables include common items: the micro-partition number, the ID, the flag, the physical starting address, the length (i.e. size), the logical starting address, and the pointer to the linked table. The ID indicates an application which uses the memory block (i.e. micro-partition). The pointer to the linked table is a pointer to the next conversion table of the next memory block not in use.

The conversion table shown in FIG. 46 has the item "pointer to first MCB", which that shown in FIG. 45 does not have. This item is explained here.

Figure 47:
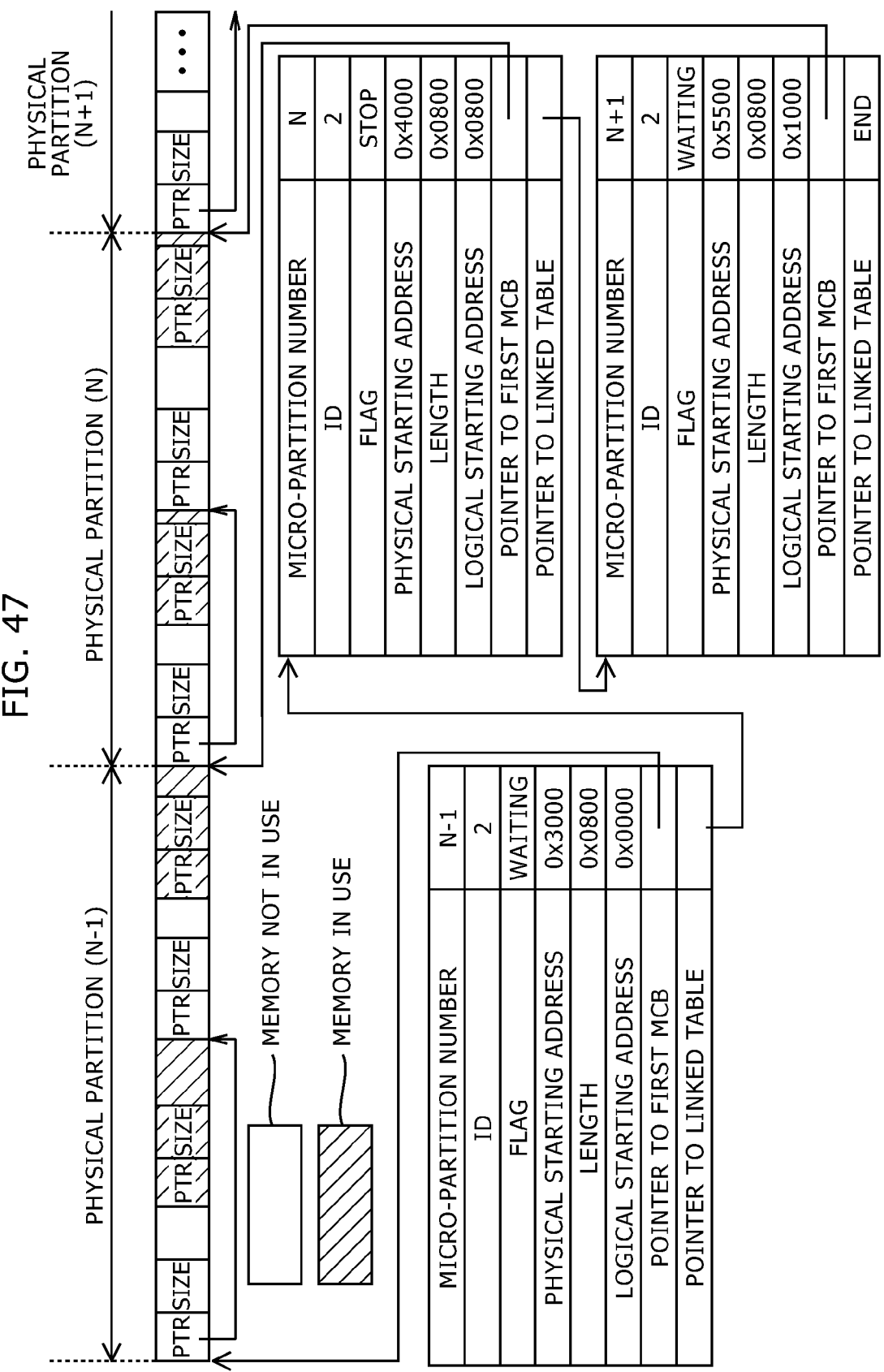
FIG. 47 shows a diagram which indicates a relationship between a conversion table and MCBs.

FIG. 47 shows the memory map (in the upper side) and the conversion table (in the lower side) in case of the list structures of memory blocks not in use in respectives of the physical partitions, and in FIG. 47, the pointers to the first MCB specifies respective head addresses of memory area not in use in respective physical partitions.

Since this method searches for a memory area not in use only in each of the physical partitions, memories not in use are efficiently allocated.

Figure 48:
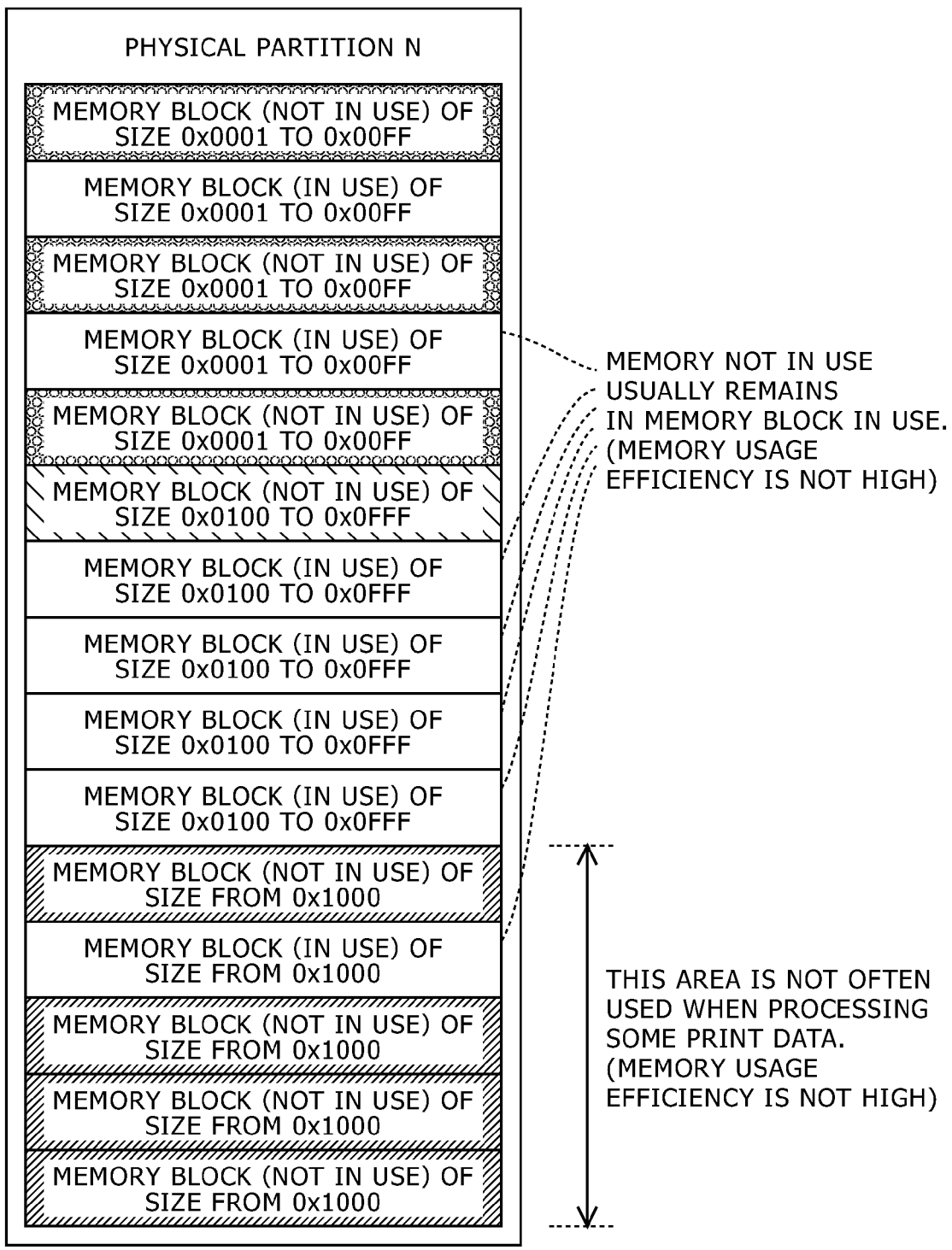
FIG. 48 shows an instance of a memory map in a partition with allocation by BSD malloc.

FIG. 48 shows an instance of the memory map in case of memory allocation using the BSD malloc described in Literature 1. In general, in the memory allocation using the BSD malloc, blocks with pluralities of sizes are prepared in advance, and the block that has the requested memory size is allocated. This method performs high-speed memory allocation, but its memory efficiency is low.

Figure 49:
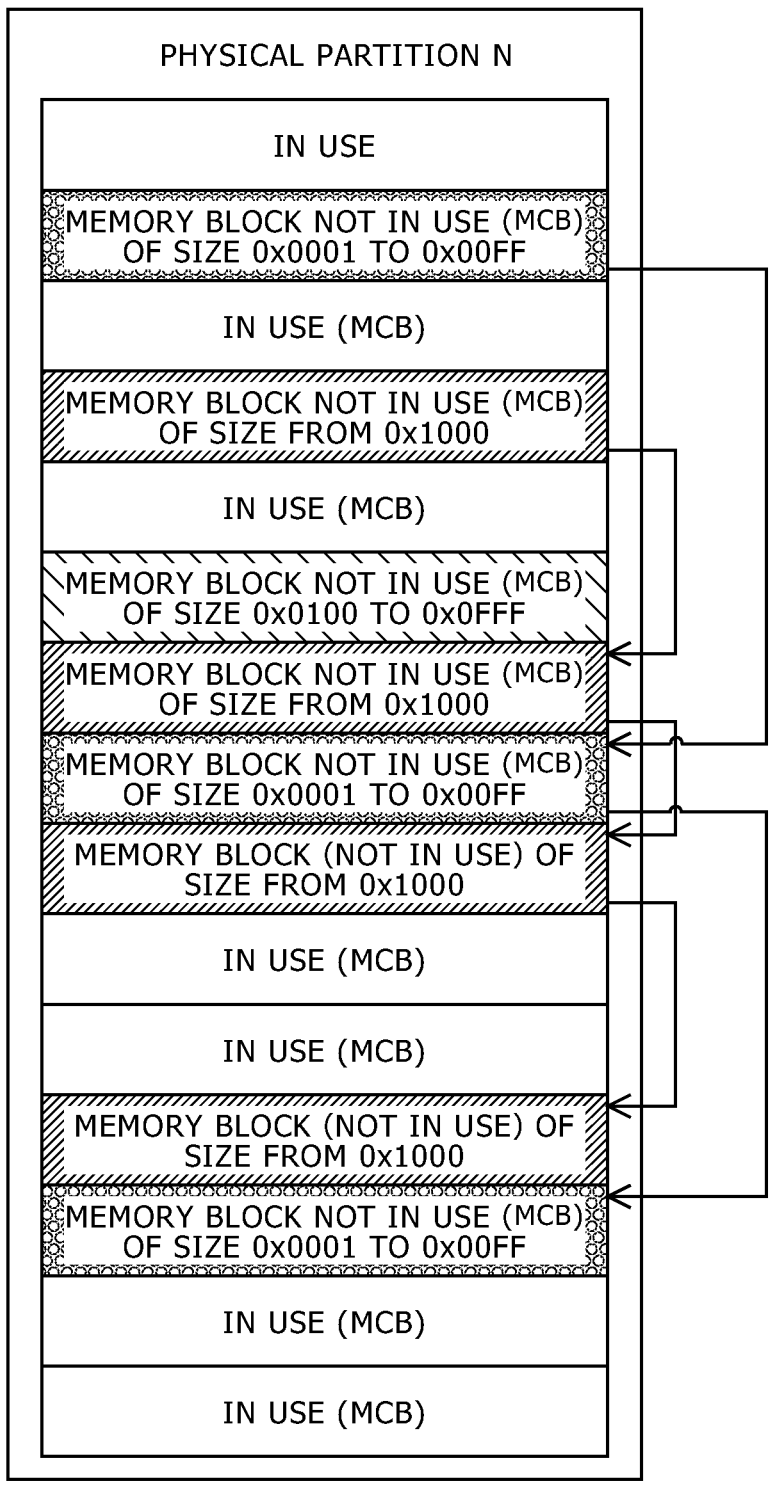
FIG. 49 shows an instance of a memory map in a partition with list structures corresponding to respective allocation sizes of memory blocks not in use.

On the other hand, FIG. 49 shows a memory map and link list structures of areas not in use in case of memory allocation performed by the memory management system of Embodiment 4. In this system, since different list structures are formed corresponding to allocation sizes, the number of times of searching a block in turn is reduced.

Figure 50:
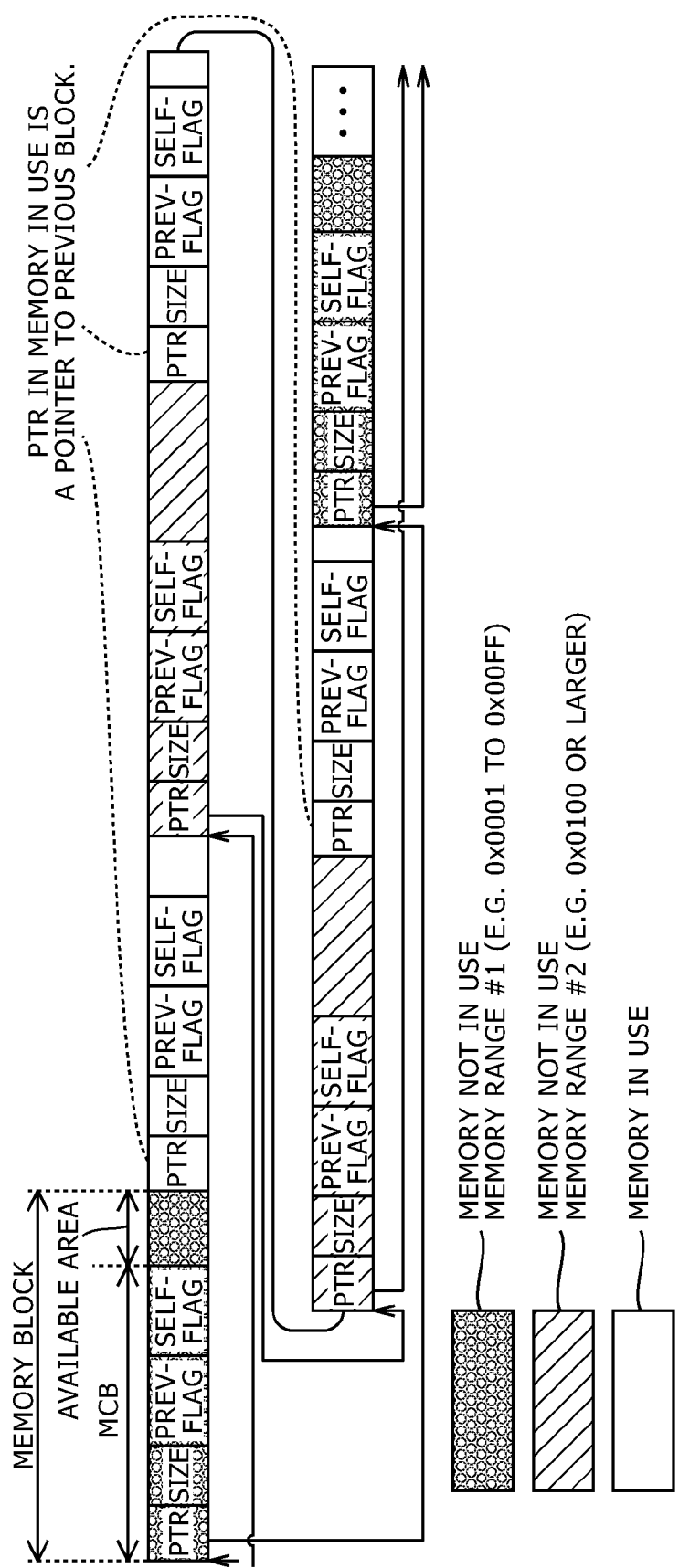
FIG. 50 shows an instance in which list structures are used corresponding to respective allocation sizes of memory blocks not in use.

FIG. 50 shows a detailed memory map in the memory management system of Embodiment 4. Memory areas not in use are classified into Memory range #1 and Memory range #2 according to their sizes, and one of the memory ranges has a link list structure different from that of the other. In this system, the MCB contains "prev-flag" and "self-flag" as shown in Table 5.

TABLE 5

| NAME | VALUE | DESCRIPTION |
|---|---|---|
| PTR | POINTER TO MCB | INDICATE A HEAD ADDRESS OF THE NEXT BLOCK NOT IN USE IN THE SAME MEMORY RANGE, IF SELF-FLAG IS "NOT IN USE". INDICATE A HEAD ADDRESS OF THE PREVIOUS BLOCK, IF SELF-FLAG IS "IN USE" AND THE PREVIOUS BLOCK IS NOT IN USE. IF SELF-FLAG IS "IN USE" AND THE PREVIOUS BLOCK IS IN USE, THE VALUE OF PTR IS INDEFINITE. |
| SIZE | NUMBER OF BYTES | INDICATE THE SIZE OF AN AVAILABLE AREA IN THE MEMORY BLOCK. |
| PREV-FLAG | "IN USE" OR "NOT IN USE" | INDICATE STATUS OF THE PREVIOUS ADJACENT MEMORY BLOCK. |
| SELF-FLAG | "IN USE" OR "NOT IN USE" | INDICATE STATUS OF THE MEMORY BLOCK CONTAINING THIS MCB. |

As shown in Table 5, the prev-flag indicates the status of the adjacent previous memory block (either "in use" or "not in use"). The self-flag indicates the status of the memory block including this self-flag itself. The status "in use" means that the memory block is now allocated, and the status "not in use" means that the memory block is not allocated now.

If the self-flag indicates "not in use", then the ptr specifies the head of the next block in the same memory range. If the self-flag indicates "in use", then the ptr specifies the head address of the previous block not in use.

Figure 53:
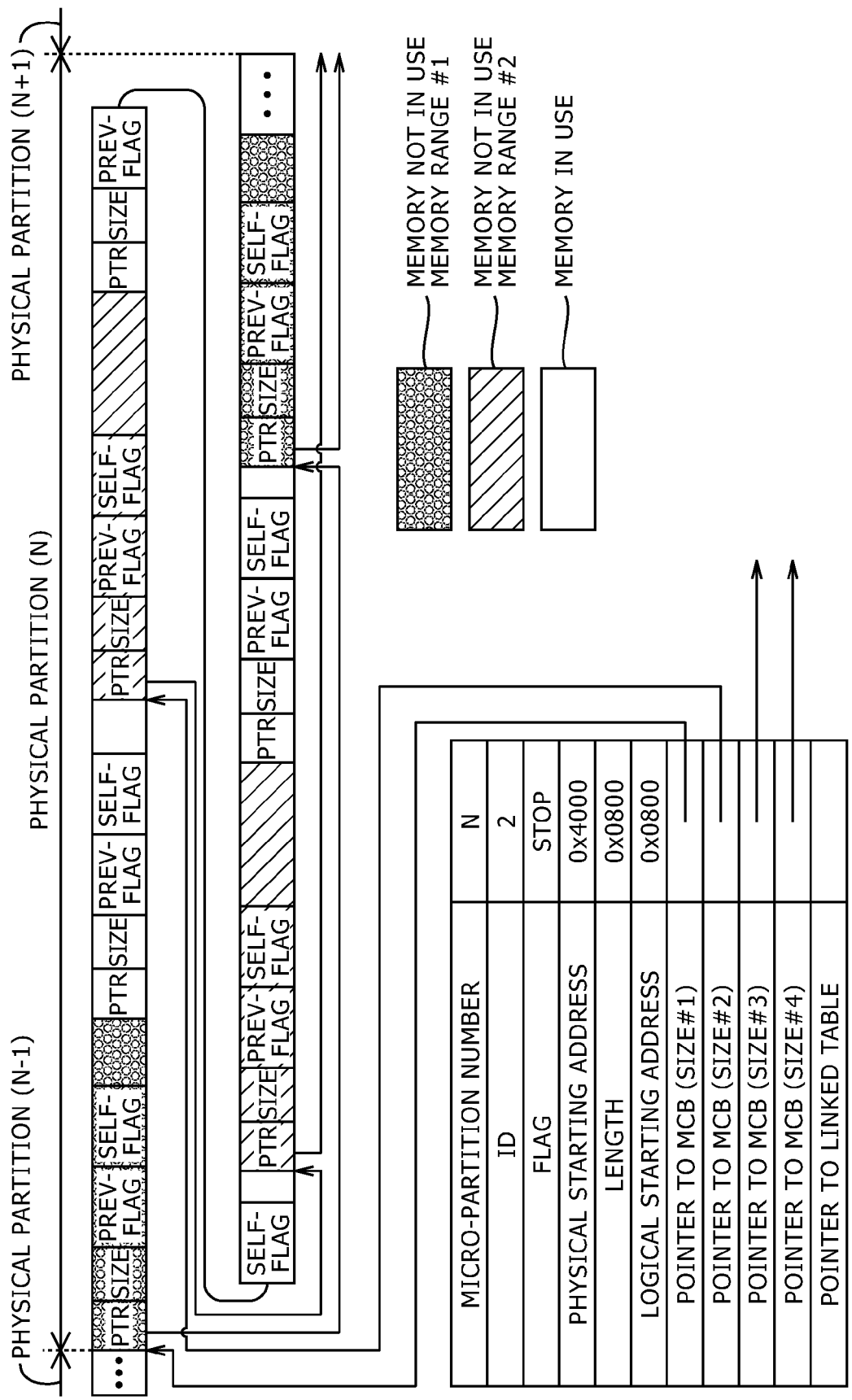
FIG. 53 shows a diagram which indicates a relationship between a conversion table and MCBs.

FIG. 51 shows a conversion table in case that there are the four memory ranges #1 to #4 of allocation sizes, and list structures of memory blocks not in use are formed for respective memory ranges. Each of the conversion tables shown in FIG. 46 contains one pointer to a MCB, but the conversion table shown in FIG. 51 contains pointers to MCBs corresponding to respectives of the memory ranges. As shown in FIG. 53, in the memory map, four pointers for Sizes #1 to #4 (i.e. Memory ranges #1 to #4) specify respective heads of the first areas in the link list structures of areas not in use corresponding to the memory ranges.

FIG. 52 shows an instance of linkages of the conversion tables shown in FIG. 51. The pointer to the linked table in the conversion table specifies the next table, and the pointer to the linked table in the last conversion table indicates "END", namely, "invalid".

FIG. 53 shows a relationship between the conversion table and the MCBs. The pointers to the first MCBs for respective memory ranges specify the head addresses of the first blocks not in use in respectives of the memory ranges.

FIGS. 54A to 54D show ordinary memory release of memory blocks described in Literature 1. This ordinary memory release does not use a list structure of memory blocks not in use.

In the instance shown in FIG. 54A, the statuses of the memory blocks "A" to "E" are "in use", "not in use", "in use", "not in use", and "in use", respectively, and here if the memory block "C" is released, then a continuous area not in use ("B"+"C"+"D") is formed, and the previous area not in use is "B" and the next area not in use is "D".

In the instance shown in FIG. 54B, the statuses of the memory blocks "A" to "E" are "not in use", "in use", "in use", "not in use", and "in use", respectively, and here if the memory block "C" is released, then a continuous area not in use ("C"+"D") is formed, and the previous area not in use is "A" and the next area not in use is "D".

In the instance shown in FIG. 54C, the statuses of the memory blocks "A" to "E" are "in use", "not in use", "in use", "in use", and "not in use", respectively, and here if the memory block "C" is released, then a continuous area not in use ("B"+"C") is formed, and the previous area not in use is "B" and the next area not in use is "E".

In the instance shown in FIG. 54D, the statuses of the memory blocks "A" to "E" are "not in use", "in use", "in use", "in use", and "not in use", respectively, and here if the memory block "C" is released, then the previous area not in use is "A" and the next area not in use is "E".

Figure 55A:
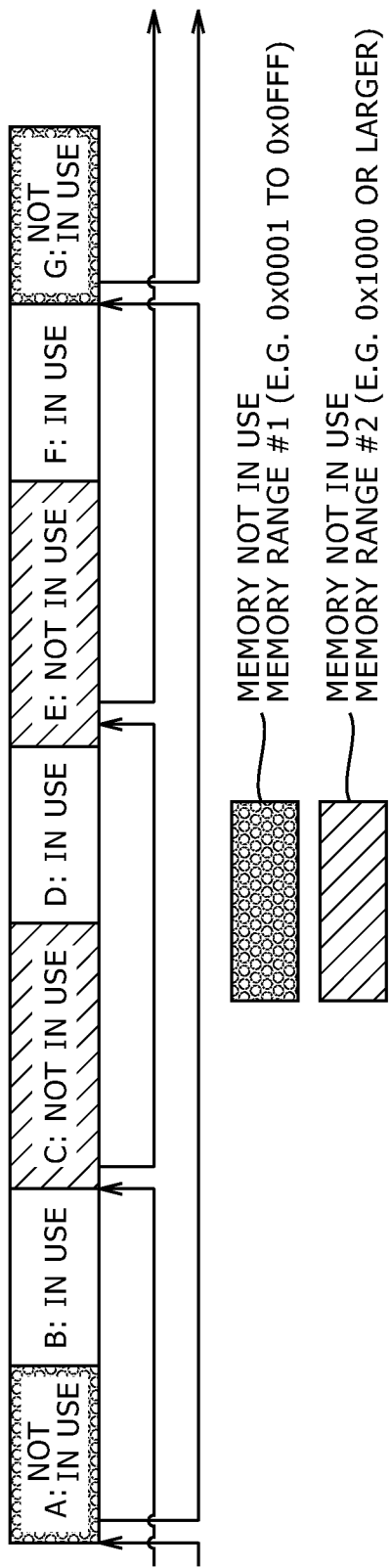
FIGS. 55A and 55B show diagrams for explaining memory release in case of a plurality of list structures of memory blocks not in use.
Figure 55B:
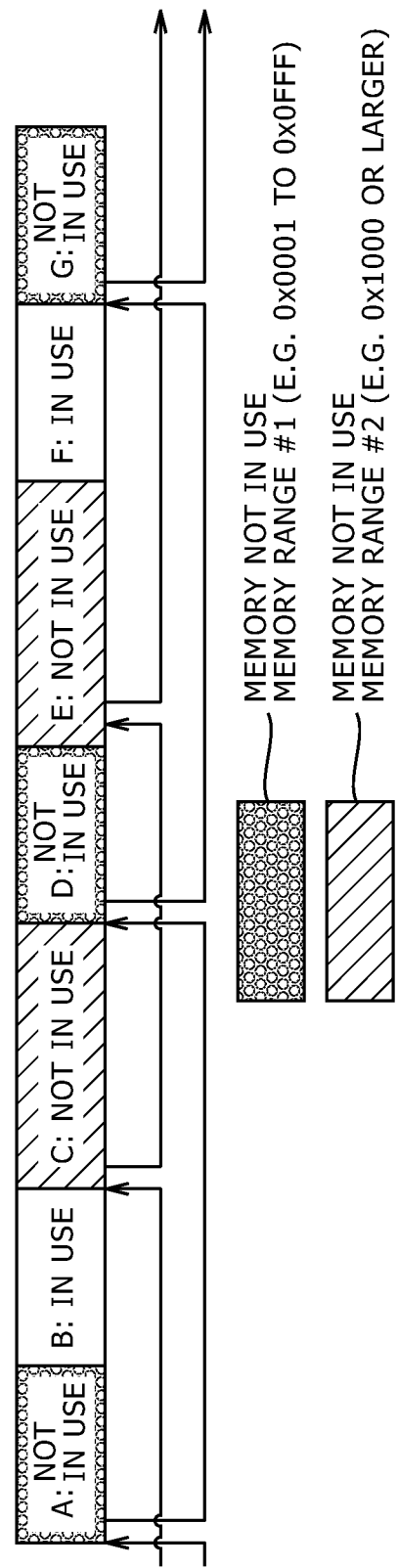

FIGS. 55A and 55B show an instance of memory release in case that link list structures corresponding to respective memory ranges in this embodiment. In FIG. 55A, the statuses of the memory blocks "A" to "G" are "not in use", "in use", "not in use", "in use", "not in use", "in use", and "not in use", respectively, and here if the memory block "D" in use is released, then as shown in FIG. 55B, the memory block "D" changes to "not in use", and since the size of the memory block "D" is in the range of 0x1000 or larger, the memory block "D" not in use is inserted between "A" and "G" which are in the same range.

Even if the algorithm of Literature 1 is applied to this memory release shown in FIGS. 55A and 55B, not only "C" and "D" but "D" and "E" would not be connected, since the previous and the next areas not in use are "A" and "G" respectively and therefore (the address of "A")+(the length of "A")<(the address of "D") and (the address of "D")+(the length of "D")<(the address of "G").

In this embodiment, when the memory block "D" is released, the memory blocks "C", "D" and "E" are concatenated using the following method.

The prev-flag of the memory block "D" is checked to obtain the status of the adjacent memory block "C" ("in use" or "not in use"). If the prev-flag of "D" indicates "not in use", then the ptr of "D" specifies the head address of "C". The self-flag of the memory block "E" is checked to obtain the status of the adjacent memory block "E" ("in use" or "not in use"). Since the head address of the memory block "E" is derived from the head address of "D" and the size of "D", the memory block "E" can be found.

Figure 56:
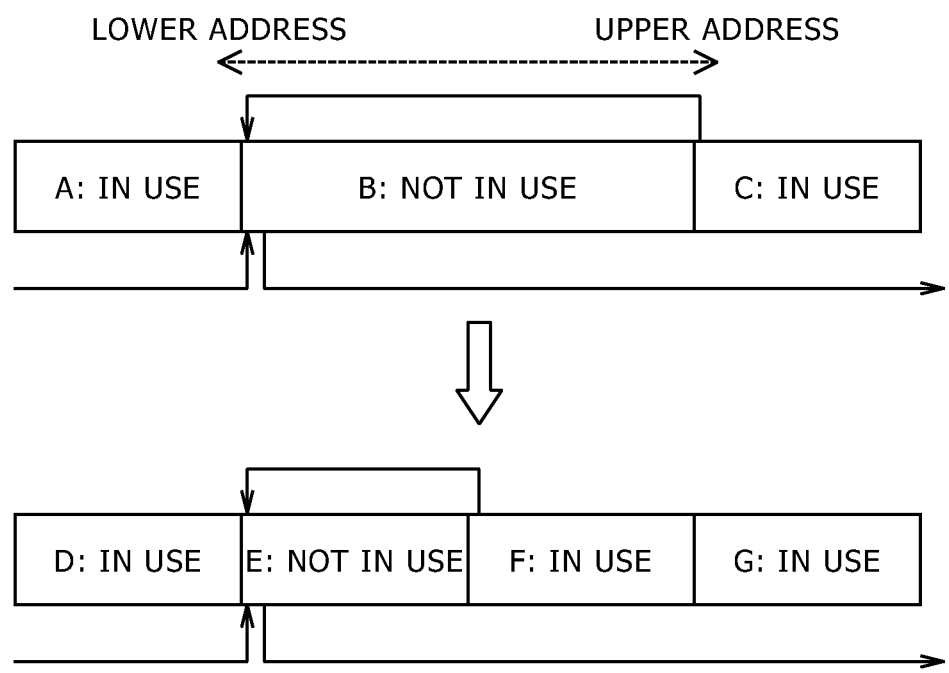
FIG. 56 shows memory maps before and after memory allocation in case that a free area remains after the memory allocation.
Figure 57:
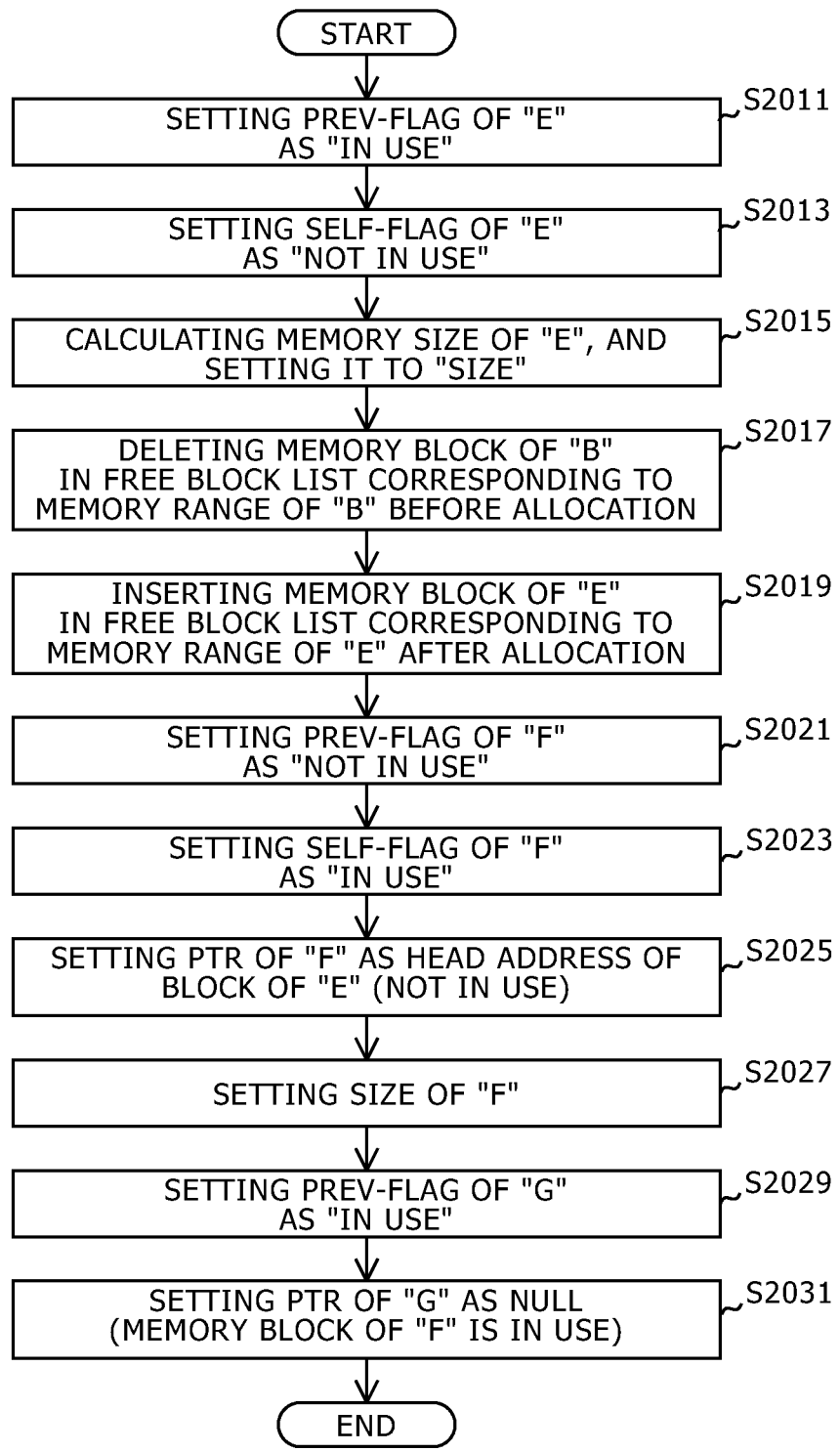
FIG. 57 shows a flowchart of memory allocation in case that a free area remains after the memory allocation.

FIG. 56 shows memory maps before and after memory allocation in case that a free area remains after the memory allocation. FIG. 57 shows a flowchart which indicates operations for the memory allocation. In this memory allocation, the memory block "F" is allocated. Here, the size of the memory block "F" is less than the size of the memory block "B". In FIG. 56, the memory blocks "A" and "C" before the allocation are the memory blocks "D" and "F" after the allocation, respectively.

Each of steps in this process is explained below.

Step S2011: The prev-flag of the memory block "E" is set as "in use".

Step S2013: The self-flag of the memory block "E" is set as "not in use".

Step S2015: The memory size of the memory block "E" is calculated, and this memory size is set to the size of the memory block "E".

Step S2017: The memory block "B" before the allocation is deleted from the free block list (i.e. the list of memory blocks not in use) of the memory range to which the memory block "B" belongs.

Step S2019: The memory block "E" after the allocation is inserted to the free block list of the memory range to which the memory block "E" belongs.

Step S2021: The prev-flag of the memory block "E" is set as "not in use".

Step S2023: The self-flag of the memory block "F" is set as "in use".

Step S2025: The ptr of the memory block "F" is set as the head address of the memory block "E" not in use.

Step S2027: The size of the memory block "F" is set.

Step S2029: The prev-flag of the memory block "G" is set as "in use".

Step S2031: The ptr of the memory block "G" is set as NULL, since the adjacent previous memory block "F" is in use.

By a series of the aforementioned operations, the memory allocation process is performed in case that a free area remains after the memory allocation.

Figure 58:
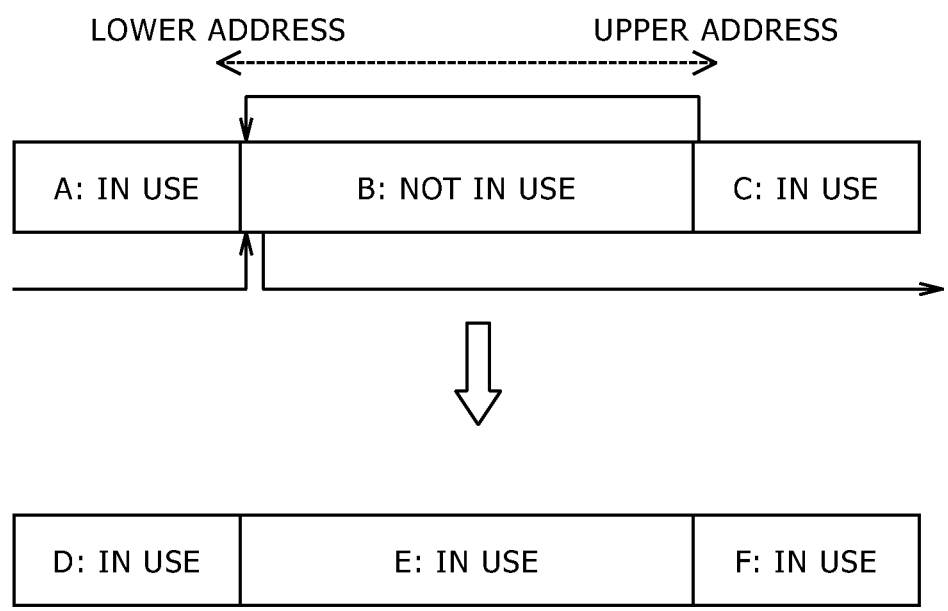
FIG. 58 shows memory maps before and after memory allocation in case that a free area does not remain after the memory allocation.
Figure 59:
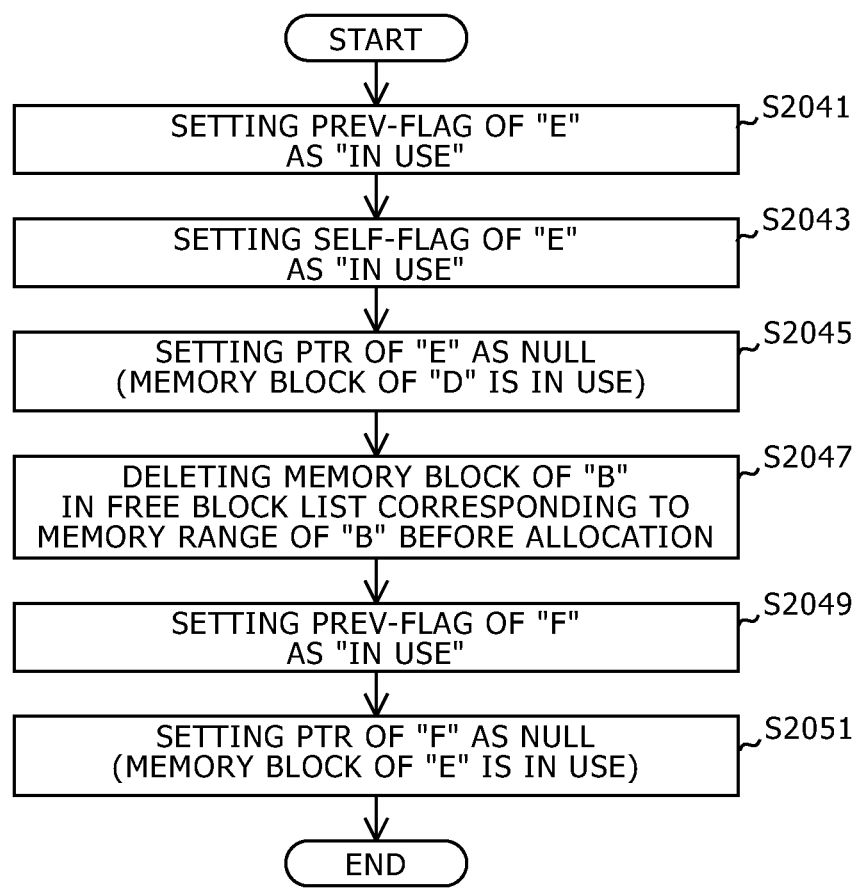
FIG. 59 shows a flowchart of memory allocation in case that a free area does not remain after the memory allocation.

FIG. 58 shows memory maps before and after memory allocation in case that a free area does not remain after the memory allocation. FIG. 59 shows a flowchart which indicates operations for the memory allocation. In this memory allocation, the memory block "F" is allocated. Here, the size of the memory block "F" is the same as the size of the memory block "B". In FIG. 58, the memory blocks "A", "B" and "C" before the allocation are the memory blocks "D", "E" and "F" after the allocation, respectively.

Each of steps in this process is explained below.

Step S2041: The prev-flag of the memory block "E" is set as "in use".

Step S2043: The self-flag of the memory block "E" is set as "in use".

Step S2045: The ptr of the memory block "E" is set as NULL, since the adjacent previous memory block "D" is in use.

Step S2047: The memory block "B" before the allocation is deleted from the free block list of the memory range to which the memory block "B" belongs.

Step S2049: The prev-flag of the memory block "F" is set as "in use".

Step S2051: The ptr of the memory block "F" is set as NULL, since the adjacent previous memory block "E" is in use.

By a series of the aforementioned operations, the memory allocation process is performed in case that a free area does not remain after the memory allocation.

Figure 60:
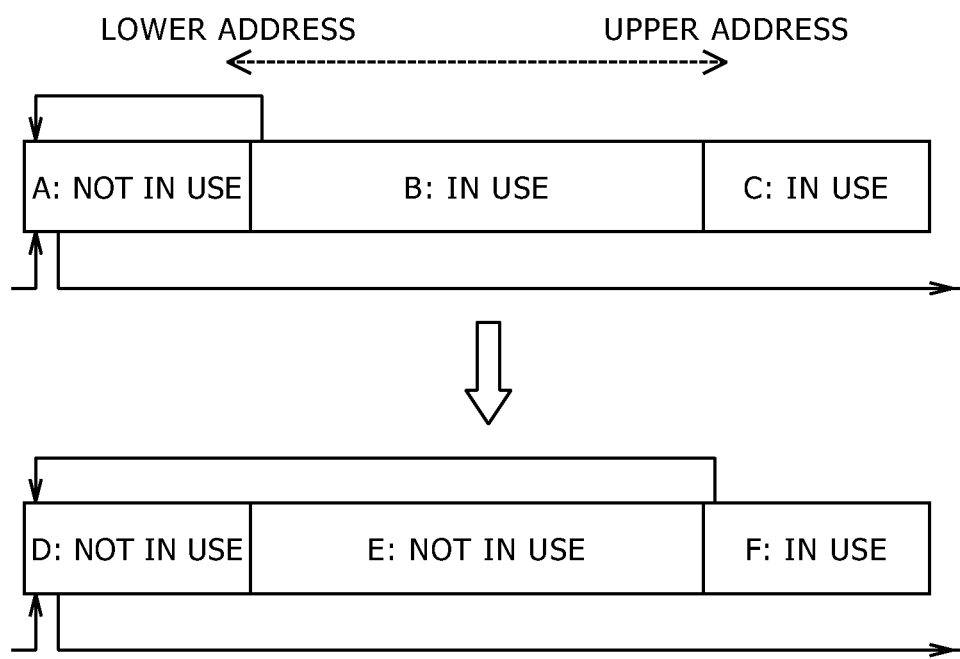
FIG. 60 shows memory maps before and after memory release (in case that the adjacent previous memory block is not in use and the adjacent next memory block is in use)
Figure 61:
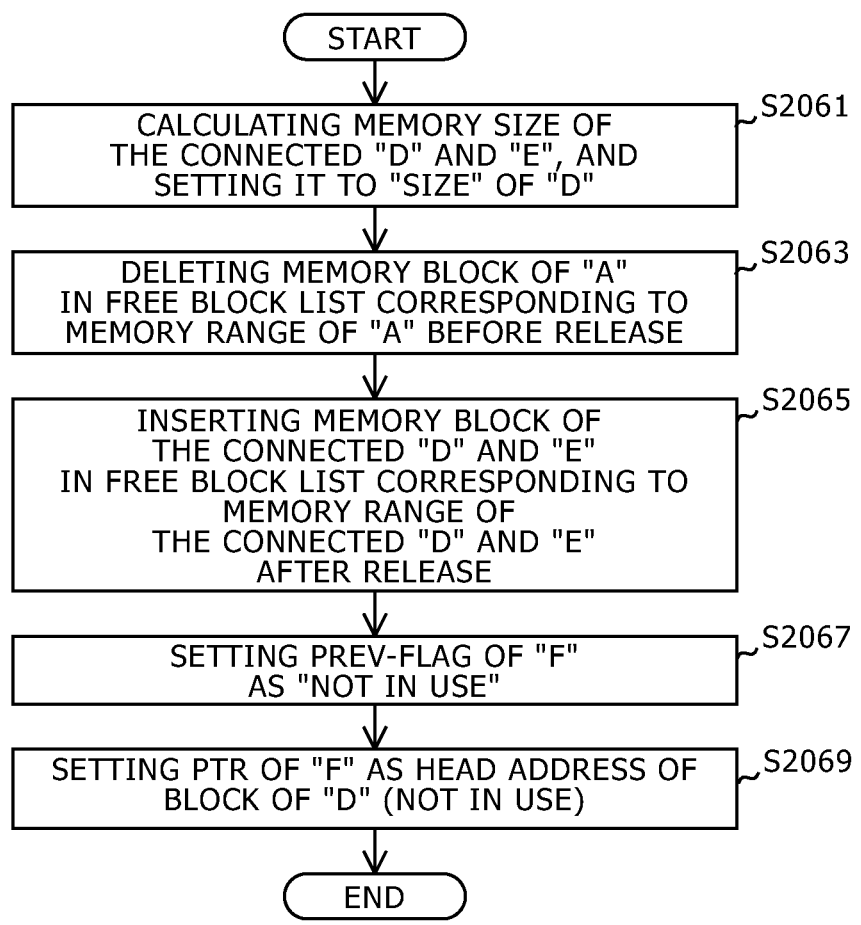
FIG. 61 shows a flowchart of memory release (in case that the adjacent previous memory block is not in use and the adjacent next memory block is in use)

FIG. 60 shows memory maps before and after memory release in case that the adjacent previous memory block is not in use and the adjacent next memory block is in use. FIG. 61 shows a flowchart which indicates operations for the memory release. In this memory release, the memory block "B" is released. Since the prev-flag of the memory block "B" indicates "not in use" and the self-flag of the memory block "C" indicates "in use", the memory block "B" is released with connecting the memory block "E" to the memory block "D". In FIG. 60, the memory blocks "A", "B" and "C" before the release are the memory blocks "D", "E" and "F" after the release, respectively.

Each of steps in this process is explained below.

Step S2061: The size of the connected memory blocks "D" and "E" is calculated, and this size is set to the size of the memory block "D".

Step S2063: The memory block "A" before the release is deleted from the free block list of the memory range to which the memory block "A" belongs.

Step S2065: The memory block generated by connecting "D" and "E" after the release is inserted to the free block list of the memory range to which the generated memory block belongs.

Step S2067: The prev-flag of the memory block "E" is set as "not in use".

Step S2069: The ptr of the memory block "F" is set as the head address of the memory block "D" not in use.

By a series of the aforementioned operations, the memory release process is performed in case that the adjacent previous memory block is not in use and the adjacent next memory block is in use.

Figure 62:
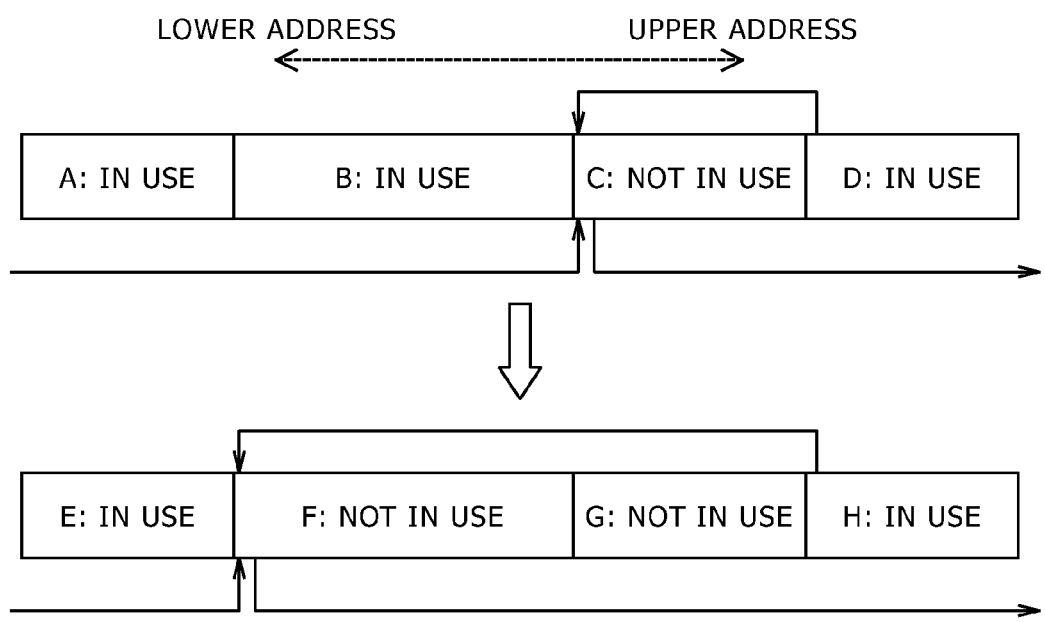
FIG. 62 shows memory maps before and after memory release (in case that the adjacent previous memory block is in use and the adjacent next memory block is not in use)
Figure 63:
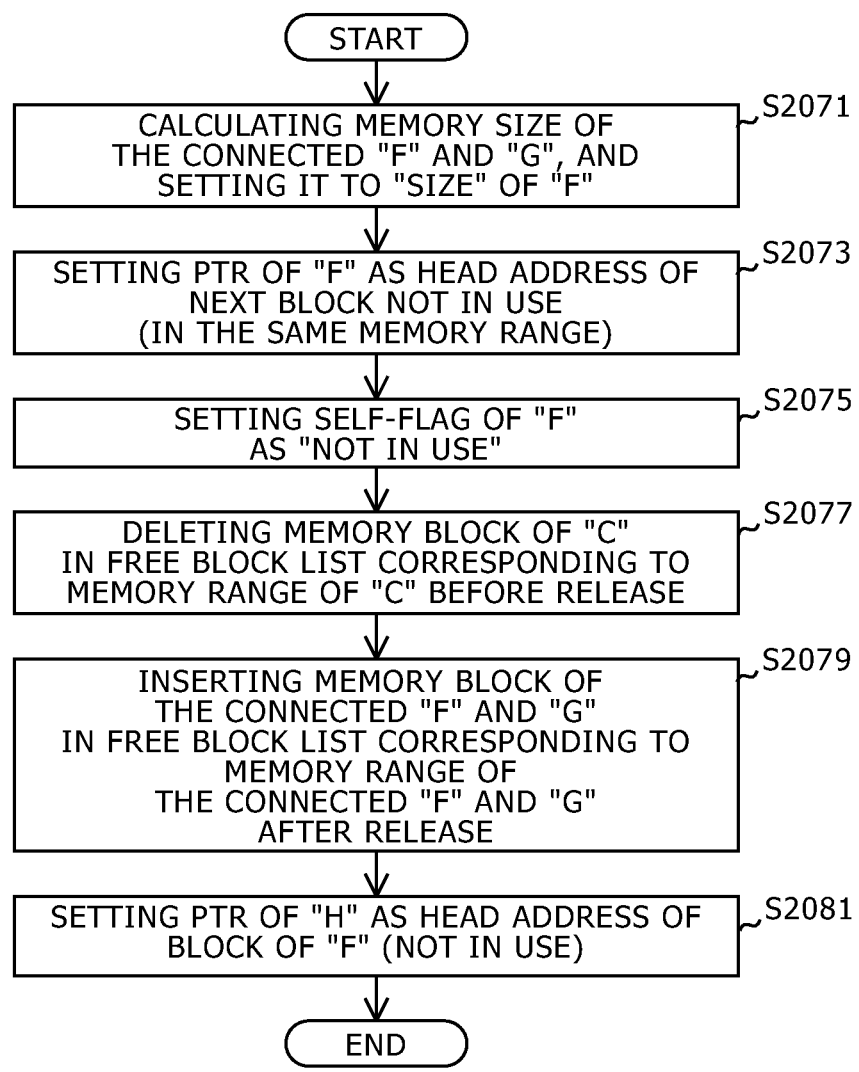
FIG. 63 shows a flowchart of memory release (in case that the adjacent previous memory block is in use and the adjacent next memory block is not in use)

FIG. 62 shows memory maps before and after memory release in case that the adjacent previous memory block is in use and the adjacent next memory block is not in use. FIG. 63 shows a flowchart which indicates operations for the memory release. In this memory release, the memory block "B" is released. Since the prev-flag of the memory block "B" indicates "in use" and the self-flag of the memory block "C" indicates "not in use", the memory block "B" is released with connecting the memory block "G" to the memory block "F". In FIG. 62, the memory blocks "A", "B", "C" and "D" before the release are the memory blocks "E", "F", "G" and "H" after the release, respectively.

Each of steps in this process is explained below.

Step S2071: The size of the connected memory blocks "F" and "G" is calculated, and this size is set to the size of the memory block "F".

Step S2073: The ptr of the memory block "F" is set as the head address of the next block not in use in the same memory range.

Step S2075: The self-flag of the memory block "F" is set as "not in use".

Step S2077: The memory block "C" before the release is deleted from the free block list of the memory range to which the memory block "C" belongs.

Step S2079: The memory block generated by connecting "F" and "G" after the release is inserted to the free block list of the memory range to which the generated memory block belongs.

Step S2081: The ptr of the memory block "H" is set as the head address of the memory block "F" not in use.

By a series of the aforementioned operations, the memory release process is performed in case that the adjacent previous memory block is in use and the adjacent next memory block is not in use.

Figure 64:
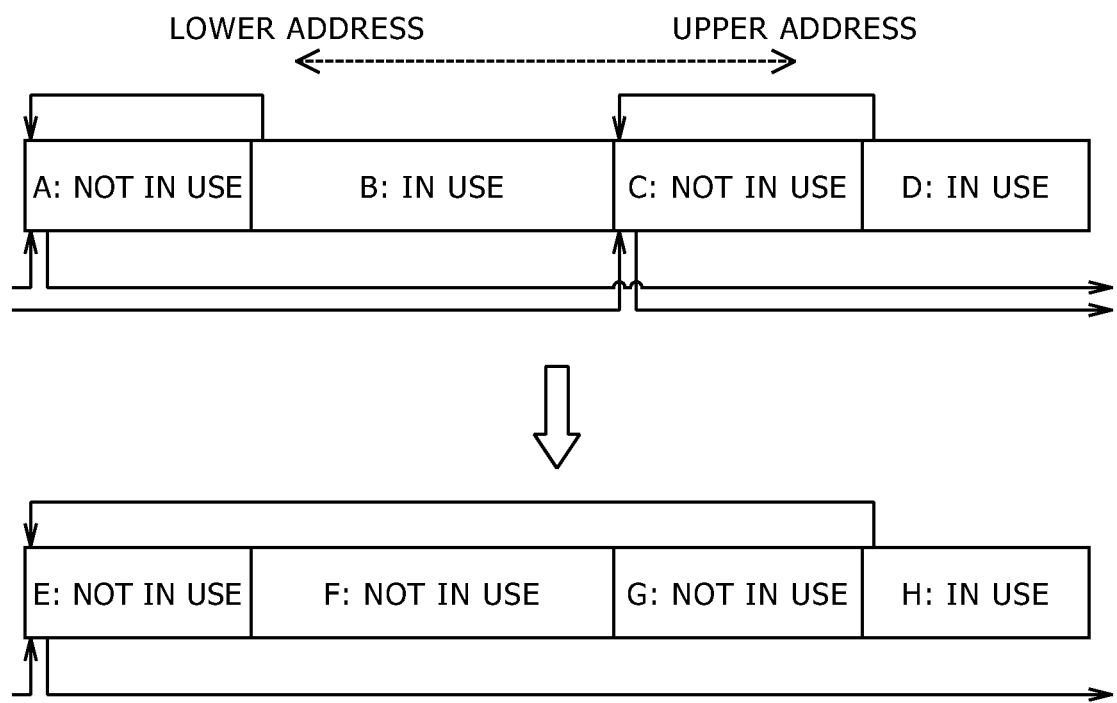
FIG. 64 shows memory maps before and after memory release (in case that the adjacent previous memory block and the adjacent next memory block are not in use)
Figure 65:
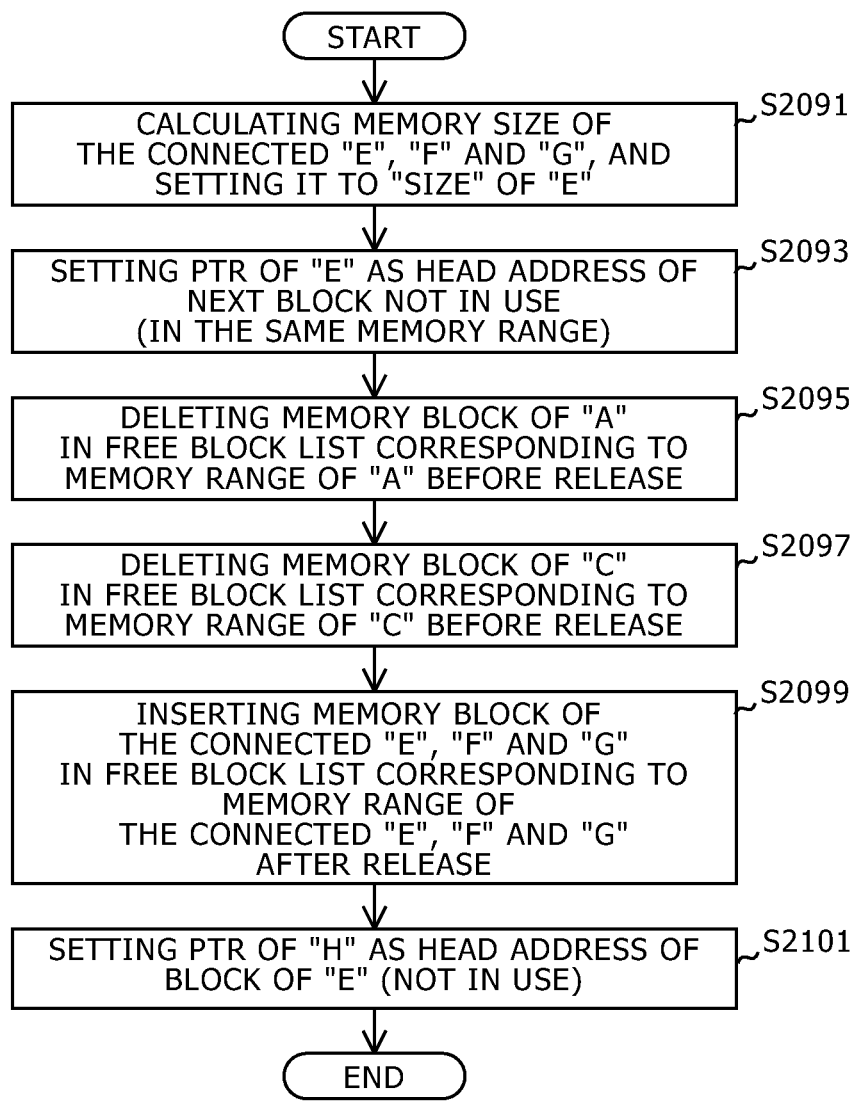
FIG. 65 shows a flowchart of memory release (in case that the adjacent previous memory block and the adjacent next memory block are not in use)

FIG. 64 shows memory maps before and after memory release in case that the adjacent previous memory block and the adjacent next memory block are not in use. FIG. 65 shows a flowchart which indicates operations for the memory release. In this memory release, the memory block "B" is released. Since the prev-flag of the memory block "B" indicates "not in use" and the self-flag of the memory block "C" indicates "not in use", the memory block "B" is released with connecting the memory blocks "E", "F" and "G". In FIG. 64, the memory blocks "A", "B", "C" and "D" before the release are the memory blocks "E", "F", "G" and "H" after the release, respectively.

Each of steps in this process is explained below.

Step S2091: The size of the connected memory blocks "E", "F" and "G" is calculated, and this size is set to the size of the memory block "E".

Step S2093: The ptr of the memory block "E" is set as the head address of the next block not in use in the same memory range.

Step S2095: The memory block "A" before the release is deleted from the free block list of the memory range to which the memory block "A" belongs.

Step S2097: The memory block "C" before the release is deleted from the free block list of the memory range to which the memory block "C" belongs.

Step S2099: The memory block generated by connecting "E", "F" and "G" after the release is inserted to the free block list of the memory range to which the generated memory block belongs.

Step S2101: The ptr of the memory block "H" is set as the head address of the memory block "E" not in use.

By a series of the aforementioned operations, the memory release process is performed in case that the adjacent previous memory block and the adjacent next memory block are not in use.

Figure 66:
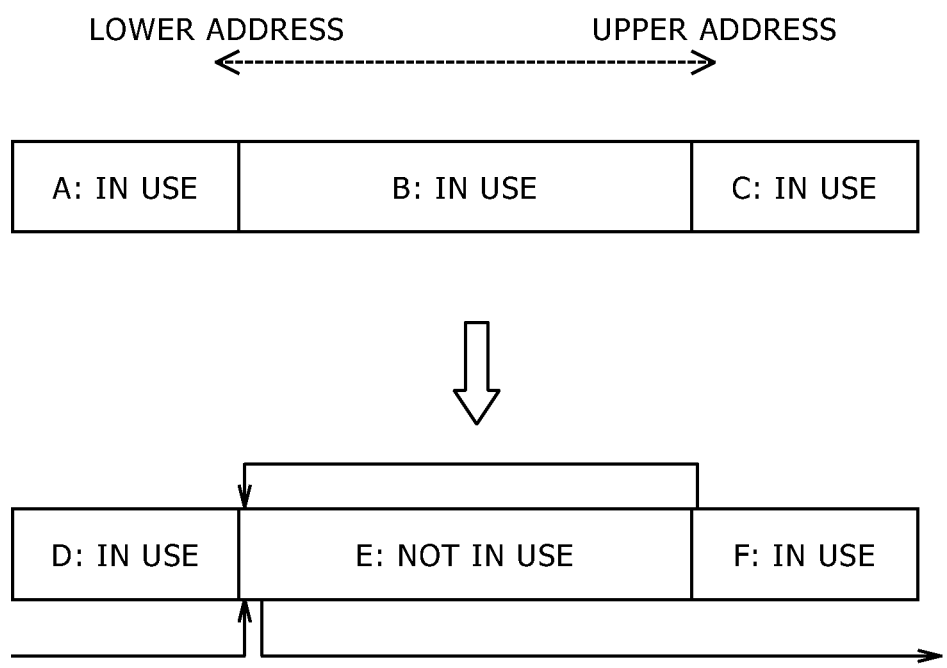
FIG. 66 shows memory maps before and after memory release (in case that the adjacent previous memory block and the adjacent next memory block are in use)
Figure 67:
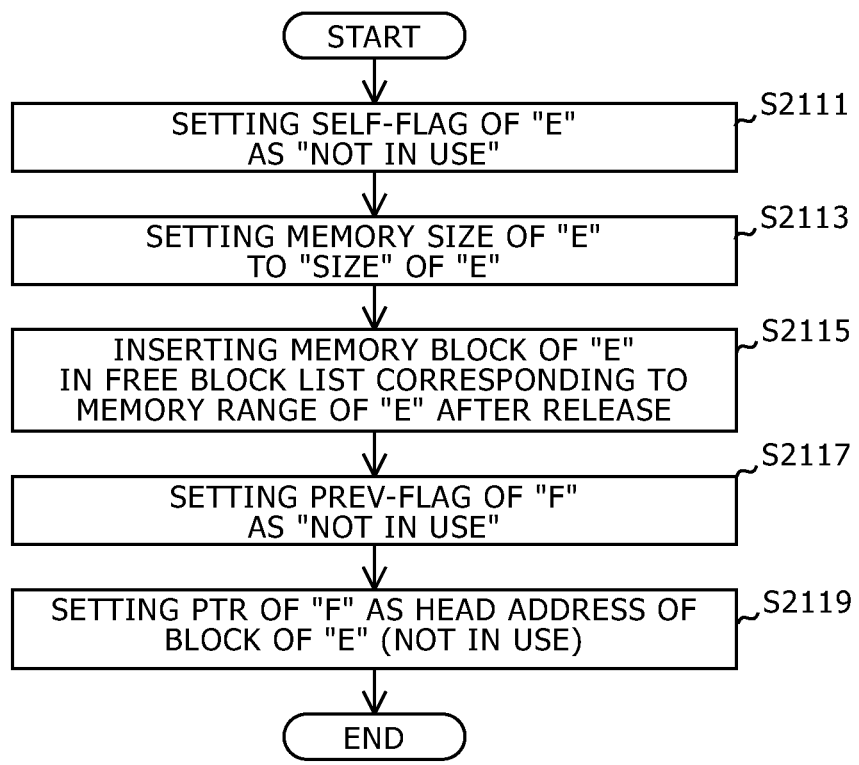
FIG. 67 shows a flowchart of memory release (in case that the adjacent previous memory block and the adjacent next memory block are in use).

FIG. 66 shows memory maps before and after memory release in case that the adjacent previous memory block and the adjacent next memory block are in use. FIG. 67 shows a flowchart which indicates operations for the memory release. In this memory release, the memory block "B" is released. Since the prev-flag of the memory block "B" indicates "in use" and the self-flag of the memory block "C" indicates "in use", the memory block "E" is simply released. In FIG. 66, the memory blocks "A", "B" and "C" before the release are the memory blocks "E" and "F" after the release, respectively.

Each of steps in this process is explained below.

Step S2111: The self-flag of the memory block "E" is set as "not in use".

Step S2113: The memory size of the memory block "E" is set to the size of the memory block "E".

Step S2115: The memory block "E" after the release is inserted to the free block list of the memory range to which the memory block "E" belongs.

Step S2117: The prev-flag of the memory block "E" is set as "not in use".

Step S2119: The ptr of the memory block "F" is set as the head address of the memory block "E" not in use.

By a series of the aforementioned operations, the memory release process is performed in case that the adjacent previous memory block and the adjacent next memory block are in use.

[Advantages of Embodiment 4]

Advantages of the memory management system of Embodiment 4 are as follows.

It is possible to avoid fragmentation effectively.

Multiple partitions are used to avoid fragmentation effectively.

Dynamic movement of boundaries of partitions is used to avoid fragmentation effectively.

The order of releasing memories is not limited, and a memory which becomes unnecessary can be released immediately.

Sizes of memory areas not in use are classified into memory ranges (i.e. size ranges); and in order to retrieve for a memory area not in use having an optimum size corresponding to a memory allocation request, the system retrieves only memory areas which belong the memory range that includes the size specified by the memory allocation request. Therefore, a memory area not in use can be found in a short time.

In view of the embodiments described above, some aspects of the present invention are summarized as follows.

The memory management system according to the first aspect of this invention has: a logical partition management unit that manages allocation and release of a virtual memory used by an application in a logical address space; a physical partition management unit that manages allocation and release of small-size parts into which a physical memory is divided in a physical address space; and a converter unit that converts an address between the logical address space and the physical address space.

Therefore, fragmentation in the logical address space is efficiently avoided. Further, it is possible to perform allocation and release of a continuous virtual memory space at high speed, and increase or decrease the size of the allocated continuous virtual memory space.

Further, in the memory management system according to the first aspect of this invention, the converter unit may generate and delete a conversion table in which a logical address in the logical address space and a physical address in the physical address space are associated with each other.

Therefore, efficiently performed is the address conversion from the logical address space of the virtual memory used by an application to the physical address space on the physical memory.

Further, in the memory management system according to the first aspect of this invention, the logical partition management unit may allocate a continuous virtual memory in the logical address space for each application.

Therefore, the virtual memory is released at high speed by releasing the partition corresponding to an application at one time, and after the release, a large continuous logical address space can be allocated.

Further, in the memory management system according to the first aspect of this invention, the physical partition management unit may set an access area by hardware as a fixed area, and may not allocate the fixed area to the virtual memory.

Therefore, this memory management system works well even if the hardware accesses such as DMA (Direct Memory Access) occur on fixed addresses in the physical memory.

The memory management system according to the second aspect of this invention has: a memory-control-block table management unit that has memory-control-block table, and manages memory allocation in a physical address space by using the memory-control-block table, the memory-control-block table having memory-control-blocks of which each indicates an allocation position of a physical memory; and a memory-control-block control table management unit that has a memory-control-block table control table which organizes the memory-control-blocks for each application, and manages memory allocation using the memory-control-block table control table for each application.

Therefore, memory spaces are allocated and released for each of applications, and consequently, fragmentation tends not to occur and it is possible to allocate a large continuous memory space.

Further, the memory management system according to the second aspect of this invention may have an application program interface that receives requests of memory allocation, memory release, and collective memory release for an application program. Upon requests from the application program interface, the memory-control-block table management unit may perform memory allocation, memory release, and collective memory, and updates the memory-control-block table. Upon requests from the application program interface, the memory-control-block control table management unit may update the memory-control-block control table according to the memory-control-block table updated by the memory-control-block table management unit.

Therefore, if an application program calls the application program interfaces, then the memory-control-block table management unit and the memory-control-block control table management unit perform memory management for each application. Therefore, a programmer is not required to write complex memory operations in the application program, and the programmer's burden is reduced.

Further, in the memory management system according to the second aspect of this invention, the memory-control-block table management unit may concatenate the memory-control-blocks for each application as a concatenated list in order to manage the memory-control-blocks. The memory-control-block control table management unit may have a memory-control-block control block which has a pointer to the first memory-control-block in the concatenated list for each application.

Therefore, in terms of such simple concatenate list structure, the system can reach the allocated memory areas in a short time. For example, the collective memory release is performed as simple procedures in a short time.

The memory management system according to the third aspect of this invention has: a logical partition management unit that manages allocation and release of a virtual memory used by an application in a logical address space; a physical partition management unit that manages allocation and release of small-size parts into which a physical memory is divided in a physical address space; and a converter unit that converts an address between the logical address space and the physical address space. The physical partition management unit watches fragmentation rates in the physical partitions, and prohibits physical memory allocation in the physical partition in which the fragmentation rate exceeds a predetermined upper-most threshold value.

Therefore, fragmentation in the logical address space is efficiently avoided. Further, it is possible to perform allocation and release of a continuous virtual memory space at high speed, and increase or decrease the size of the allocated continuous virtual memory space. Further, when the fragmentation rate of the physical partition is greater than the upper-most threshold value, the physical partition is prohibited to be used. Thus, without collecting a lot of small memory areas in the physical partition due to fragmentation, it is possible to perform conversion between a physical memory and a logical memory at low computational cost.

Further, in the memory management system according to the third aspect of this invention, the physical partition management unit may allow physical memory allocation again in the physical partition for which physical memory allocation has been prohibited, if the fragmentation rate of the physical partition becomes less than a predetermined lower-most threshold value.

Therefore, in the physical partition where the further memory allocation has been prohibited, when the fragmentation rate becomes less than the lower-most threshold value, the further memory allocation is allowed and a large memory area can be allocated. Consequently, memory usage efficiency becomes higher without using a new physical partition.

Further, in the memory management system according to the third aspect of this invention, the converter unit may generate and delete a conversion table in which a logical address in the logical address space and a physical address in the physical address space are associated with each other.

Therefore, efficiently performed is the address conversion from the logical address space of the virtual memory used by an application to the physical address space on the physical memory.

Further, in the memory management system according to the third aspect of this invention, the logical partition management unit may allocate a continuous virtual memory in the logical address space for each application.

Therefore, the virtual memory is released at high speed by releasing the partition corresponding to an application at one time, and after the release, a large continuous logical address space can be allocated.

Further, in the memory management system according to the third aspect of this invention, the physical partition management unit may set an access area by hardware as a fixed area, and may not allocate the fixed area to the virtual memory.

Therefore, this memory management system works well even if the hardware accesses such as DMA (Direct Memory Access) occur on fixed addresses in the physical memory.

The memory management system according to the fourth aspect of this invention has: a logical partition management unit that manages allocation and release of a virtual memory used by an application in a logical address space; a physical partition management unit that manages allocation and release of small-size parts into which a physical memory is divided in a physical address space; and a converter unit that converts an address between the logical address space and the physical address space. The physical partition management unit identifies sizes of parts not in use out of the small-size parts, and searches the parts not in use for a part having a size specified in a memory allocation request and selects the part having the size for the memory allocation request.

Therefore, fragmentation in the logical address space is efficiently avoided. Further, it is possible to perform allocation and release of a continuous virtual memory space at high speed, and increase or decrease the size of the allocated continuous virtual memory space. Further, a lot of areas not in use are classified into groups according to their sizes, and a group is selected form the groups, and an area not in use is retrieved only in the selected group. Therefore, an area not in use can be found in a short time.

Further, in the memory management system according to the fourth aspect of this invention, the converter unit may generate and delete a conversion table in which a logical address in the logical address space and a physical address in the physical address space are associated with each other.

Therefore, efficiently performed is the address conversion from the logical address space of the virtual memory used by an application to the physical address space on the physical memory.

Further, in the memory management system according to the fourth aspect of this invention, the logical partition management unit may allocate a continuous virtual memory in the logical address space for each application.

Therefore, the virtual memory is released at high speed by releasing the partition corresponding to an application at one time, and after the release, a large continuous logical address space can be allocated.

The description of the present invention has been presented for purposes of illustration and description, and is not intended to be exhaustive or limited to the invention in the form disclosed. Many modifications and variations will be apparent to those of ordinary skill in the art.

What is claimed is:

1. A memory management system, comprising:
   a memory-control-block table management unit that has memory-control-block table, and manages memory allocation in a physical address space by using the memory-control-block table, the memory-control-block table having memory-control-blocks of which each indicates an allocation position of a physical memory; and
   a memory-control-block control table management unit that has a memory-control-block table control table which organizes the memory-control-blocks for each application, and manages memory allocation using the memory-control-block table control table for each application.

2. The memory management system according to claim 1 further comprising:
   an application program interface that receives requests of memory allocation, memory release, and collective memory release for an application program;
   wherein upon requests from the application program interface, the memory-control-block table management unit performs memory allocation, memory release, and collective memory, and updates the memory-control-block table; and
   wherein upon requests from the application program interface, the memory-control-block control table management unit updates the memory-control-block control table according to the memory-control-block table updated by the memory-control-block table management unit.

3. The memory management system according to claim 1 wherein:
   the memory-control-block table management unit concatenates the memory-control-blocks for each application as a concatenated list in order to manage the memory-control-blocks; and
   the memory-control-block control table management unit has a memory-control-block control block which has a pointer to the first memory-control-block in the concatenated list for each application.

* * * * *